United States Patent
Hei et al.

(10) Patent No.: US 8,182,033 B2
(45) Date of Patent: May 22, 2012

(54) CHILD RESTRAINT SYSTEMS

(75) Inventors: Joseph Hei, Palo Alto, CA (US); Bryan T. White, Fremont, CA (US)

(73) Assignee: Orbit Baby, Inc., Newark, CA (US)

( * ) Notice: Subject to any disclaimer, the term of this patent is extended or adjusted under 35 U.S.C. 154(b) by 0 days.

(21) Appl. No.: 12/777,182

(22) Filed: May 10, 2010

(65) Prior Publication Data

US 2011/0115264 A1    May 19, 2011

Related U.S. Application Data

(63) Continuation of application No. 11/633,943, filed on Dec. 4, 2006, now Pat. No. 7,740,313, which is a continuation of application No. 11/131,662, filed on May 17, 2005, now abandoned.

(60) Provisional application No. 60/571,791, filed on May 17, 2004, provisional application No. 60/610,774, filed on Sep. 17, 2004, provisional application No. 60/610,686, filed on Sep. 17, 2004, provisional application No. 60/611,177, filed on Sep. 17, 2004, provisional application No. 60/610,800, filed on Sep. 17, 2004.

(51) Int. Cl.
*A47C 31/00* (2006.01)
*A47D 1/10* (2006.01)

(52) U.S. Cl. .................... 297/183.6; 297/250.1

(58) Field of Classification Search ............... 297/250.1, 297/216.11, 219.12, 183.6, 183.1, 183.4
See application file for complete search history.

(56) References Cited

U.S. PATENT DOCUMENTS

| | | |
|---|---|---|
| 3,486,684 A | 12/1969 | Dills et al. |
| 3,913,172 A | 10/1975 | Richards et al. |
| 4,681,368 A | 7/1987 | Heath et al. |
| 4,750,783 A | 6/1988 | Irby et al. |
| 4,762,364 A | 8/1988 | Young |
| 4,834,404 A | 5/1989 | Wood |
| 4,936,629 A | 6/1990 | Young |
| 4,958,414 A | 9/1990 | Benoit |
| 4,966,279 A | 10/1990 | Pearcy |
| 4,993,090 A | 2/1991 | Ranalli |
| 5,207,476 A | 5/1993 | Payne |
| 5,341,530 A | 8/1994 | Ward |
| 5,449,223 A | 9/1995 | Miculici et al. |
| 5,462,333 A | 10/1995 | Beauvais |
| 5,540,365 A | 7/1996 | LaMair |
| 5,562,548 A | 10/1996 | Pinch et al. |
| 5,658,044 A | 8/1997 | Krevh |
| 5,659,931 A | 8/1997 | Anscher |
| 5,775,770 A | 7/1998 | Tunney |
| 5,908,223 A | 6/1999 | Miller |

(Continued)

FOREIGN PATENT DOCUMENTS

GB    2207043 A    1/1989

*Primary Examiner* — Milton Nelson, Jr.
(74) *Attorney, Agent, or Firm* — Morrison & Foerster LLP

(57) ABSTRACT

Improvements for child restraint systems are directed specifically to the covers, handles, and harnesses thereof. A child restraint cover is readily removed without having to detach the harness from the seat. A soft and semi rigid child restraint handle includes members that are tied together in a crossover fashion. Another handle of the invention spans above the restraint in a head to foot direction. A further handle design includes dual integrated handles. 5-point and 7-point harnesses that do not require threading a child's limbs through harness loops are also provided. A harness height adjuster is also described.

20 Claims, 55 Drawing Sheets

U.S. PATENT DOCUMENTS

| | | |
|---|---|---|
| 5,961,180 A | 10/1999 | Greger et al. |
| 5,971,476 A | 10/1999 | Gibson et al. |
| 5,987,665 A | 11/1999 | Simantob et al. |
| 6,000,753 A | 12/1999 | Cone, II |
| 6,017,088 A | 1/2000 | Stephens et al. |
| 6,049,954 A | 4/2000 | Britto |
| 6,076,894 A | 6/2000 | Busch |
| 6,096,254 A | 8/2000 | Nielsen |
| 6,145,927 A | 11/2000 | Lo |
| 6,189,970 B1 | 2/2001 | Rosko |
| 6,283,545 B1 | 9/2001 | Ernst |
| 6,331,032 B1 | 12/2001 | Haut et al. |
| 6,338,180 B1 | 1/2002 | Massard |
| 6,393,677 B1 | 5/2002 | Anscher |
| 6,431,647 B2 | 8/2002 | Yamazaki |
| 6,508,510 B2 | 1/2003 | Yamazaki |
| 6,547,325 B2 | 4/2003 | Drost et al. |
| 6,561,577 B2 | 5/2003 | Kelly |
| 6,619,734 B2 | 9/2003 | Helmsderfer |
| 6,857,700 B2 | 2/2005 | Eastman et al. |
| 6,863,345 B2 | 3/2005 | Kain |
| 6,926,359 B2 | 8/2005 | Runk |
| 6,938,954 B1 | 9/2005 | Hendren et al. |
| 7,024,730 B2 | 4/2006 | Scholes |
| 7,163,265 B2 | 1/2007 | Adachi |
| 7,338,122 B2 | 3/2008 | Hei et al. |
| 7,789,413 B2 | 9/2010 | Hei et al. |
| 2002/0020439 A1 | 2/2002 | Tate |
| 2004/0123423 A1 | 7/2004 | Scholes |
| 2004/0266312 A1 | 12/2004 | Oren et al. |
| 2005/0253431 A1 | 11/2005 | Hei et al. |

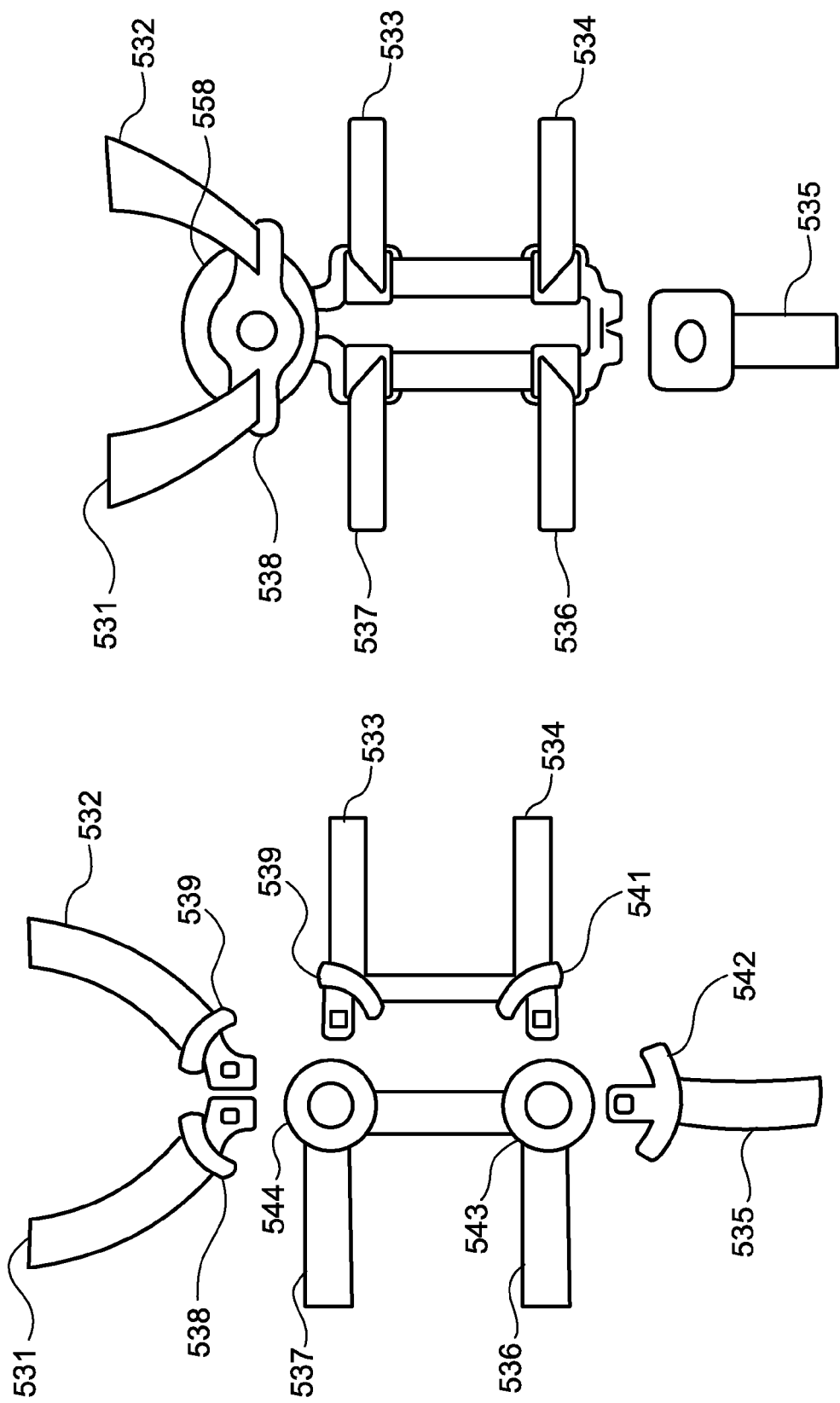

CHILD RESTRAINT SYSTEMS

CROSS-REFERENCE TO RELATED APPLICATIONS

This application is a continuation and claims the benefit of U.S. patent application Ser. No. 11/633,943 entitled "Child Restraint Systems" filed Dec. 4, 2006, which claims the benefit of U.S. patent application Ser. No. 11/131,662 entitled "Improvements for Child Restrain Systems" filed May 17, 2005, which claims the benefit of U.S. Provisional Application No. 60/571,791 filed on May 17, 2004 and titled "Child Car Seat with Improvements," and U.S. Provisional Application Nos. 60/610,774, 60/610,686, 60/611,177, and 60/610,800 each filed on Sep. 17, 2004 and titled, respectively, "Modular Child Restraint System that Involves Rotation and Removal," "Actively Securing Child Restraint Base Interface that Amplifies User Leverage," "Modular Upgradeable Child Restraint System," and "Child Vehicle Restraints," all of which are incorporated herein by reference in their entirety and for all purposes. This application is related to U.S. application Ser. No. 11/131,568 titled "Actively Securable Base for a Modular Child Restraint System" and U.S. application Ser. No. 11/132,103 titled "Modular Child Restraint System," both filed on May 17, 2005 and incorporated herein by reference in their entirety and for all purposes.

BACKGROUND OF THE INVENTION

Field of the Invention

The present invention relates generally to the field of transportation safety and more particularly to child carriers for use in vehicles.

BRIEF DESCRIPTION OF DRAWINGS

FIGS. 52 and 53 are top plan views of 7-point harnesses for a child restraints according to additional embodiments of the invention.

DETAILED DESCRIPTION OF THE INVENTION

1. Easily Attached and Removed Child Restraint Cover

The covers of child restraints must be periodically removed for cleaning. Existing restraints accommodate this need by having easily detachable perimeter loops or elastic. However, in existing systems, the parent must detach the safety harnesses that pass through restraint cover in order to remove the cover. While some covers have lengths of hook and loop fasteners near harness exit points to aid harness adjustment, none offers a cover scheme that completely obviates the need to break the harness integrity.

A new child restraint cover system of the invention allows for greater ease of use and safety. The invention allows the user to remove the restraint cover (for instance for cleaning) without breaking the integrity of the harness loop. By enabling users to remove the restraint cover without disturbing the harness at all, the invention simultaneously improves the ease of use and safety of all restraints, including children's car seats, infant carriers used as car restraints, carriers and bassinet type restraints that are not meant as in-car restraints, and child strollers. The invention also promotes improved cleanliness and sanitation of child restraints by encouraging easier and more frequent washing.

The present invention provides for a child restraint cover that can be easily and safely removed. The greater ease of use and safety result from the elimination of the need to break/disconnect the safety harness system of the restraint in order to remove the cover. The invention achieves this feature by incorporating seam lines in the cover that close for child comfort, and separate for removal. Fasteners of various kinds (including of the hook and loop variety) attach in order to close the cover at these seams, but also allow the seams to be opened.

Figure 1:
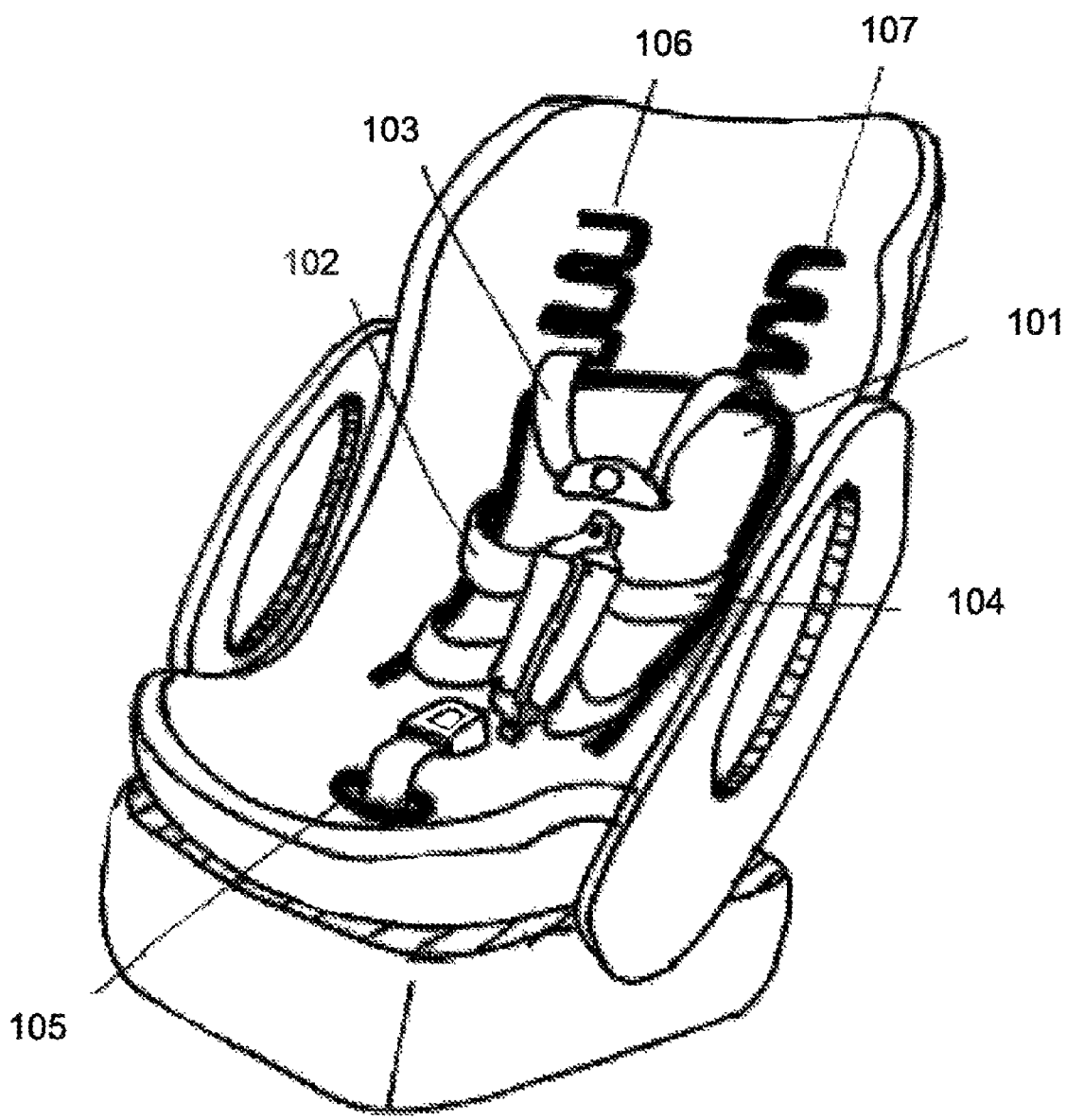
FIG. 1 is a perspective view of a child restraint incorporating principles of the cover, according to an embodiment of the invention.

FIG. 1 shows the cover of the invention installed on a restraint. The darker, bold, lines in the figure represent seams in the cover construction which allow the invention to achieve easy removal and attachment. The large flap 101 defined by the "upside-down U" shaped bold line flips open to allow the cover to be removed without breaking the continuity of the overall harness structure; in this case, harness loops 102, 103, and 104 can pass by the edges of the flap without breaking. The opening 105 allows the lower crotch area harness end to pass through the cover. Seams 106 and 107 allow for harness shoulder height adjustment without breaking the harness loop. To prevent large flap 101 and seams 106 and 107 from easily opening in regular restraint usage, they are fixed down with hook and loop fasteners.

Figure 3:
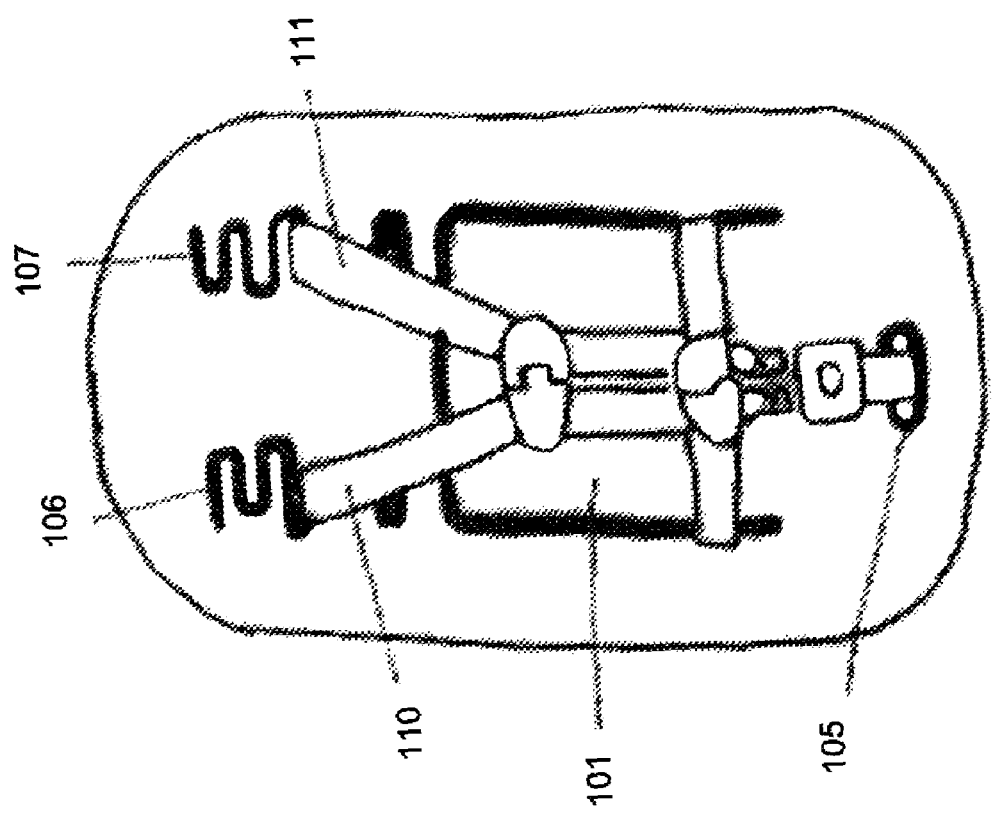
FIG. 3 is a top plan view showing a 5-point harness system according to an embodiment of the invention.
Figure 2:
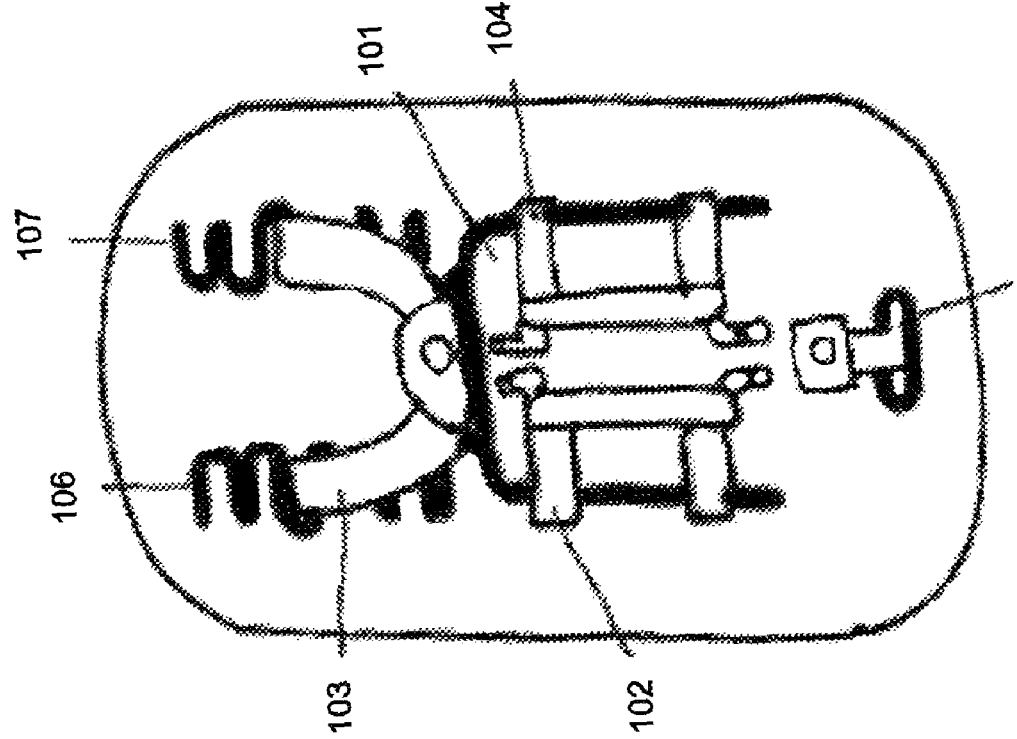
FIG. 2 is a top plan view showing a 7-point harness system according to an embodiment of the invention.

FIG. 2 is a plan view that shows the invention's scheme. Large flap 101; harness loops 102, 103, and 104, opening 105; and seams 106 and 107 are shown for reference. Alternative implementations of this fixing functionality in the invention include: buttons, snaps, plastic hooks, and re-sealable contact adhesive. FIG. 3 is a plan view that shows how the child restraint cover invention applies to different harness scheme variations. In this case, a five point harness can also benefit from the easy attach and removal method. Large flap 101; harness loops 111 and 112, opening 105; and seams 106 and 107 are shown for reference.

Figure 4:
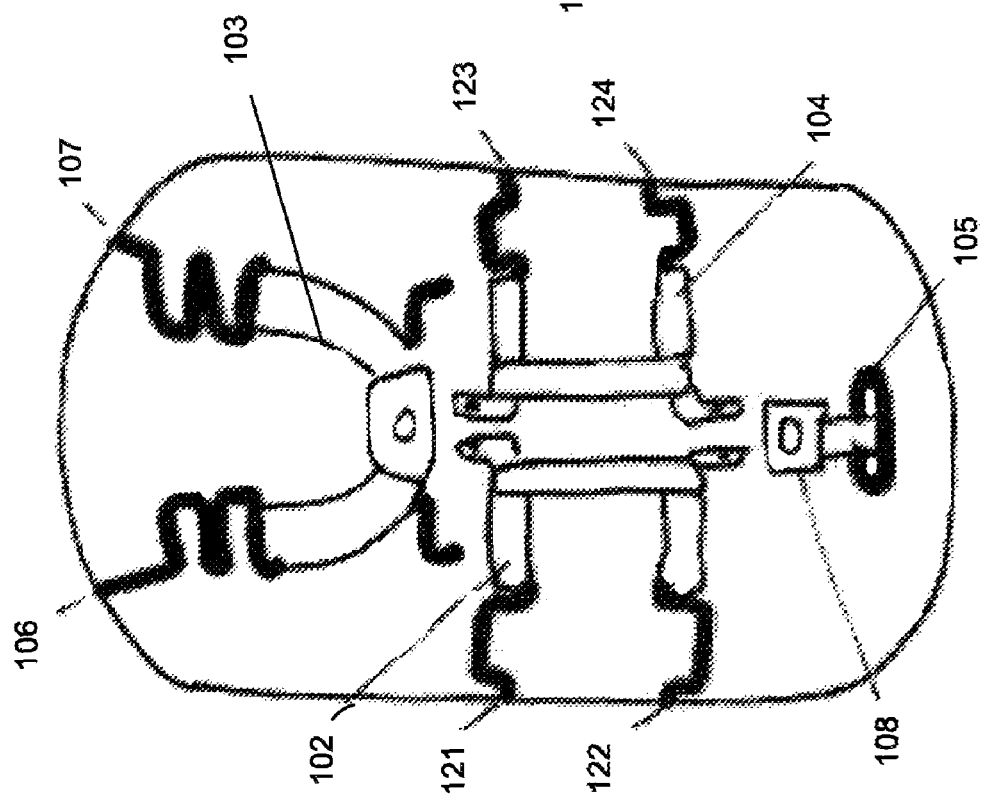
FIG. 4 is a top plan view showing an alternate harness embodiment of the invention.

FIG. 4 is a plan view that shows an alternative implementation of the invention which has seams that allow the harness structure to pass through the cover. Seams 121, 122, 123, and 124 extend to the edge of the cover allowing harness loops 102 and 104 to pass through unimpeded. Seams 106 and 107 function similarly and are also cut to the top edge of the cover to allow for the shoulder harness straps of 103 to pass through. Opening 105 allows harness crotch attachment 108 to pass through. This alternative implementation is just like the primary implementation of the invention in that it can also work for different harness schemes (such as five point harnesses) and can be implemented with a variety of closures other than hook and loop ones that hold the seams closed.

Figure 5:
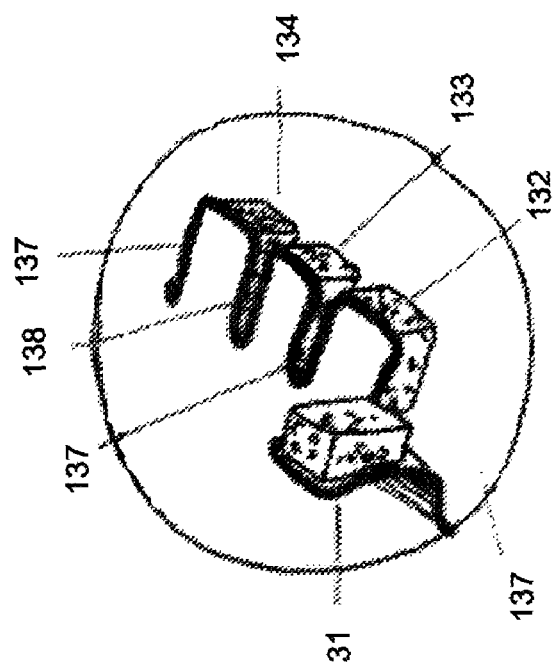
FIG. 5 is a perspective detail view of a shoulder area of a cover according to an embodiment of the invention.

FIG. 5 details the shoulder harness area of the cover invention and shows how the design accommodates multiple harness heights. Flaps 131, 132, 133, and 134 can be flipped up to reposition the shoulder harness strap to pass through either slots/positions 135, 136, 137, 138, or 139.

2. Semi Rigid Deploying Handle for Child Restraints

There are many child restraints on the market, especially of the type that users install as accessories in a car and are not built-in to the vehicle by the vehicle manufacturer. Of these, one type commonly referred to as "infant car seats" or "infant carriers" can be removed from the vehicle without uninstalling the base to which they attach. These restraints commonly have a carrying handle that allows parents to pick them up and carry them.

A common form of these handles is a loop that connects to the minor or lateral axis of the restraint as viewed from the top. These loops then rotate to a vertical position for carrying. There have been many developments of the handle area of this loop (the top of the loop) to attempt to achieve a more ergonomic carrying position for parents. These variations include a jog or bend in the loop in the handle area to the longitudinal direction, a rotating a handle which can be set at different radial positions as viewed from the top, and a splitting of the loop at the top that allows a cross handle piece to be installed in the longitudinal direction. These developments still do not adequately address the ergonomics of restraint carrying because they do not address common carrying modes such as elbow carrying. Also, these existing handles are large plastic structures that add weight, complexity, and bulk to restraints not only through their own structure, but also through the supporting locking and hub structures.

As for soft or semi rigid handles, having two loops to either side of the restraint is a classic handle design that has been around for a long time (as evidenced by its use on so called "Moses basket" bassinets). These handles achieve light weight and comfort at the expense of restraint stability and safety. Single soft straps (like shoulder straps) have similar stability issues.

A new child restraint handle of the invention allows for more comfortable and ergonomic carrying of the restraint.

This handle improves the carrying of children's car seats, infant carriers used as car restraints, and carriers and bassinet type restraints that are not meant as in-car restraints.

Highlights of the invention include:
Comfortable semi rigid loops that achieve the comfort of soft handles while providing stability and safety;
Easy to deploy to allow carrying and to fold up;
A unique configuration of the handle loops that achieves compact folding and carrying stability;
Stability of the restraint is achieved by placing the anchor points of the handle close to the corners of the restraint;
'Fail safe' usage of a semi rigid handle achieved wherein user cannot grab the handle improperly; and
Reduced weight and complexity versus rigid handles.

The present invention provides a handle for child restraints that allows an ergonomic and comfortable carrying and handling experience for the user/parent using the restraint. The handle accomplishes its novel level of comfort through its soft and semi rigid manner. Unlike prior art hard rigid handles, the shape of the handle of the invention will conform to the user's body for comfort. Also, because of this novel semi rigid construction, the handle will better enable carrying in the crook of the elbow of a user, as opposed to holding it with a hand. Existing handles do not explicitly enable a comfortable elbow carrying mode, instead focusing on the hand carrying mode (more 'briefcase style'). The handle also does not rely on a hard locking hub, thereby reducing weight, reducing the width of the restraint, eliminating protuberances sticking out of the sides of restraint that rub up against users, and reducing complexity. All of these factors, combined with the inherently lighter weight of the semi rigid members, contribute to user comfort and convenience.

Figure 6:
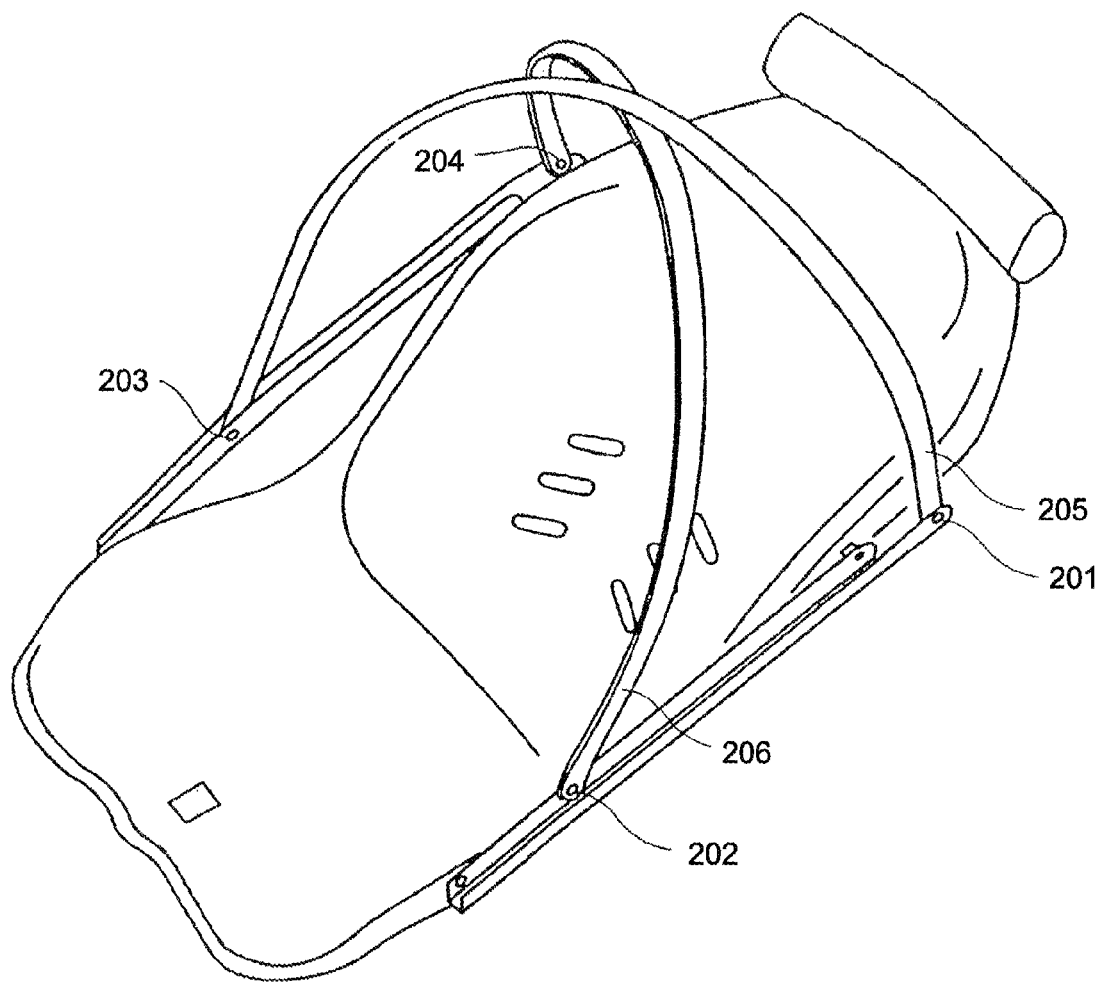
FIGS. 6 and 7 are perspective views of a child restraint comprising a handle according to an embodiment of the invention.
Figure 7:
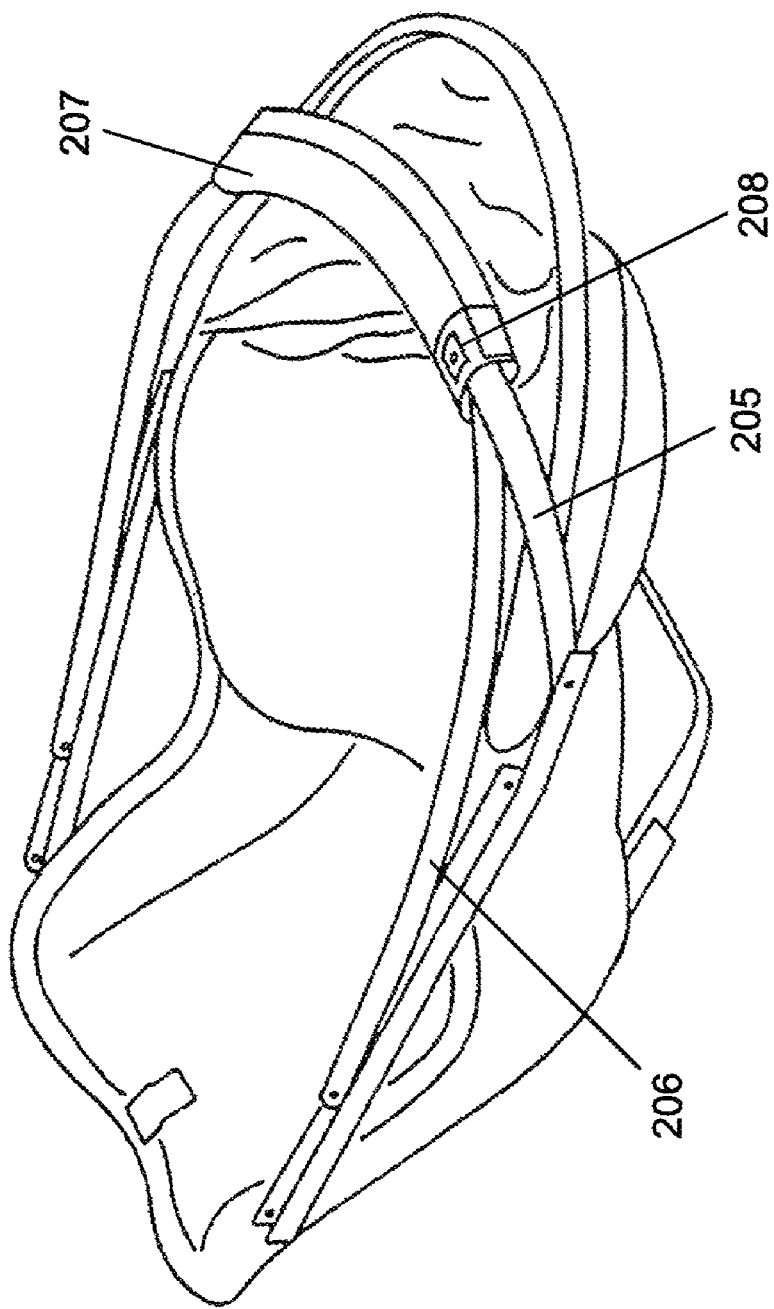

The invention accomplishes all of these points of comfort and convenience while still achieving restraint stability. FIG. 6 shows how attachment points 201, 202, 203, 204 are pushed out, close to the outer corners of the restraint, thereby achieving stability. One principle feature of the invention is the ability to achieve this stability, while still allow a compact folding. The handle folds up to follow the upper (or lower) contour of the restraint. FIG. 7 shows the handle folded along the upper contour of the restraint. The invention achieves this compact folding because semi rigid members 205 and 206 (as seen in FIG. 6) cross over each other, such that member 205 is attached at points 201 and 203, and member 206 is attached at points 202 and 204. The member crossing scheme of the invention allows the compact folding shown in FIG. 7 to be achieved by merely pushing upward on the handle 207.

Figure 8:
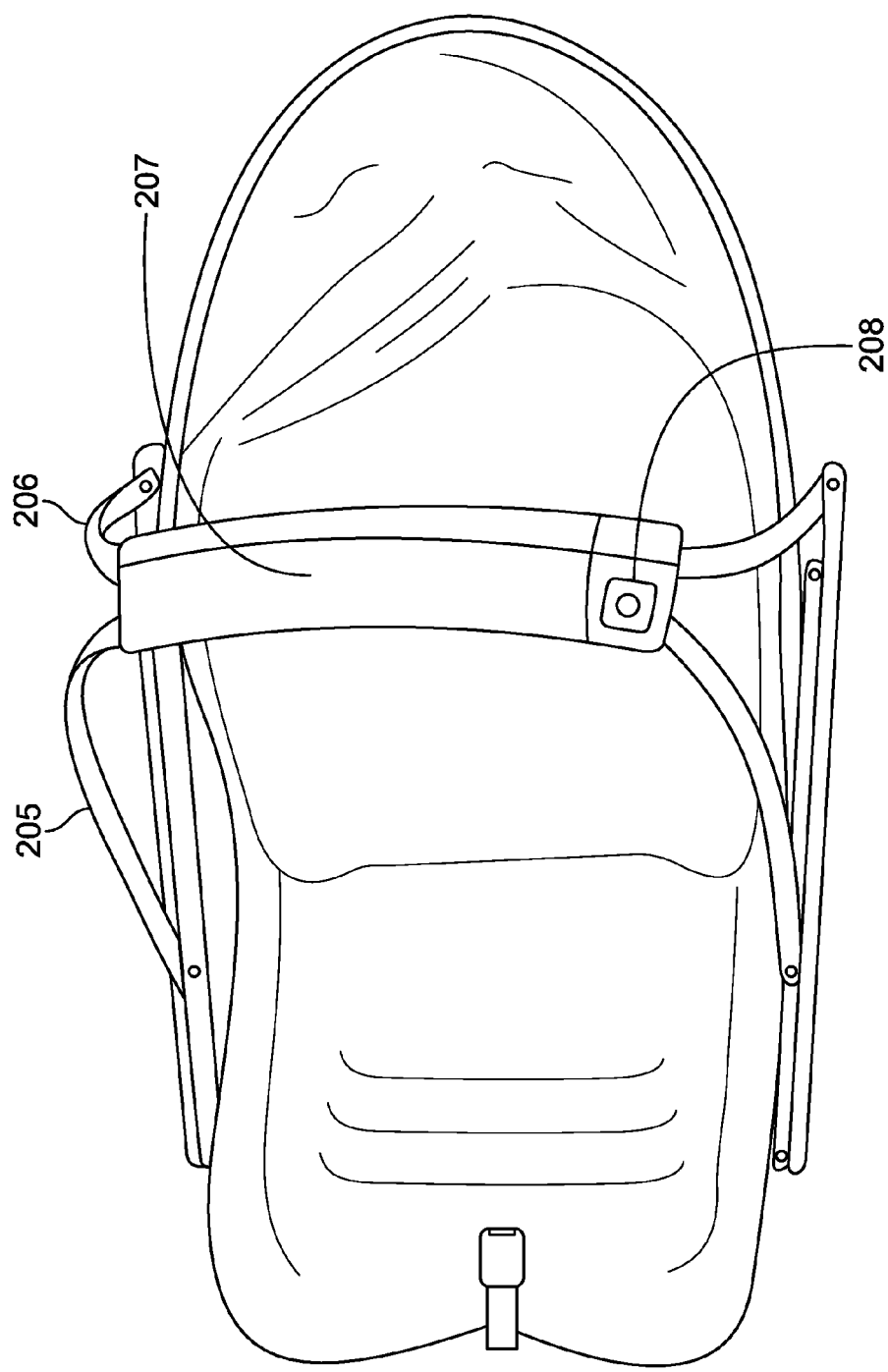
FIG. 8 is a top plan view of a child restraint comprising a handle according to an embodiment of the invention.

FIG. 8 shows the interface piece 207 attached over the member crossing point. This piece achieves greater user comfort for holding/handling by being padded. Also, locking element 208 on the interface piece locks the handle 205 and 206 by pressing members 205 and 206 together; when 208 pushes on 205 and 206, the overall handle assembly cannot move. An alternate embodiment of the invention would involve no locking element.

Figure 9:
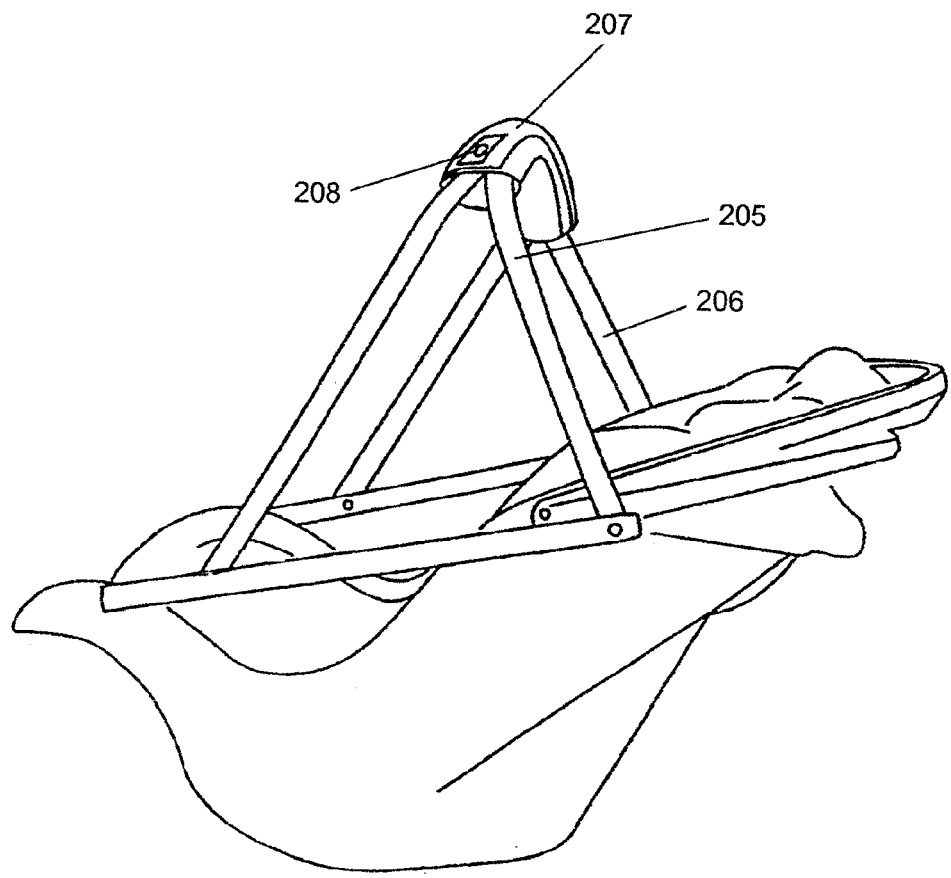
FIGS. 9 and 10 are side elevation views of a child restraint comprising a handle, according to an embodiment of the invention, in carrying and folded positions, respectively.
Figure 10:
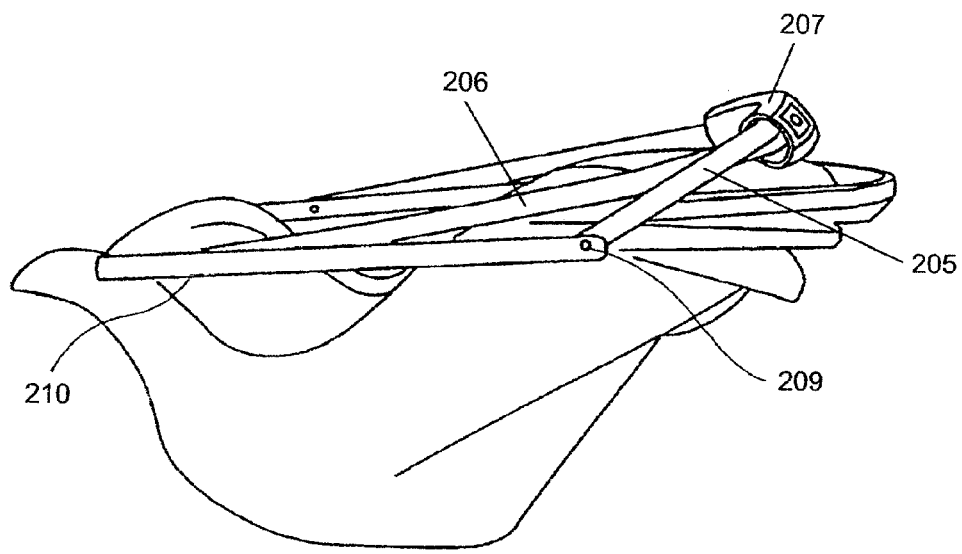

FIG. 9 shows the invention in its deployed state, and FIG. 10 shows the invention in its folded state. An alternate embodiment of the invention would involve locking out the handle assembly's movement by locks or detents located at locations 209 or 210.

Figure 11:
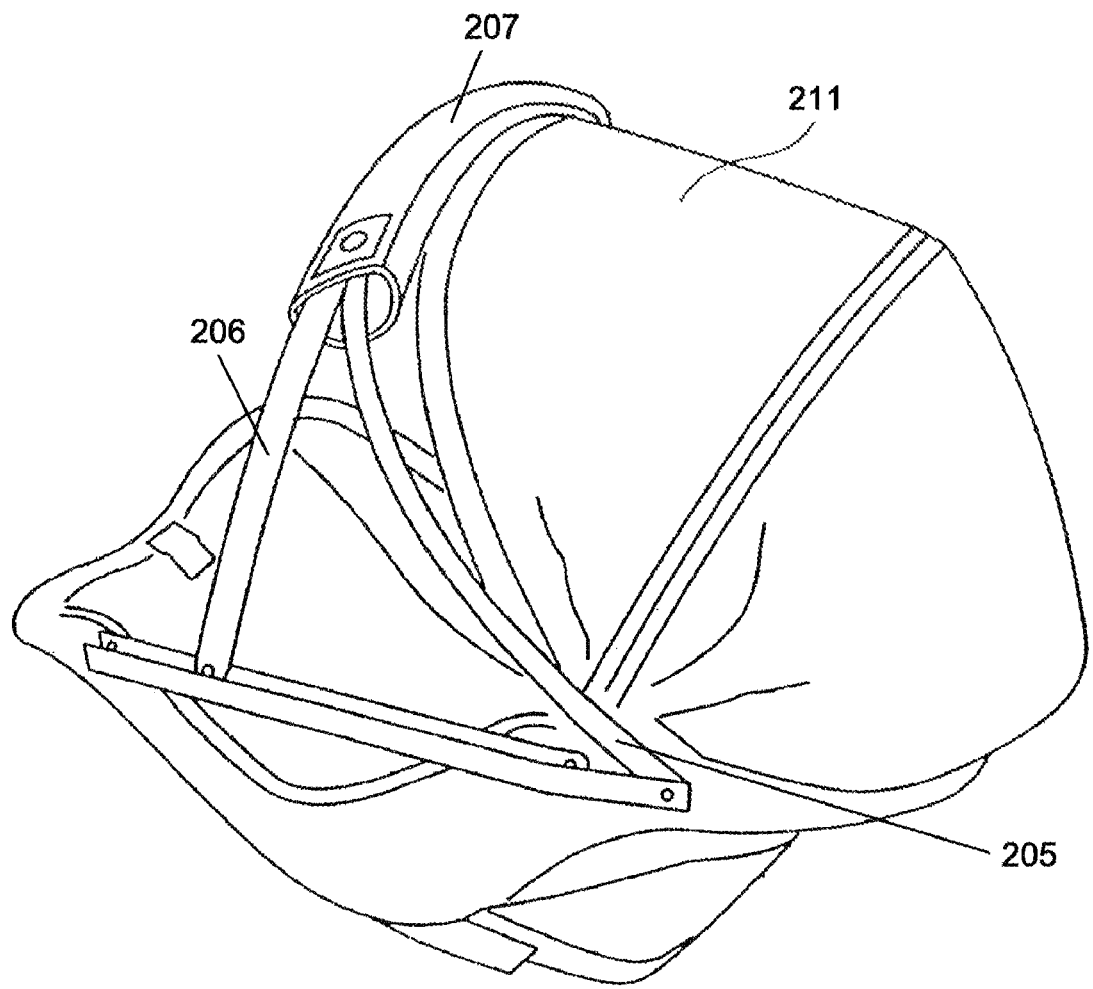
FIGS. 11 and 12 are perspective views of a child restraint comprising a handle, according to an embodiment of the invention, including an integrated sunshade.
Figure 12:
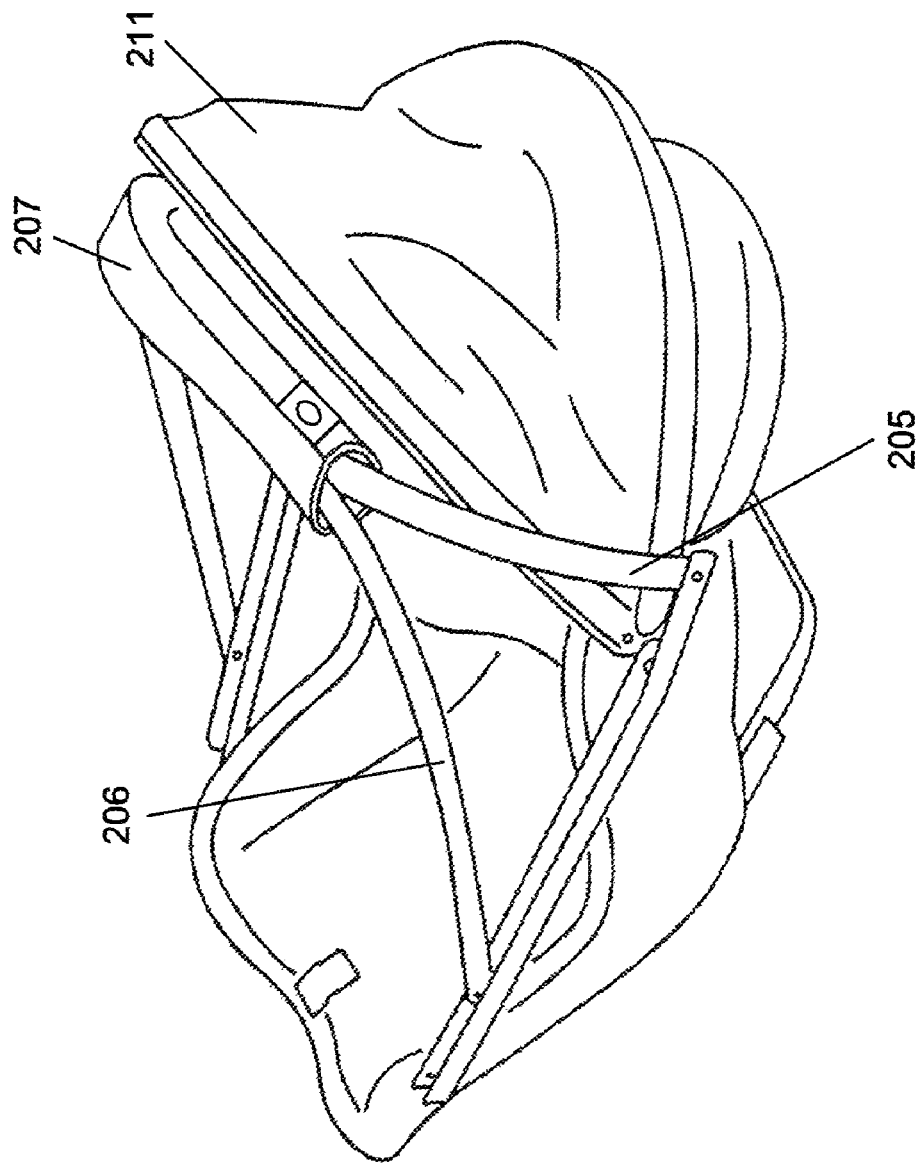

FIG. 11 shows how an integrated sunshade can be incorporated into the invention. When the semi rigid handle is raised, the integrated sunshade 211 pulls up with no secondary action. FIG. 12 illustrates the integrated sunshade 211 in a partially stowed state.

Figure 13:
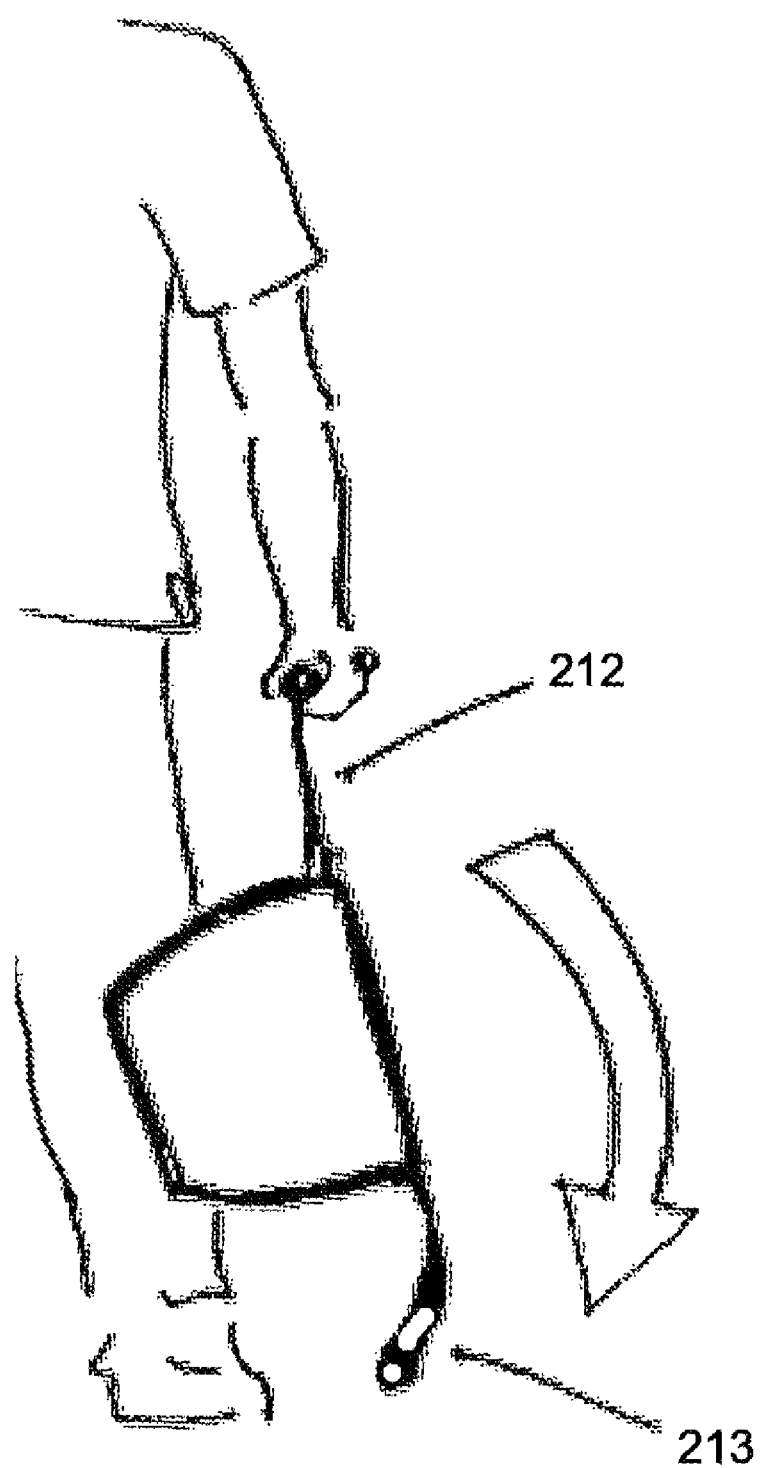
FIG. 13 is a schematic illustration of a shortcoming of a simple soft handle according to the prior art.

An important element of the invention is the achievement of stability in a 'fail safe' fashion. This usage safety contrasts with conventional soft handles. FIG. 13 shows how standard soft 'duffel bag' style handles can be used improperly by a user. Handles 212 and 213 are not connected, such that the user can grab only one handle (212) and lift the restraint. This will cause the restraint to rock over into a position where the child might fallout of the restraint. In the invention, the semi rigid structures 205 and 206 of FIGS. 6-12 are tied together in a crossover fashion that allows the advantages of a soft handle 207, without the potential for misuse. The invention anchors in four points of stability in similar fashion to 'duffel bag' style handles, but deploy simply in one step with no disconnection of the handle from one side of the restraint to the other.

3. Extended Ergonomic Handle

There are many child restraints on the market, especially of the type that users install as accessories in a car and are not built-in to the vehicle by the vehicle manufacturer. Of these, one type commonly referred to as "infant car seats" or "infant carriers" can be removed from the vehicle without uninstalling the base to which they attach. These restraints commonly have a carrying handle that allows parents to pick them up and carry them.

A common form of these handles is a loop that connects to the minor or lateral axis of the restraint as viewed from the top. These loops then rotate to a vertical position for carrying. There have been many developments of the handle area of this loop (the top of the loop) to attempt to achieve a more ergonomic carrying position for parents. These variations include a jog or bend in the loop in the handle area to the longitudinal direction, a rotating a handle which can be set at different radial positions as viewed from the top, and a splitting of the loop at the top that allows a cross handle piece to be installed in the longitudinal direction. These developments still do not adequately address the ergonomics of restraint carrying.

A new child restraint handle of the invention allows for more comfortable and ergonomic carrying of the restraint. This handle will improve the carrying of children's car seats, infant carriers used as car restraints, and carriers and bassinet type restraints that are not meant as in-car restraints.

While there are existing child restraint handle designs, the handle of the invention is superior because it:
Is more comfortable to use;
Allows to user to account for variable centers of gravity of the child's weight;
Allows the user to adjust for child's shifting weight on-the-fly;
Provides more hand placement options;
Allows the user to use a second hand more effectively;
Allows the user to exert leverage on the restraint more effectively when maneuvering it into cars, onto strollers, or other dynamic conditions; and
Includes a linkage system that allows a longer handle to stow more compactly.

The present invention provides a handle for child restraints that allows an ergonomic and comfortable carrying and handling experience for the user/parent using the restraint. The handle accomplishes its novel level of comfort through allowing the user to balance the weight of the restraint and child along the most weight-variable axis, through placing the hand in a comfortable orientation, and through allowing the use of multiple hands.

Figure 14:
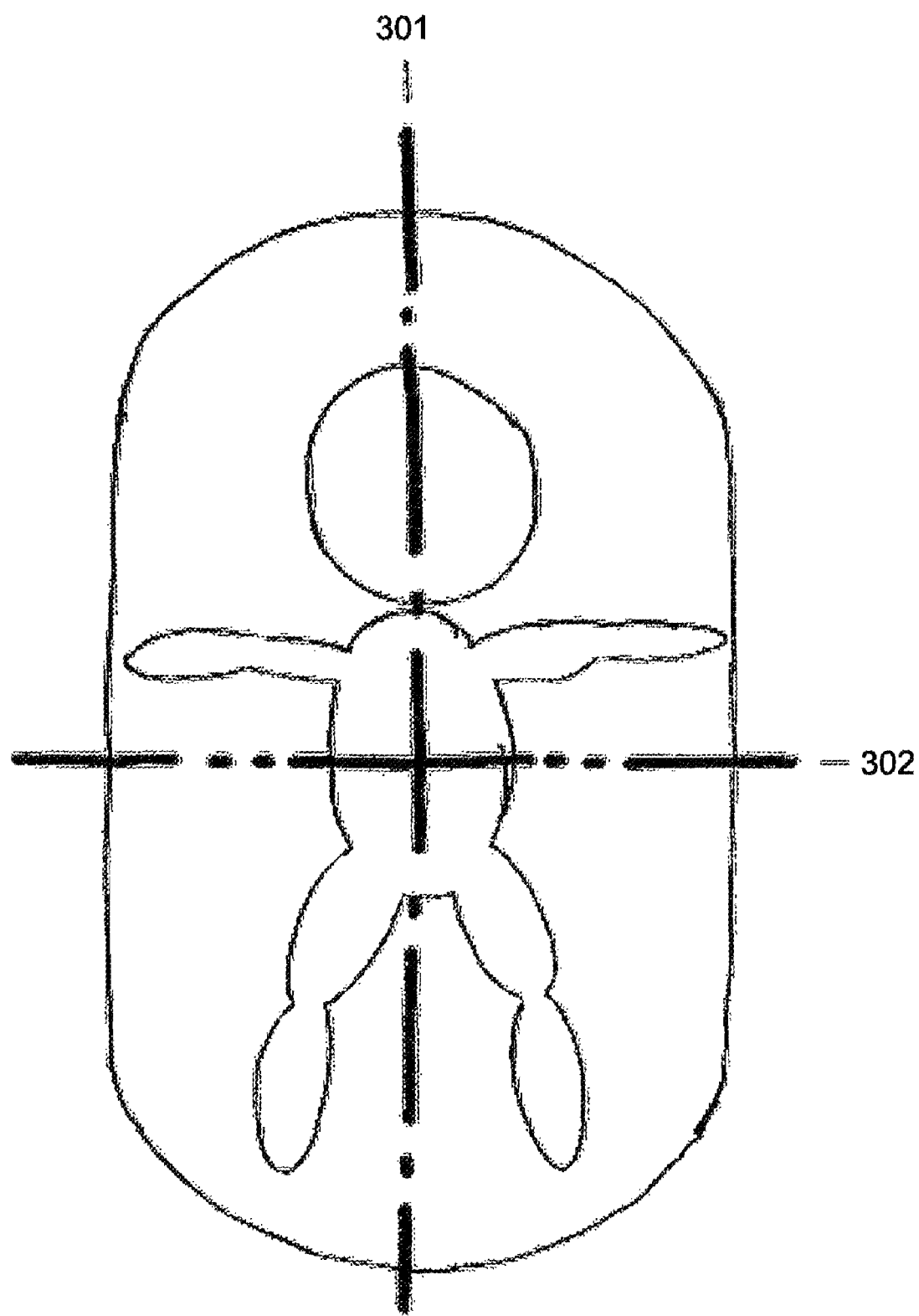
FIG. 14 is a schematic top plan view of a child restraint to define major and minor axes as used herein.

The handle of the invention accomplishes these advantages over existing handles by incorporating a handle that spans above the restraint in the longitudinal, or major axis, orientation. FIG. 14 explains the orientation scheme referring to herein. Centerline 301 is the major axis or longitudinal orientation. Centerline 302 is the minor axis or transverse orientation. Existing handle designs either span in the minor axis orientation, or take a turn in the middle and allow for one hand to be placed in the major axis orientation.

Figure 15:
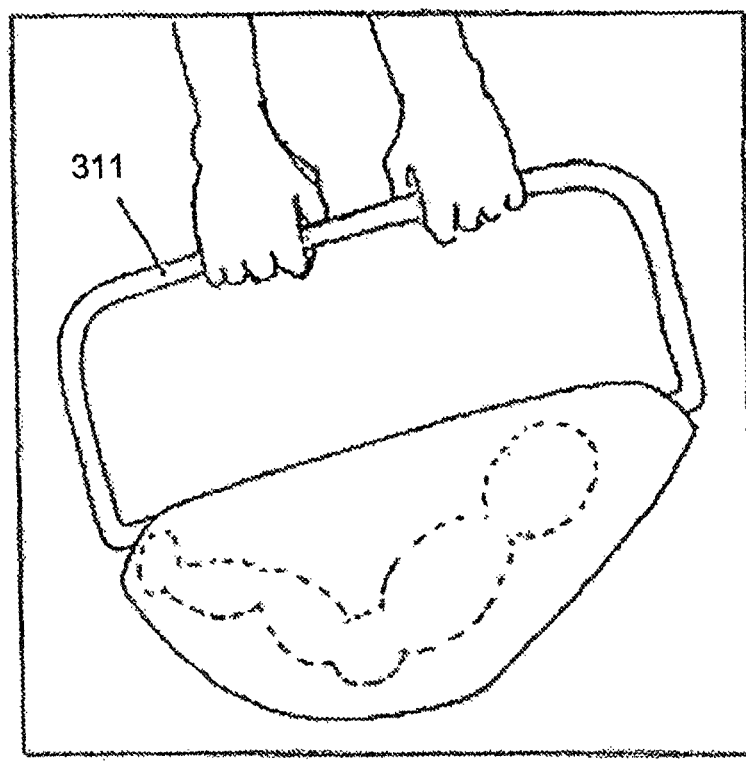
FIG. 15 is a side elevation view of a child restraint including an ergonomic handle according to an embodiment of the invention.

FIG. 15 shows how the extended longitudinal handle span 311 can accommodate more than one hand, in contrast to existing designs. In fact, the invention allows for a handle that spans the major axis either in its entirety, or for its majority. This extended longitudinal orientation addresses critical factors that have been determined to contribute to the discomfort of carrying a child restraint:

offset weight;

limited hand placement flexibility; and insufficient handle space to accommodate a secondary hand.

Figure 16:
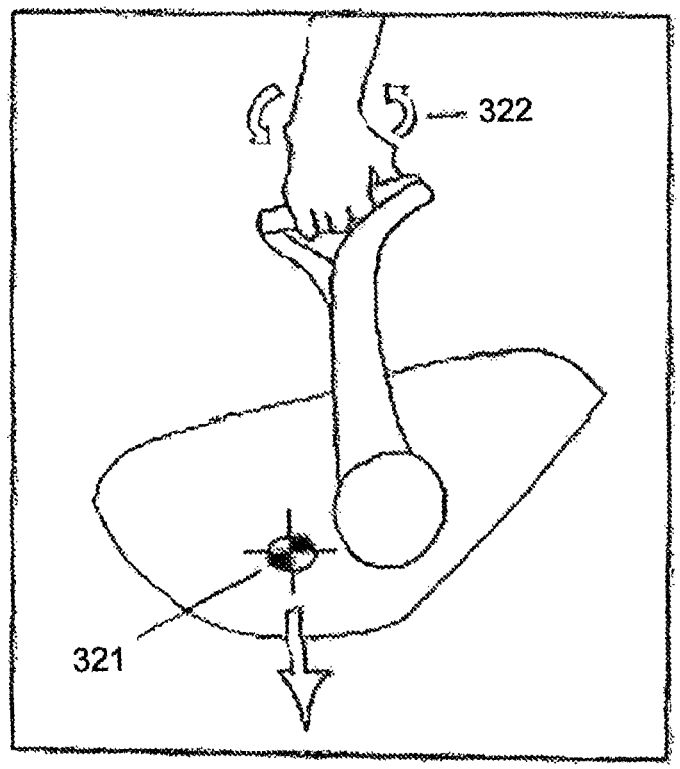
FIG. 16 is a side elevation view of a restraint handle according to the prior art showing its ergonomic inadequacy.

Offset weight results in a great degree of discomfort because the user then has to contend not only with the static weight of the child and restraint, but also with the moment caused by the center of gravity not being in line with the user's hand and arm. FIG. 16 illustrates how a user experiences a twisting on his or her arm, wrist, and hand with existing designs. The marker 321 indicates the center of gravity location for the combined restraint and child. It can be seen that this results in a twisting 322 of the user's wrist.

Referring back to the longitudinal handle span 311 illustrated in FIG. 15, it can be seen that the invention allows self-adjusting of hand placement along the major axis by the user to negate this twisting. The handle allows for longitudinal adjustment because there is more potential for center of gravity variability along that axis as the child grows.

Figure 17:
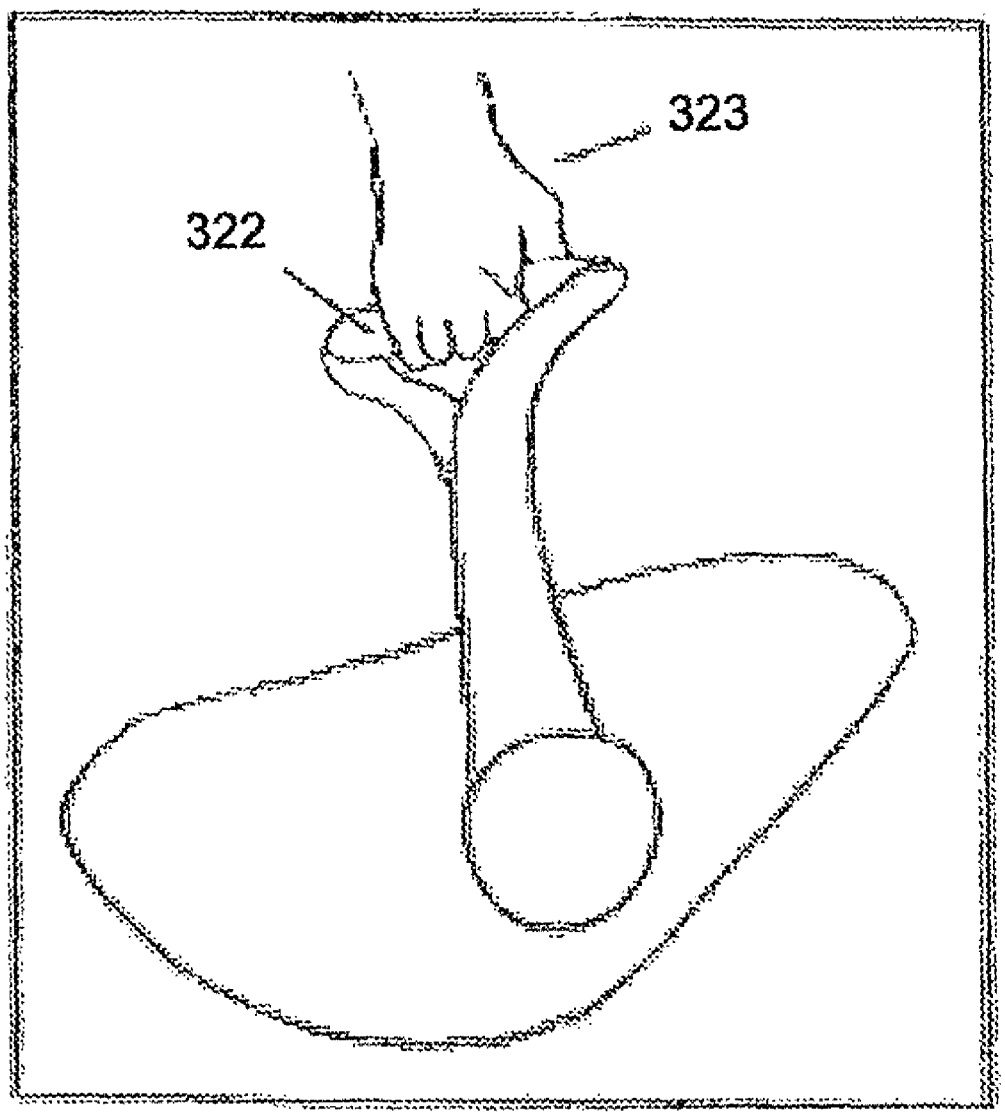
FIGS. 17 and 18 are side elevation and perspective views, respectively, of a restraint handle according to the prior art showing additional ergonomic inadequacies.
Figure 18:
Figure 19:
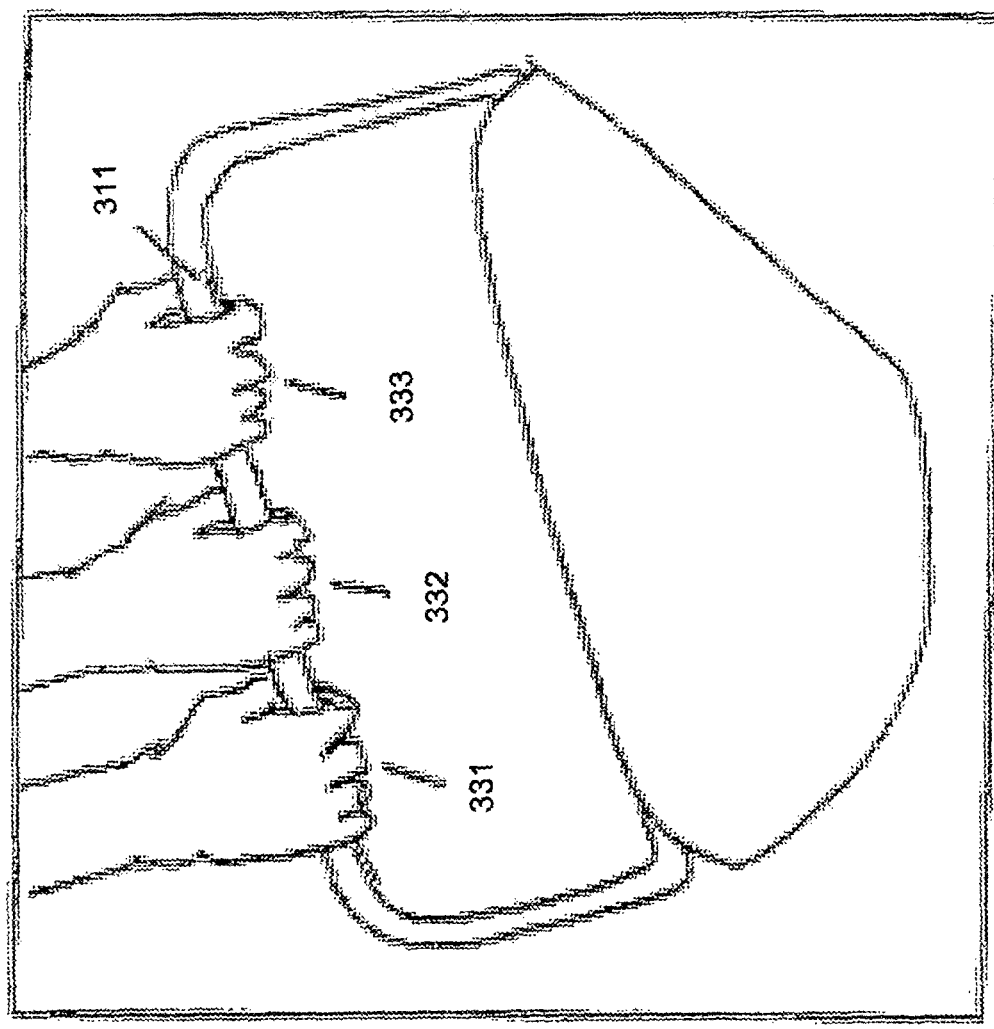
FIG. 19 is a side elevation view of a child restraint including an ergonomic handle according to an embodiment of the invention showing alternate ergonomic hand positions.

Limited hand placement flexibility contributes to discomfort by not allowing the user to adjust his or her carrying position for comfort. This need for adjustment could be in response to a static carrying condition, as when one shifts backpack straps to different parts of the shoulders. Or, it could be in response to a need maneuver the restraint FIG. 17 illustrates the contrast in flexibility afforded by the handle design vs. existing handles. Here, hand 323 can only be placed in one location on this handle 322 (which represents a side elevation view of an existing handle design that spans the minor axis but turns in the middle for a short section of longitudinal handle). FIG. 18 shows a user with this existing handle design. In contrast, in FIG. 19, the hand is shown in multiple positions 331, 332, and 333 along handle span 311.

Figure 20:
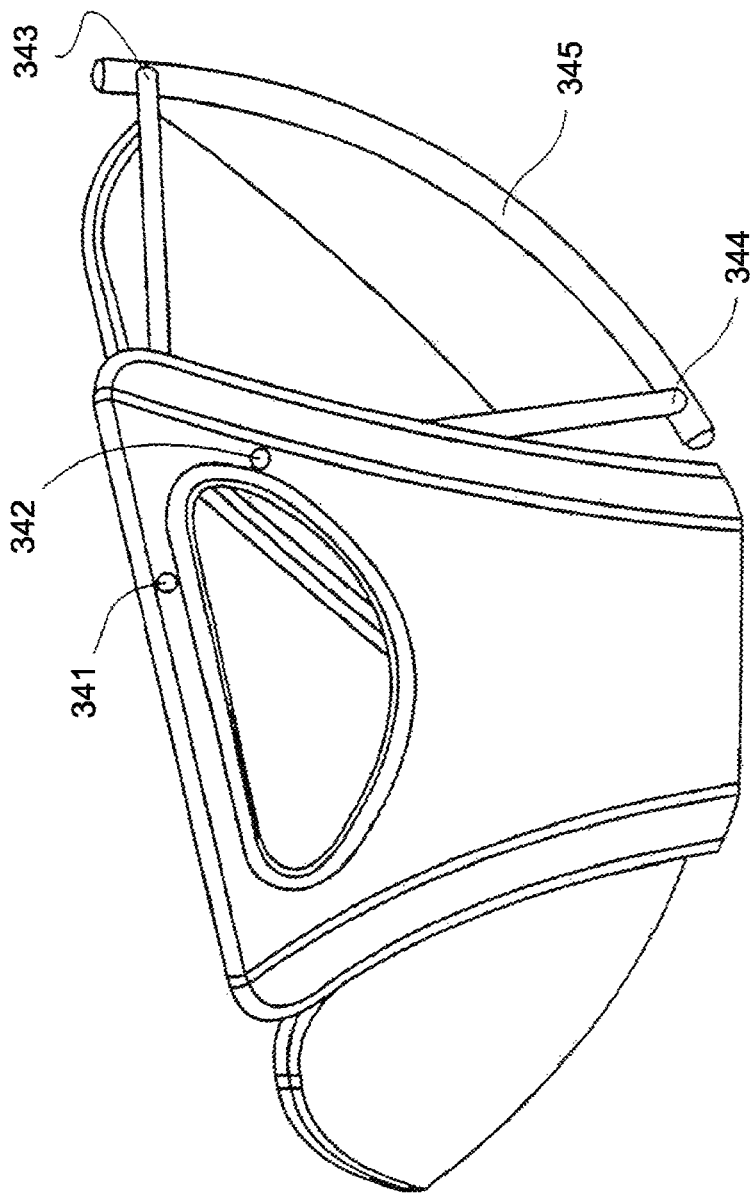
FIGS. 20-22 are side elevation views of a child restraint including an ergonomic handle according to an embodiment of the invention showing a 4-bar linkage in a stowed position, a partially deployed position, and a fully deployed position, respectively.
Figure 21:
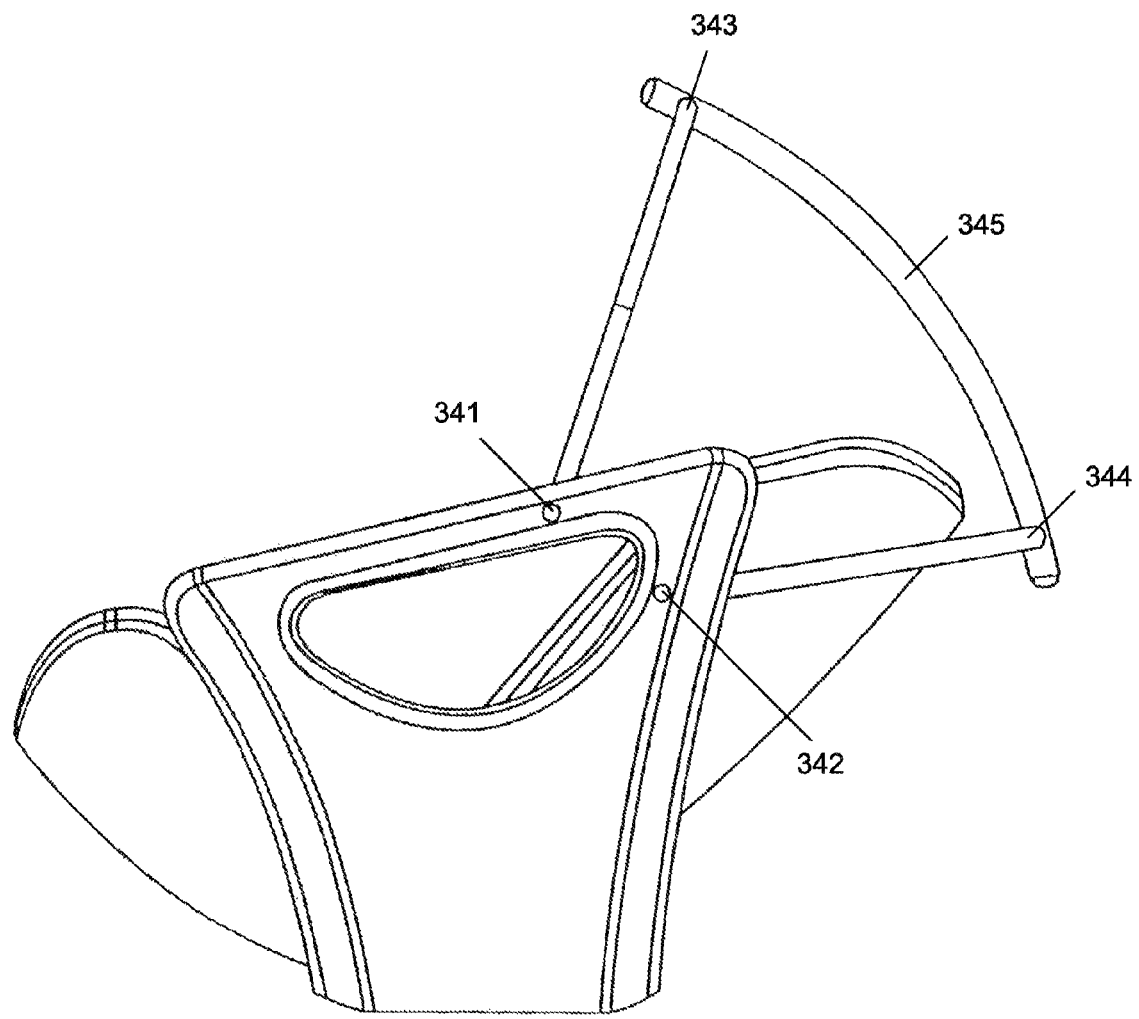
Figure 22:
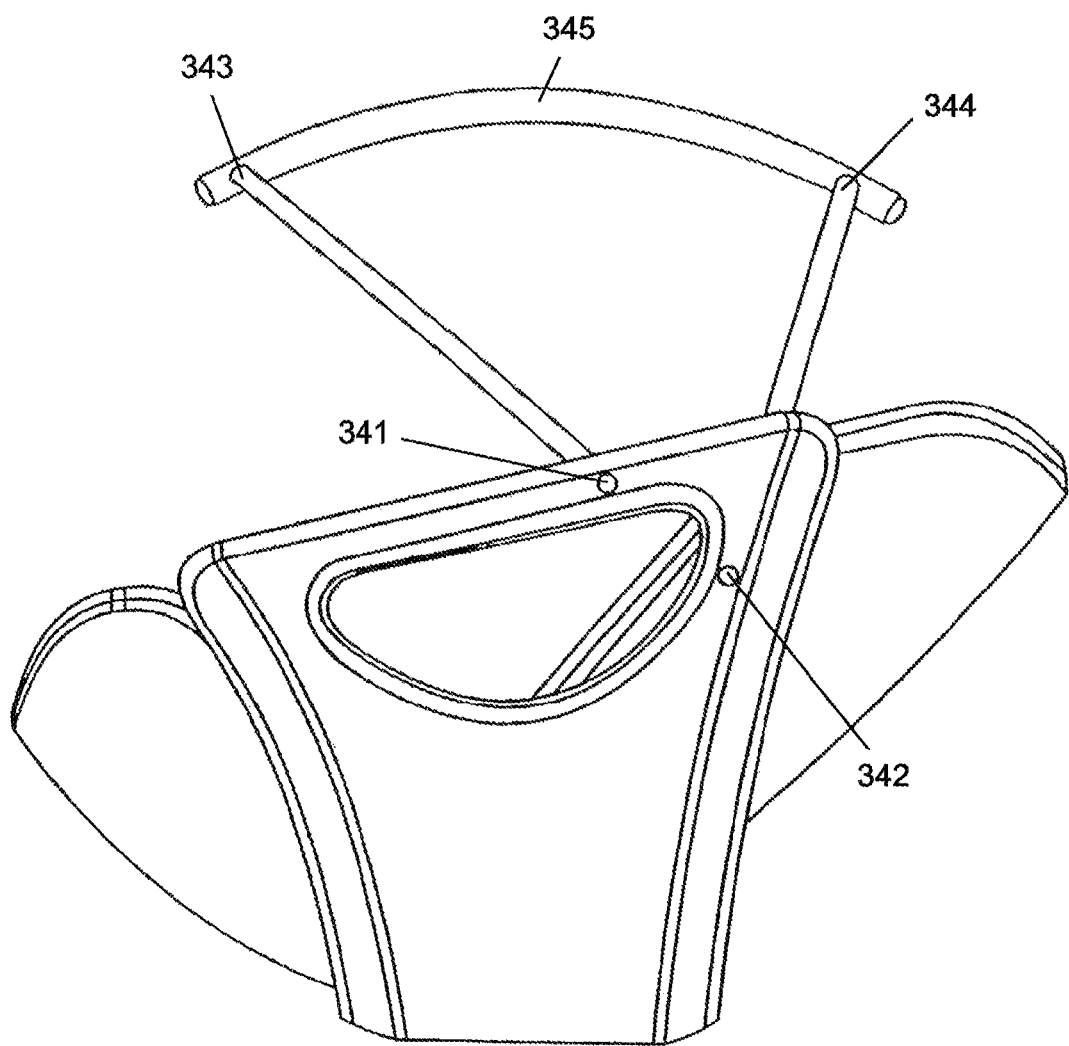

Users sometimes want to use more than one hand to hold the child restraint. Also, users can jointly hold the restraint with another person. Existing handles offer limited options for secondary hand placement. In order to achieve this extended longitudinal handle span in a child restraint, the invention provides an innovative mechanism that both stows the handle in a compact position and deploys it to its full ergonomic length. FIG. 20 illustrates the 4-bar linkage in stowed position, with pivots 341, 342, 343, and 344, and handle span 345. FIG. 21 shows the handle partially deployed. FIG. 22 shows the handle fully deployed.

Figure 23:
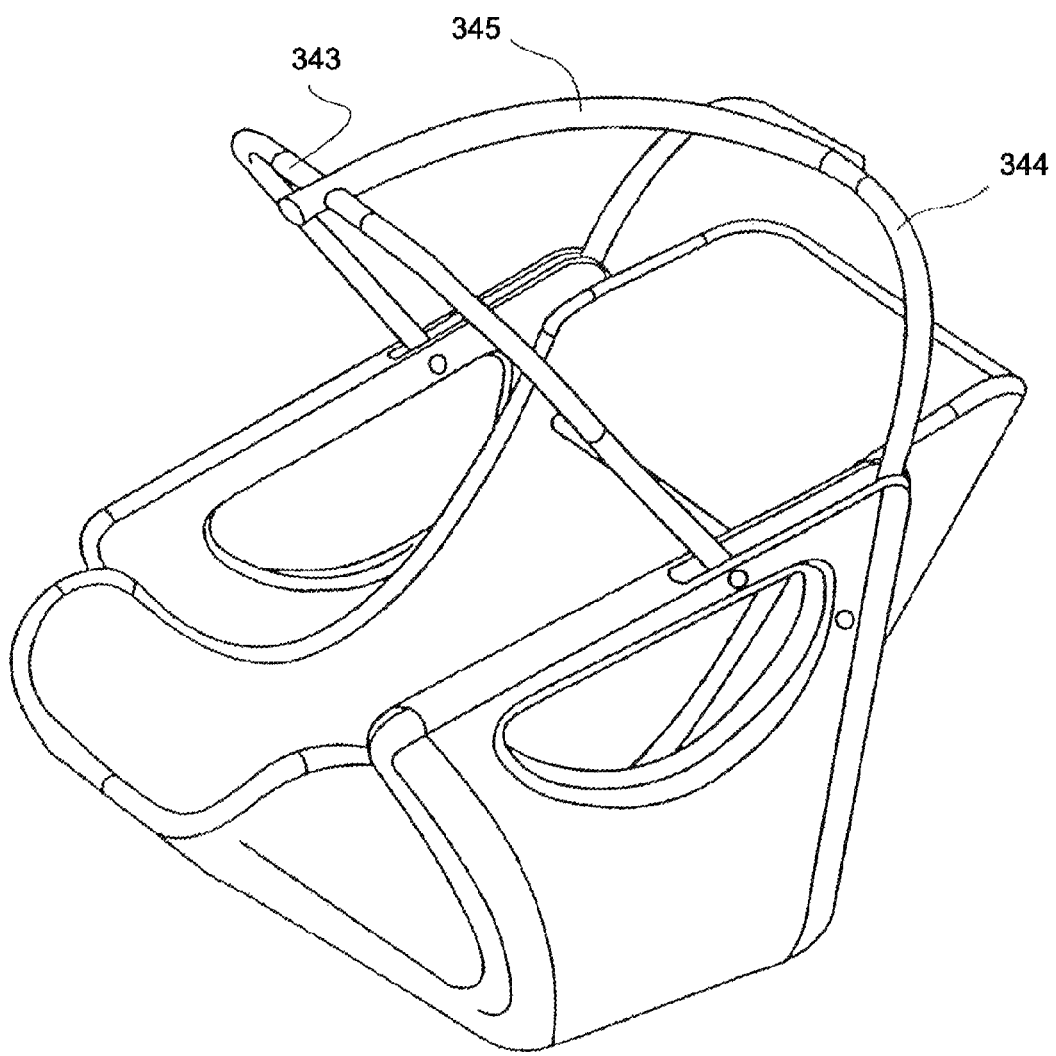
FIG. 23 is a perspective view of a child restraint including an ergonomic handle in a fully deployed position according to an embodiment of the invention.

FIG. 23 shows an isometric view or the handle invention in its fully deployed state, with handle span 345 and pivot links 343 and 344. Also, the invention allows for the integration of a sun shade that conveniently deploys along with the handle, thus saving steps for the user. The sun shade would cover the space under handle 345 in between links 343 and 344. In contrast to existing prior art designs which integrate a sun shade with the handle, the design allows for the shade to stow behind the restraint (in the region 6 in FIG. 20) instead of having to fold up completely around the top restraint rim.

Figure 24:
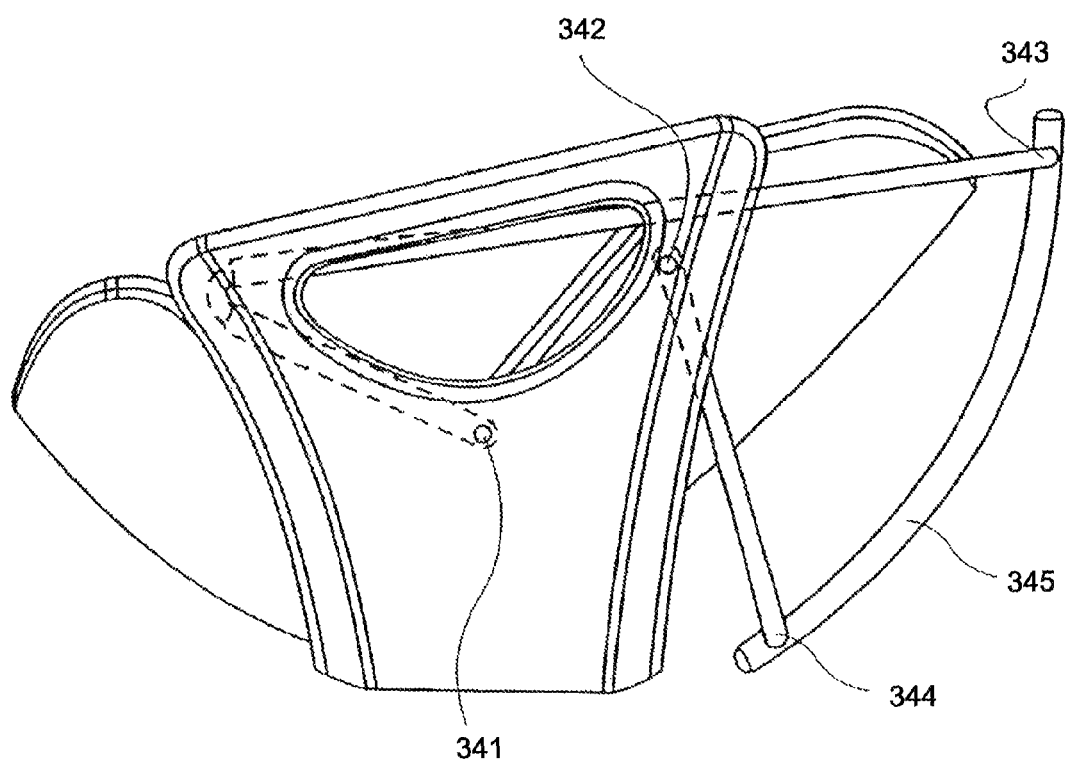
FIGS. 24-27 are side elevation views of a child restraint including an ergonomic handle according to an embodiment of the invention showing a 4-bar linkage in a stowed position, two partially deployed positions, and a fully deployed position, respectively.
Figure 25:
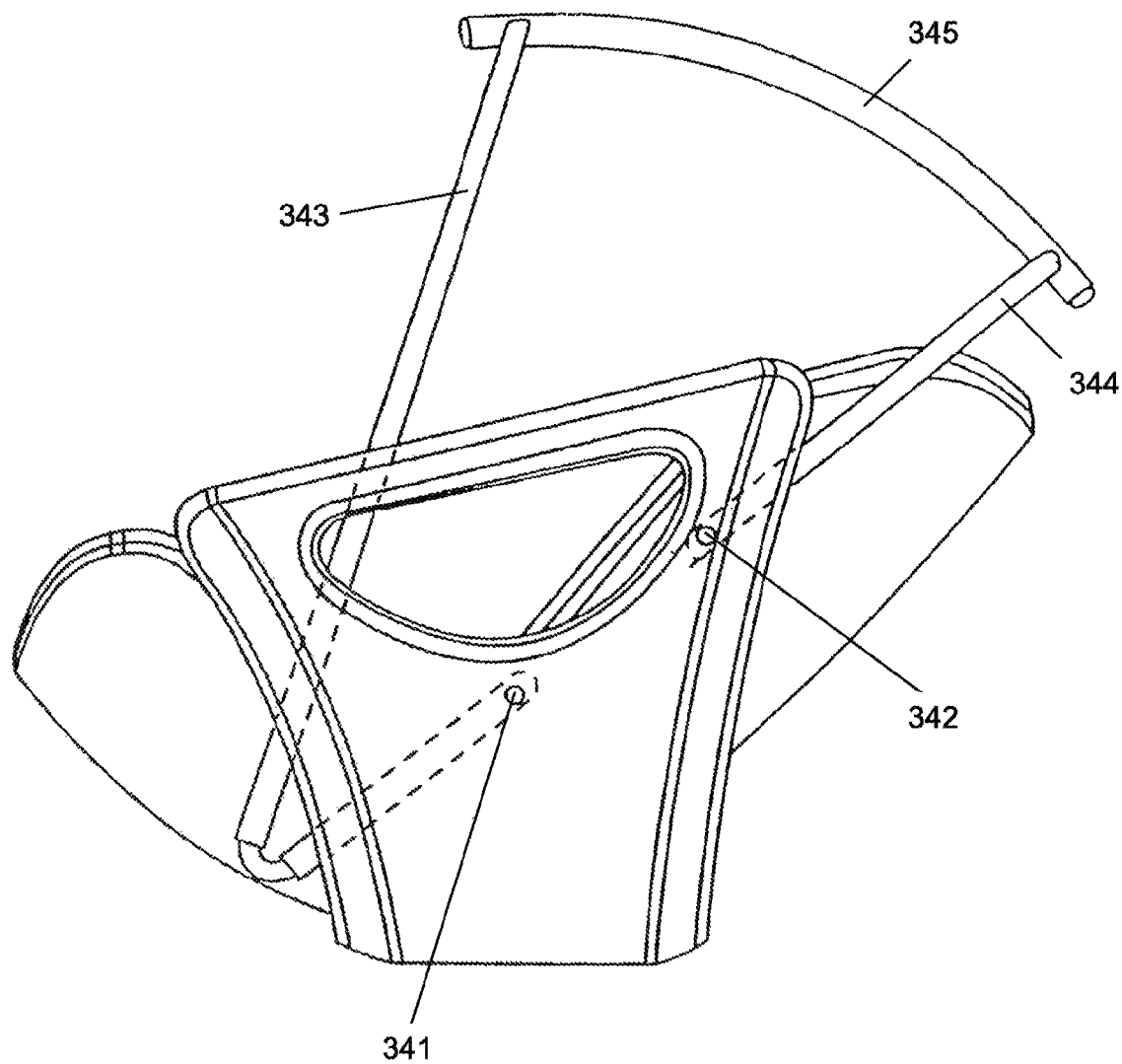
Figure 26:
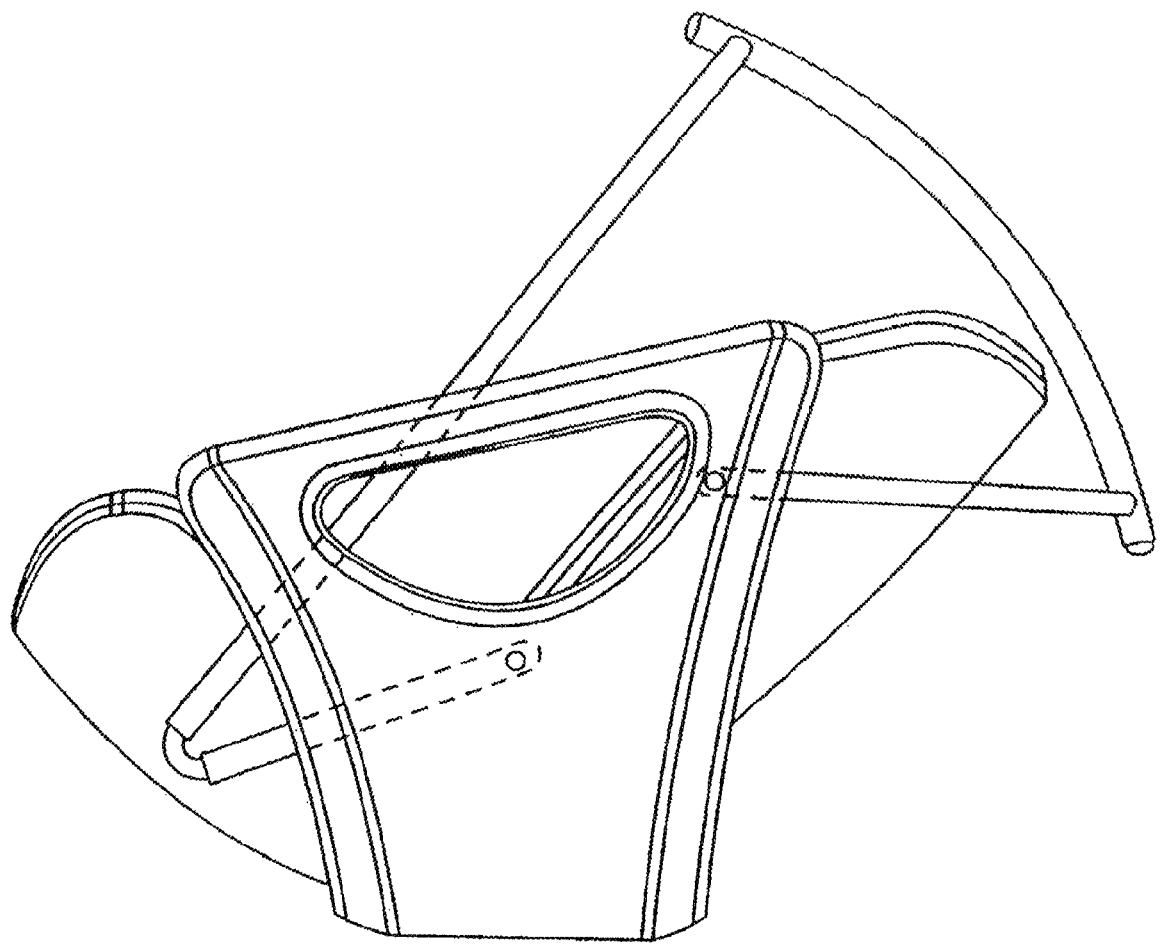
Figure 27:
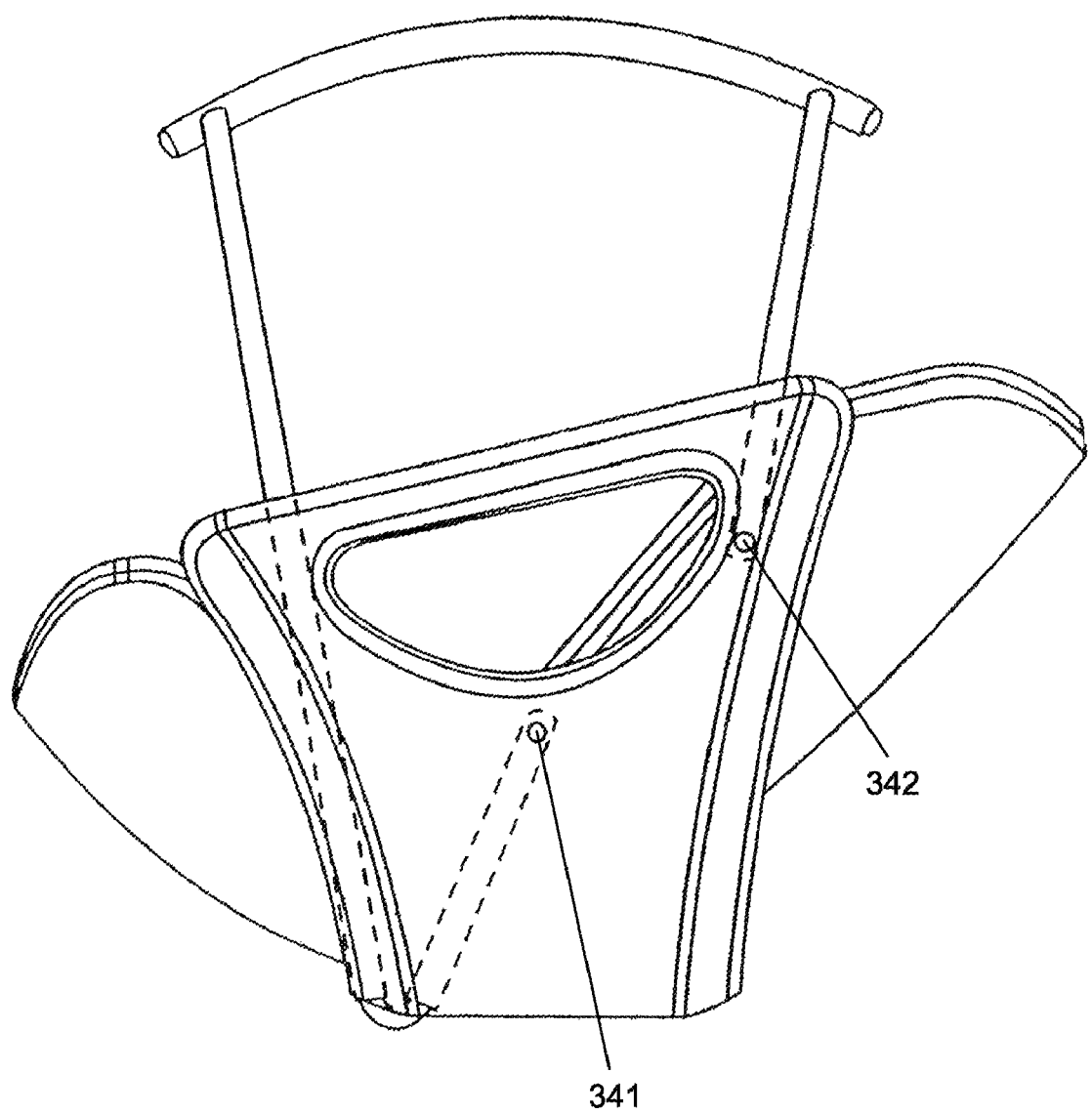
Figure 28:
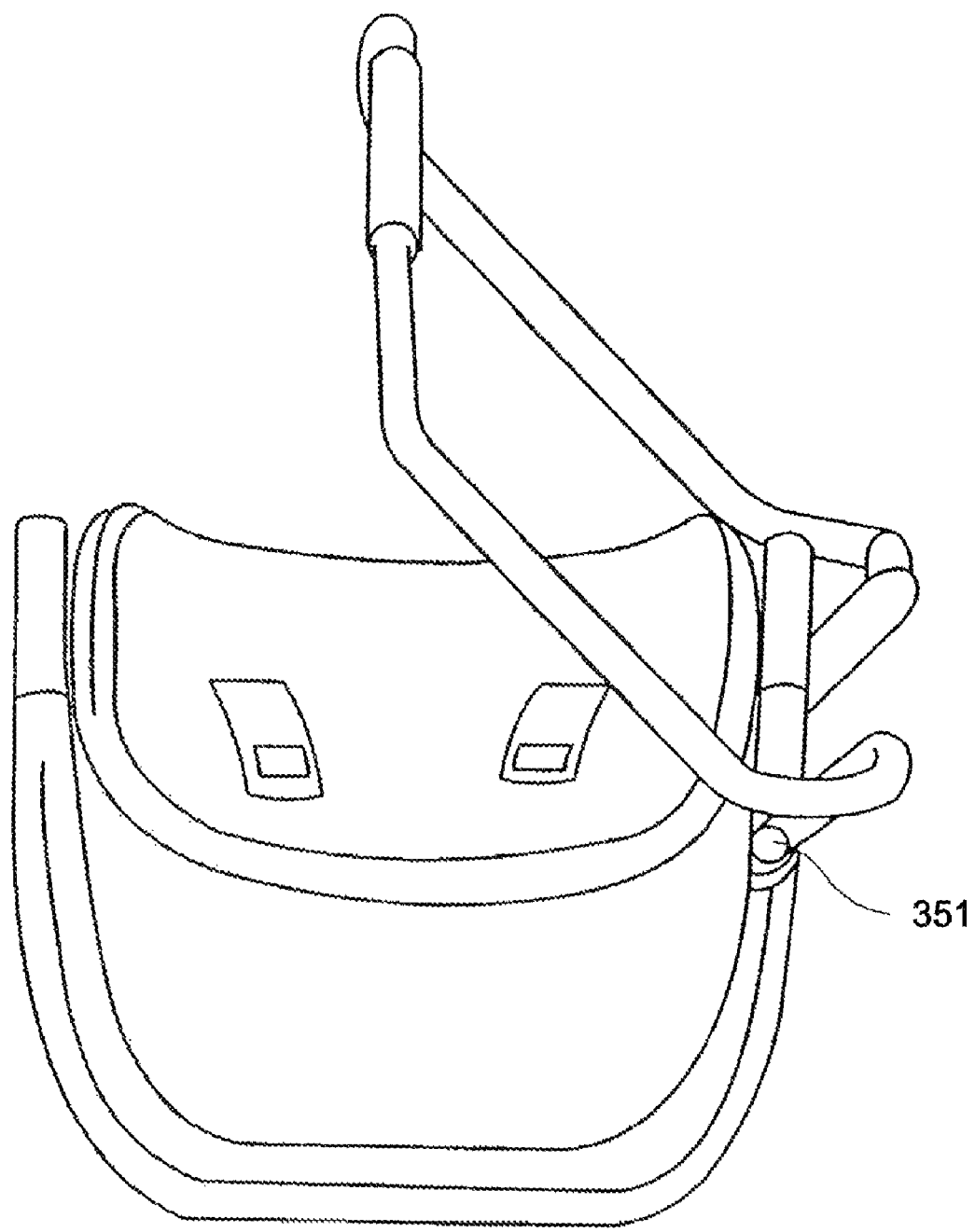
FIG. 28 is an end elevation view of a child restraint including an ergonomic handle according to another embodiment of the invention.
Figure 29:
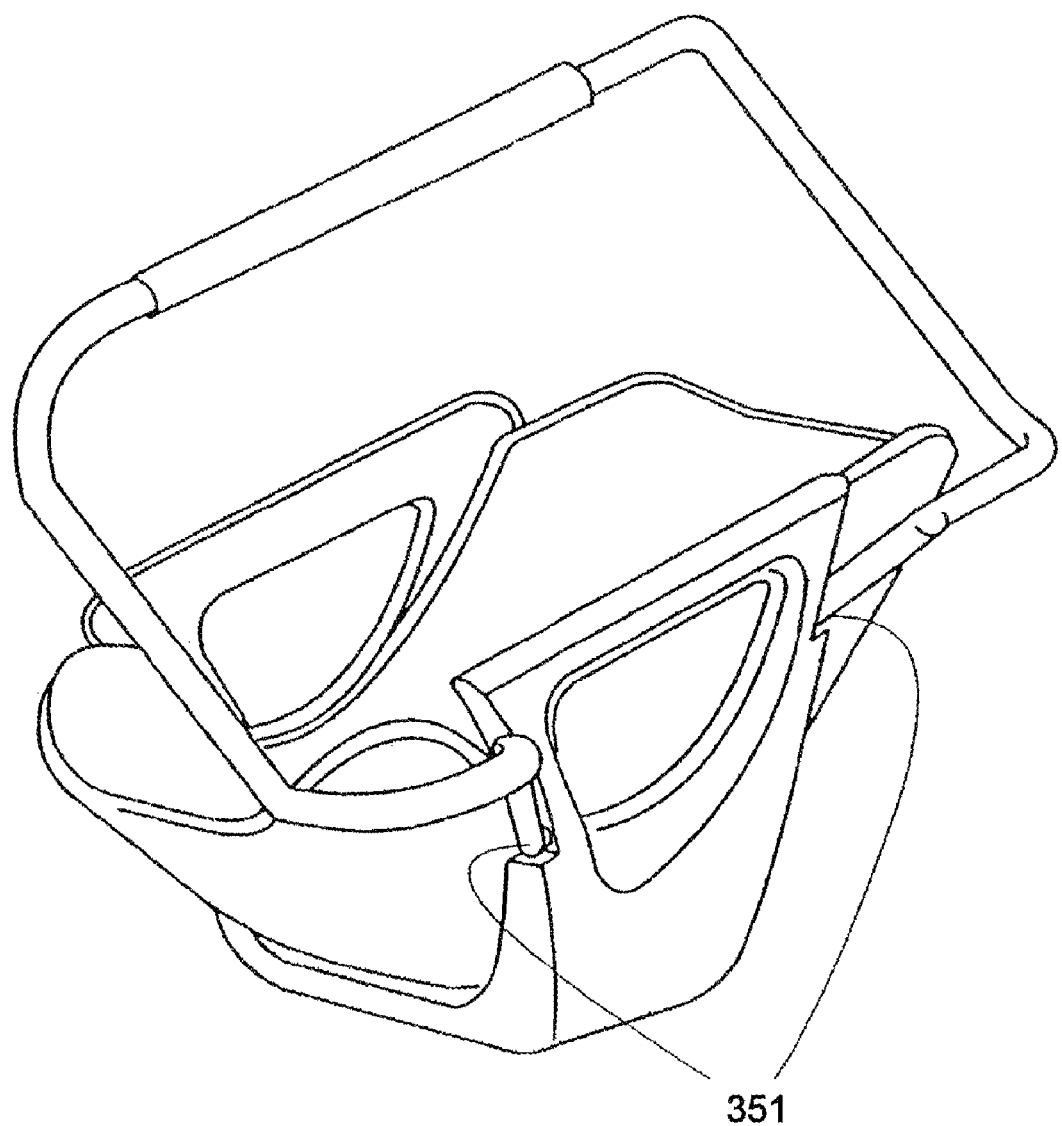
FIGS. 29 and 30 are perspective views of the embodiment of FIG. 28.
Figure 30:
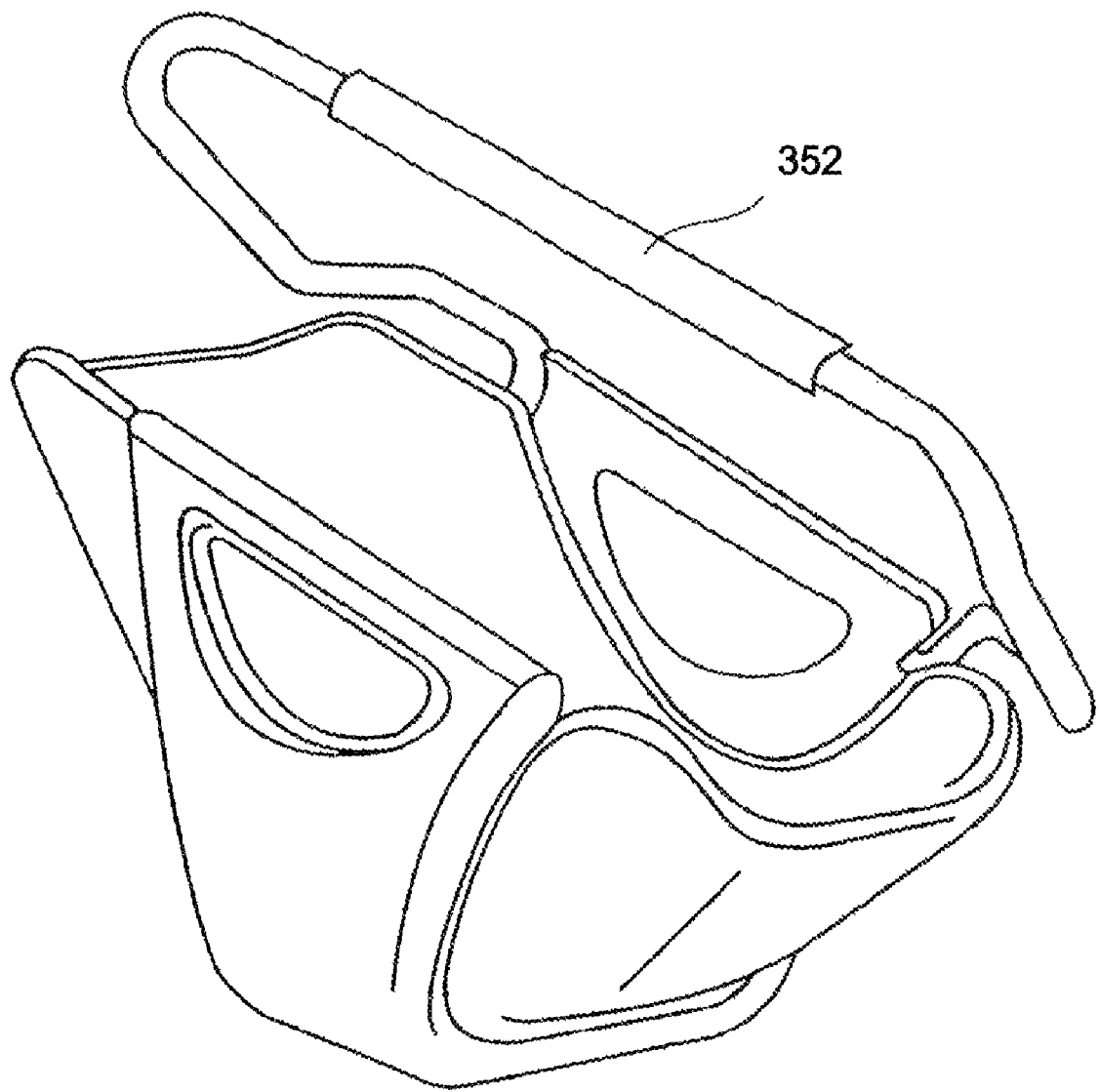
Figure 31:
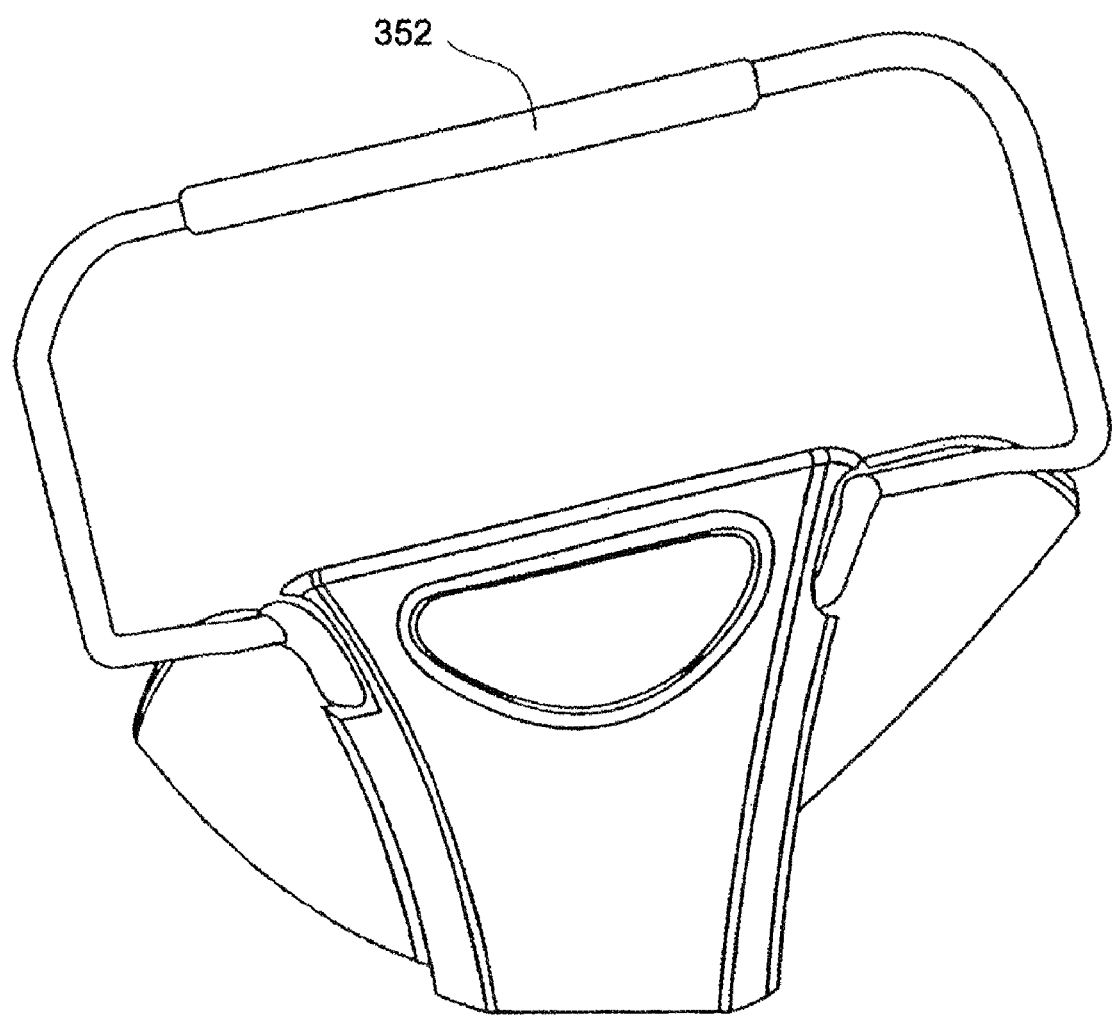
FIG. 31 is a side elevation view of the embodiment of FIG. 28.
Figure 32:
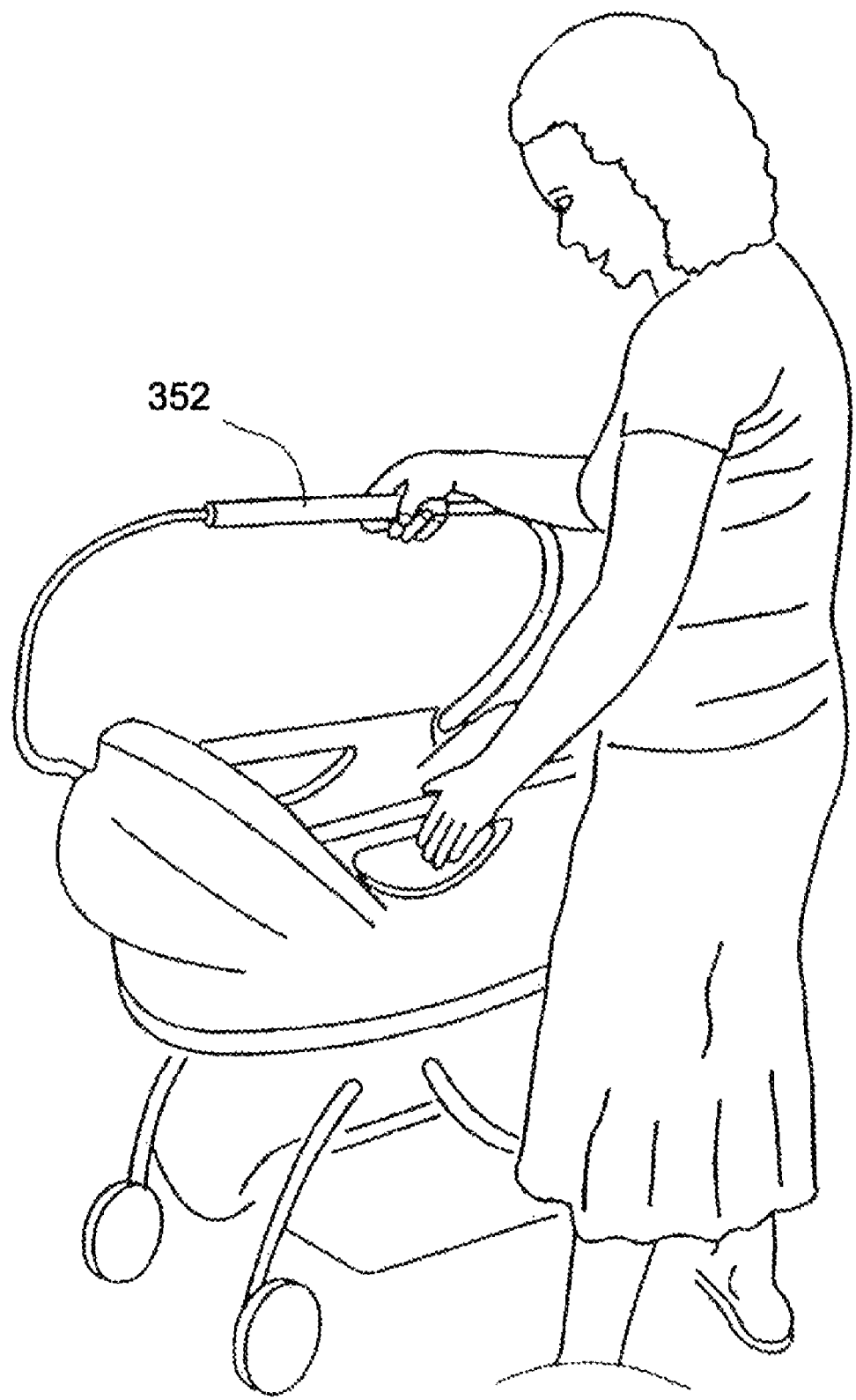
FIG. 32 is an example of the embodiment of FIG. 28 in use.

FIG. 24 illustrates an alternative 4-bar linkage in stowed position, with pivots 341, 342, 343, and 344, and handle span 345. FIG. 25 shows the handle partially deployed, and it can be seen that link 341 is bent. FIG. 26 shows the handle partially deployed. FIG. 27 shows the handle fully-deployed, with links 341 and 342 in a more upright position than in the previous iteration. Alternate ways to achieve the extended ergonomic longitudinal handle orientation include:

A handle which pivots on one side of the restraint and loops around the perimeter of the restraint upper rim. FIG. 28 shows an end elevation view that illustrates how the handle would pivot at location 351 until the handle span reaches the center longitudinal line. FIGS. 29 and 30 show isometric views to further explain this invention variation, with pivot locations 351 and handle spans 352. FIG. 31 is a side elevation view of the handle span 352. FIG. 32 shows a prototype of this invention variation with handle span 352.

Figure 33:
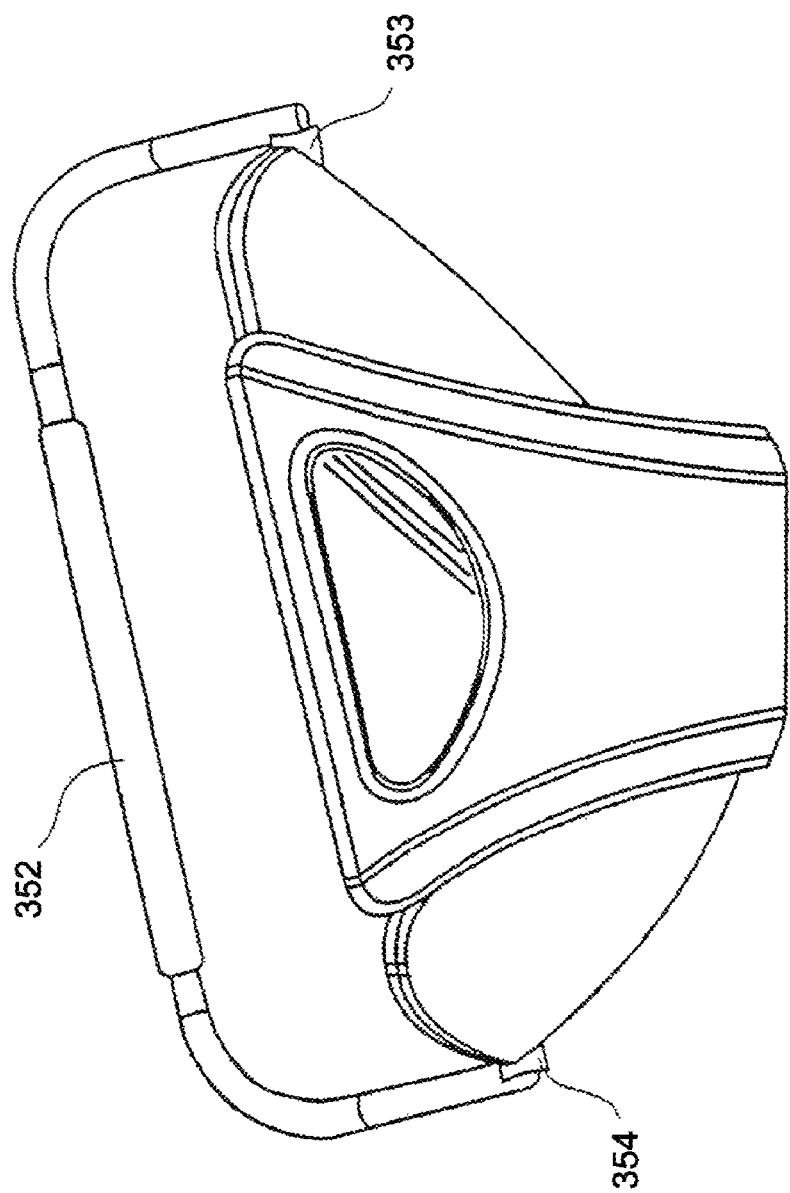
FIGS. 33 and 34 are side elevation and perspective views, respectively, of a child restraint including an ergonomic handle according to still another embodiment of the invention.
Figure 34:
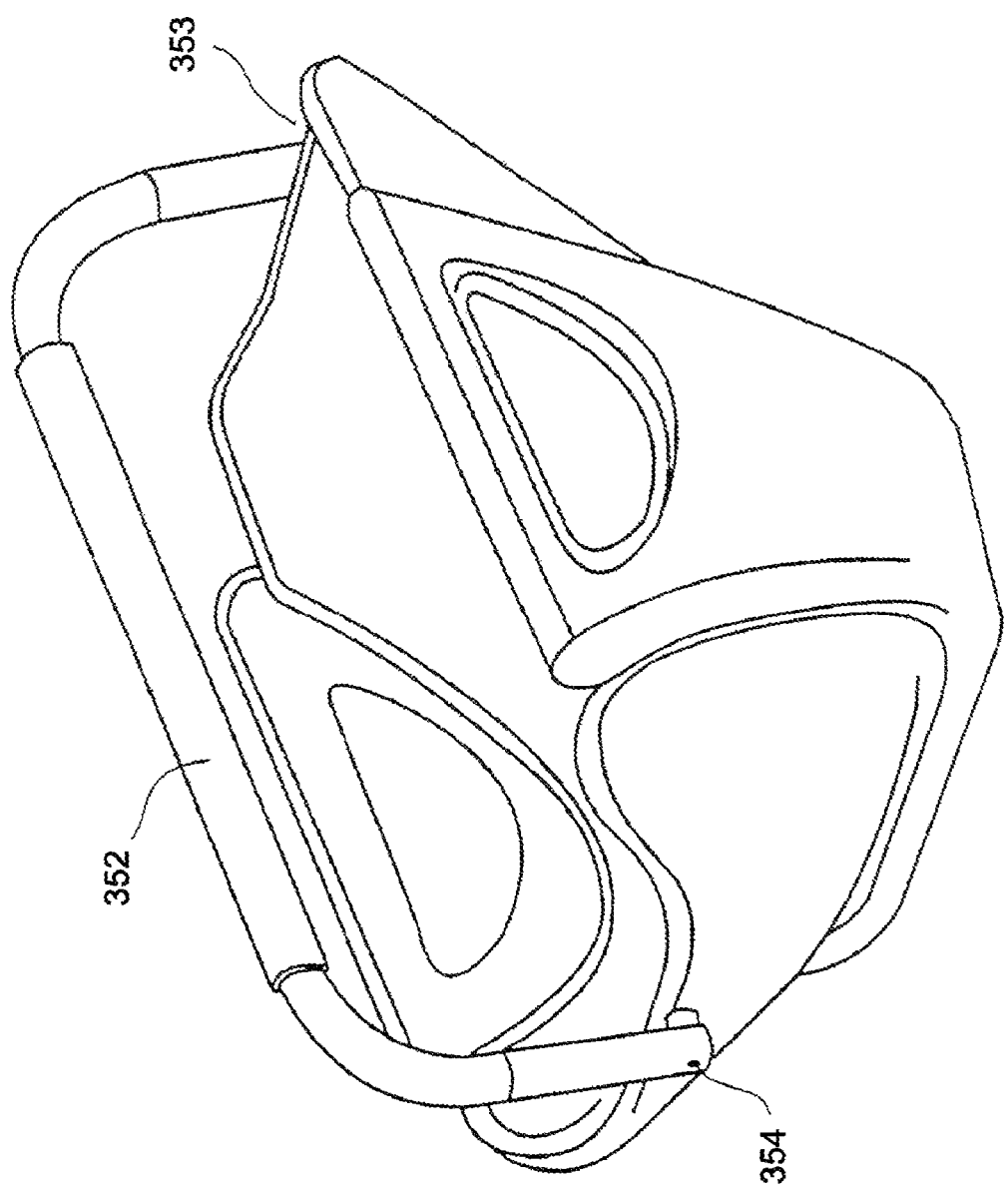

FIGS. 33 and 34 illustrate a handle loop 352 that pivots along the center longitudinal axis at both the top 353 and bottom 354 areas of the restraint perimeter rim.

Figure 35:
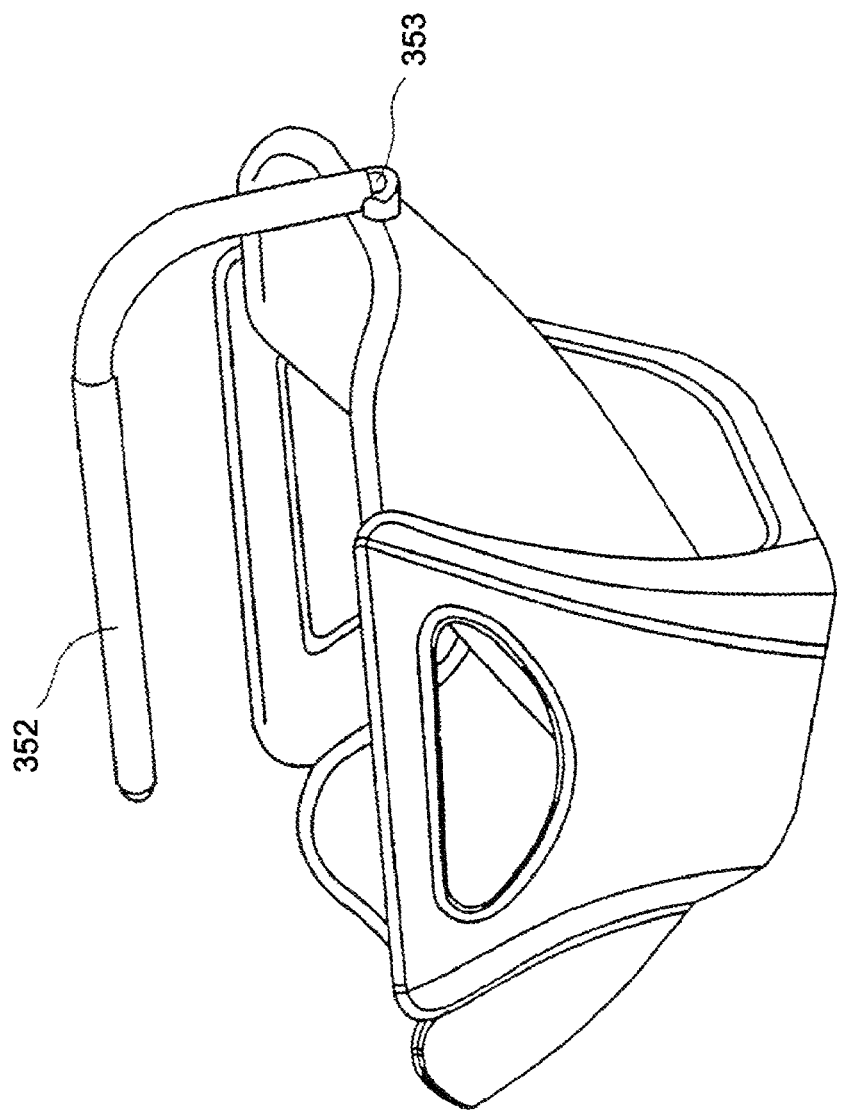
FIGS. 35 and 36 are perspective views of a child restraint including an ergonomic handle according to still another embodiment of the invention.
Figure 36:
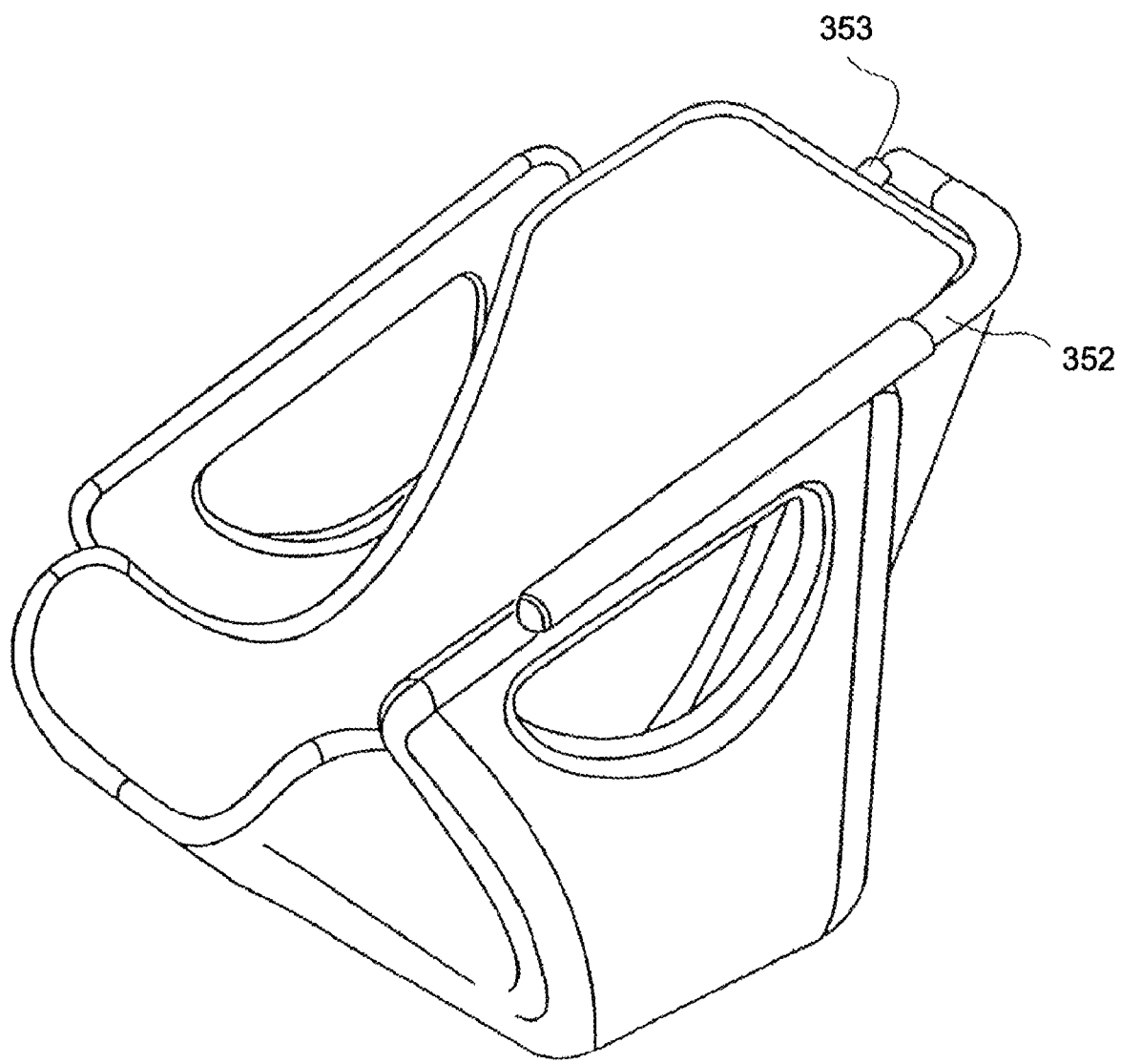

FIGS. 35 and 36 illustrate a handle span 352 that pivots along the center longitudinal axis at the top 353 areas of the restraint perimeter rim.

Figure 37:
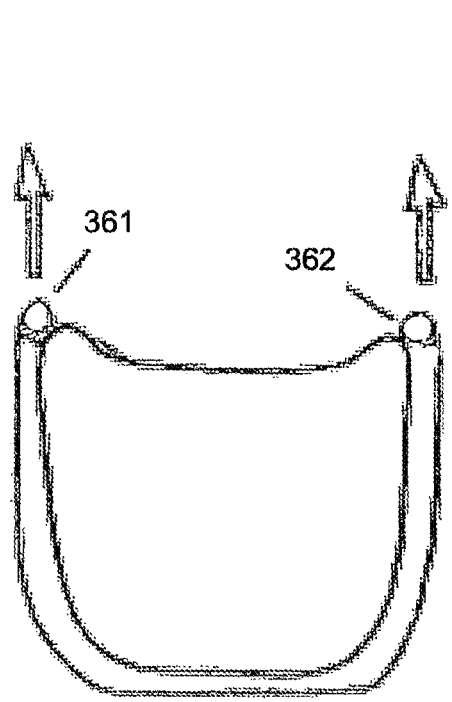
FIGS. 37-39 are end elevation views of a child restraint including an ergonomic handle according to still another embodiment of the invention showing the handle in several positions.
Figure 38:
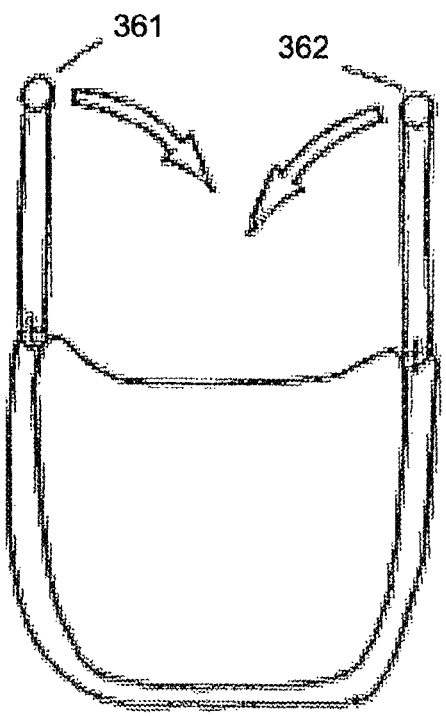
Figure 40:
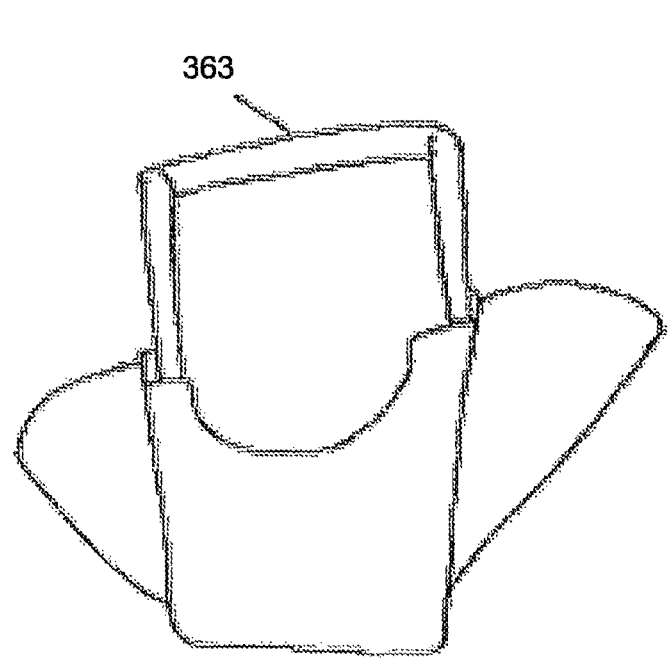
FIG. 40 is a side elevation view of the embodiment of FIGS. 37-39.
Figure 39:
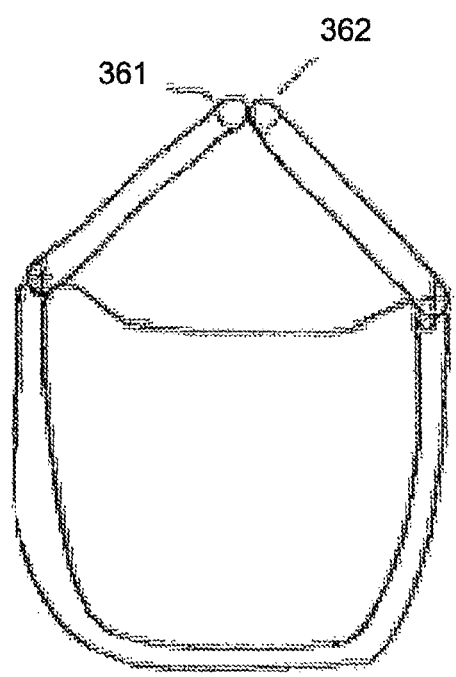

FIG. 37 illustrates a handle system where the two halves of the handle, 361 and 362, extend upward from the sides of the restraint, as shown in FIG. 38. Then, the handles pivot inward as shown in FIG. 39 and attach together to form the completed handle span. FIG. 40 shows a side elevation view of the completed handle span 363. This invention also allows for the convenient carrying of the restraint by two people if they each grab one of the handles 361 or 362 in FIG. 38.

Figure 41:
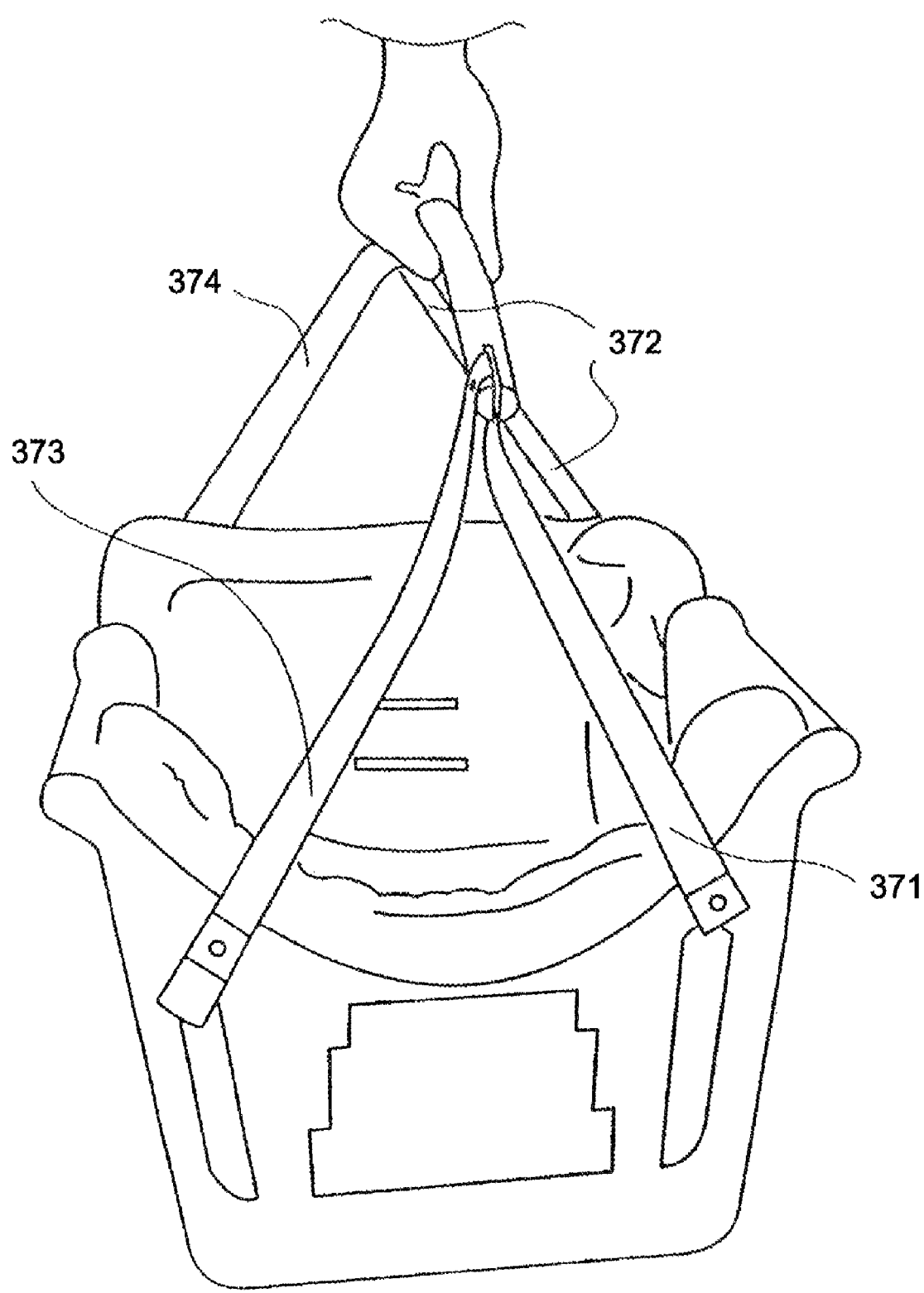
FIGS. 41 and 42 are perspective views of a child restraint including an ergonomic handle according to still another embodiment of the invention.
Figure 42:
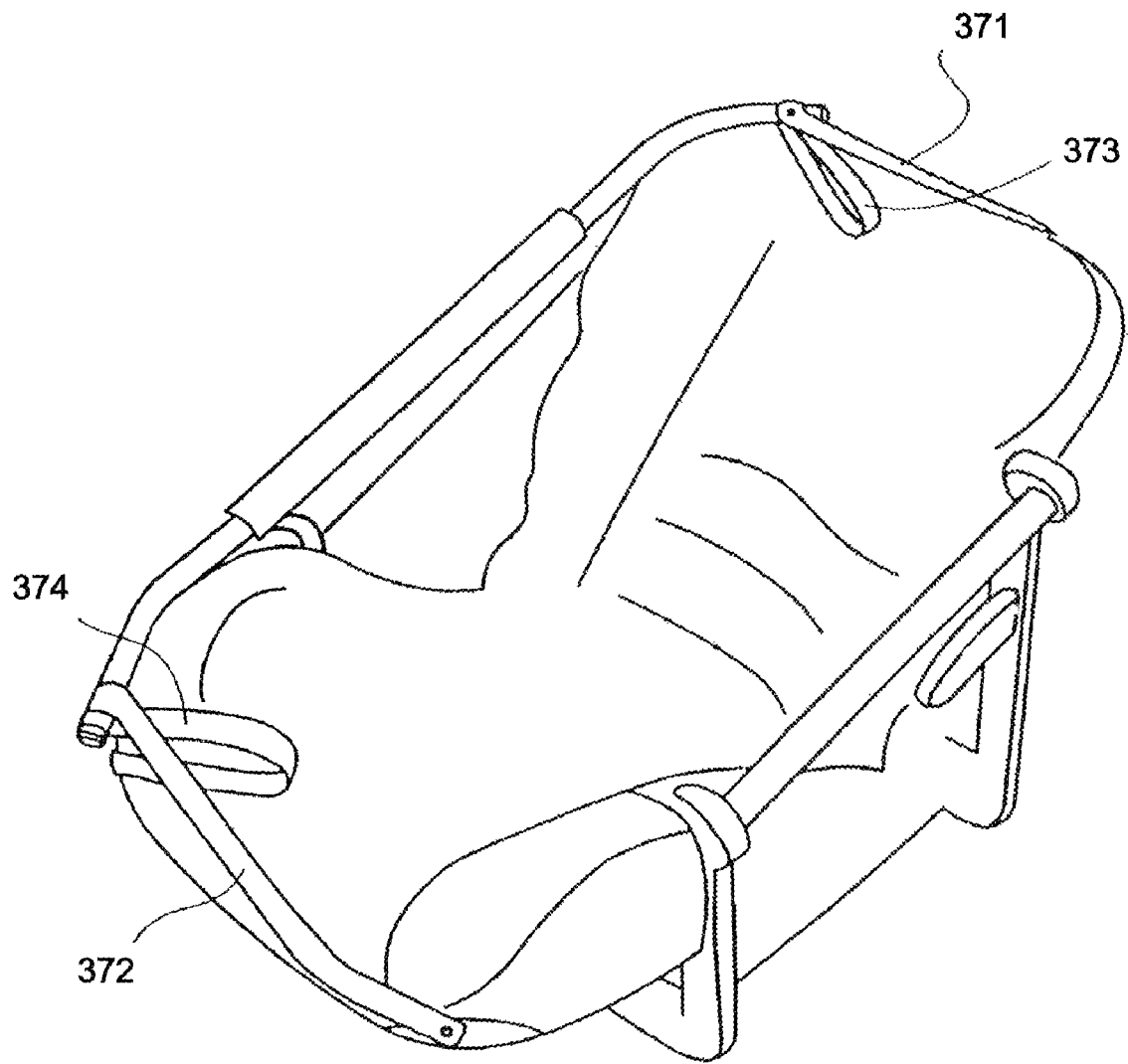

FIG. 41 shows an alternate embodiment where the long longitudinal handle has semi rigid pieces 371 and 372, and soft pieces 373 and 374 attached at either end. These semi rigid pieces 371 and 372 (made out of materials with spring to them, such as various plastics or spring steel), allow the handle to be folded up into the use position, but will also force the handle back down into a stowed position after the user lets go of the handle, as shown in FIG. 42.

4. Easy to Use 5 Point Harness for Child Restraints that does not Requiring Threading of Child Limbs Through Harness Loops Harnesses for child restraints have evolved from 3-point harnesses of the past. In 3-point systems, two points of attachments were at the child's shoulders, and the third attachment point was in the crotch area. In these systems, the harness typically folded over the child, pivoting at the two shoulder attachment areas, and a single buckle would attach at the crotch area. However, as with other restraint systems, people recognized that more attachment points equated to more security of harnessing and more distribution of load on the passenger. Since these imperatives are especially relevant to children, 5-point harnesses came into use for child restraints. In these systems, two additional points of attachment are added at either side of the child's mid-section or waist. The belt is continuous from the shoulder attachment to the waist attachment, resulting in two continuous loops of harness on either side of the child. These loops inflect or turn at a buckle; these two buckles together plug into the attachment at the crotch area. Additionally, there is typically a chest buckle to control the harnesses in that area. Current 5-point harnesses, while safer than older designs, are not convenient for parents to use. This is because a great deal of manual manipulation of the child is called for in order to thread their arms through the continuous loops of harness at either side.

The invention provides a new child restraint harness that allows for five points of attachment and also for greater ease of use. The five points of attachment refer to the number of places the harness is anchored or secured. The greater ease of use referred to results from not needing to thread any of the child's limbs through any loops of harness. This harness system will improve the security and ease of use of harnesses in children's car seats, infant carriers used as car restraints, carriers and bassinet type restraints that are not meant as in-car restraints, and child strollers.

The harness design is superior to existing harnesses that provide for at least five points of attachment because it:
  Does not require the user to thread the child's limbs through closed loops of harness when placing the child in the restraint;
  Opens up completely when the user wants to remove the child from the restraint;
  Causes less irritation to the child because there is less need for manipulating their limbs in use;
  Allows for the child's removal from the restraint without waking them up; and
  Encourages better regular harness usage due to the greater ease of use and the decrease in use burden.

The present invention provides a harness for holding children securely in child restraints. The harness is necessary for both catastrophic incidents such as vehicular collisions, and for regular movements of the restraint which might dislodge the child. Because the harness must be used every time the restraint is used, the impact of the harness on the comfort of both the child and the parent is very important. In a 5-point harness scheme where there are attachment points at the shoulders, waist, and crotch, the child's arms must be threaded through continuous loops of harness attached at the shoulder and waist. This procedure disturbs the child (especially for sleeping infants) and causes great difficulty of use for the parent using the harness.

The invention provides the same security of a conventional 5-point harness without the need to thread any of the child's limbs. The invention retains the same level of security because the invention has an equal number of attachment points (five), thereby having an equal distribution of forces across the child's body. The invention achieves the ability to eliminate limb threading by having the harness swing over the child's head. The harness then attaches at the three lower points of attachment at the waist and crotch.

Figure 43:
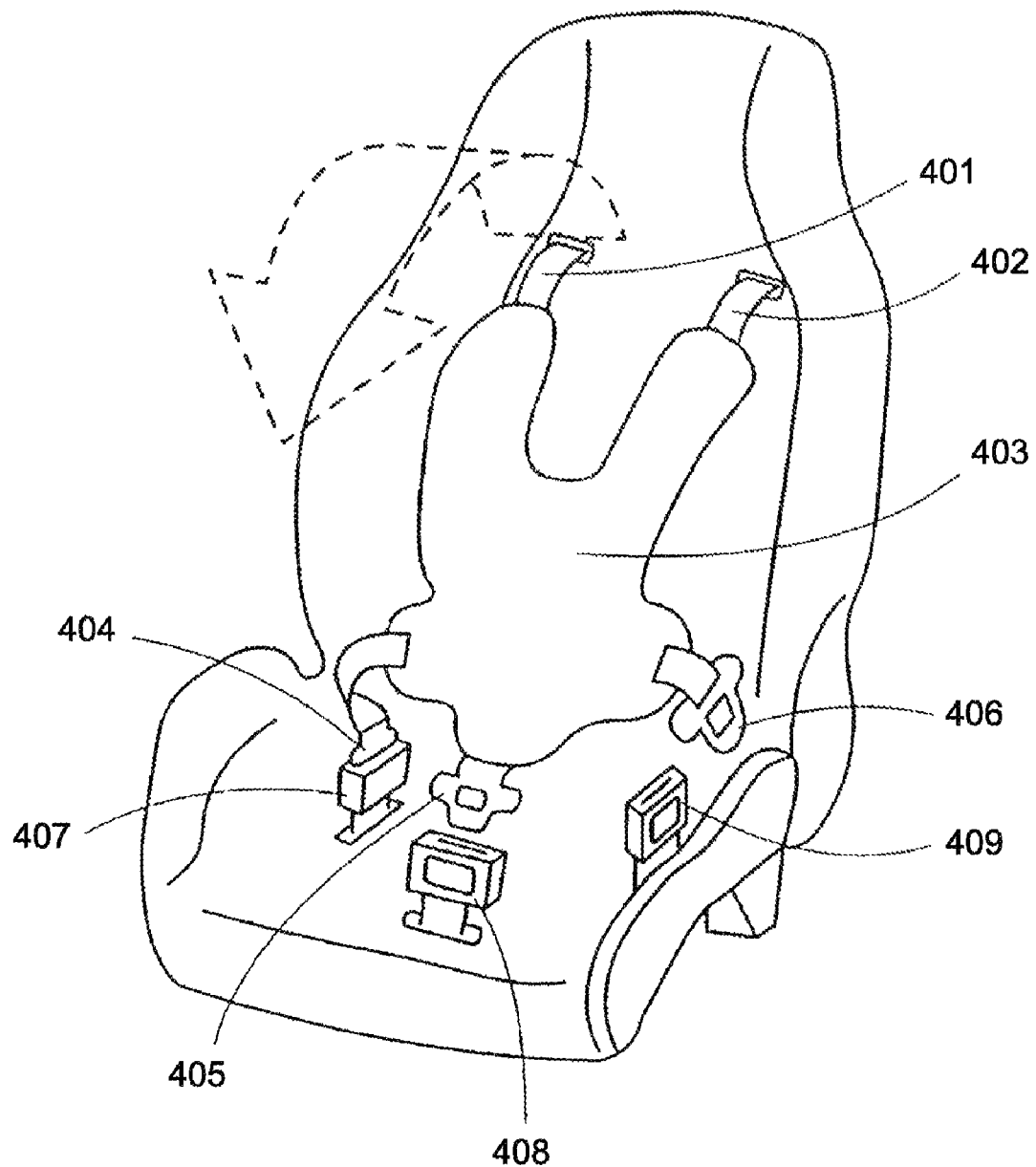
FIG. 43 is a perspective view of a 5-point harness for a child restraint according to an embodiment of the invention.

FIG. 43 shows how the harness invention swings over the child and attach. Harness sections 401 and 402 are located at the child's shoulder height; their positions are adjustable to account for different sized children and child growth. The harness fixture pad 403 swings over the child's head. Male buckles 04, 405, and 406 plug into matched female buckles 407, 408, and 409.

Figure 44:
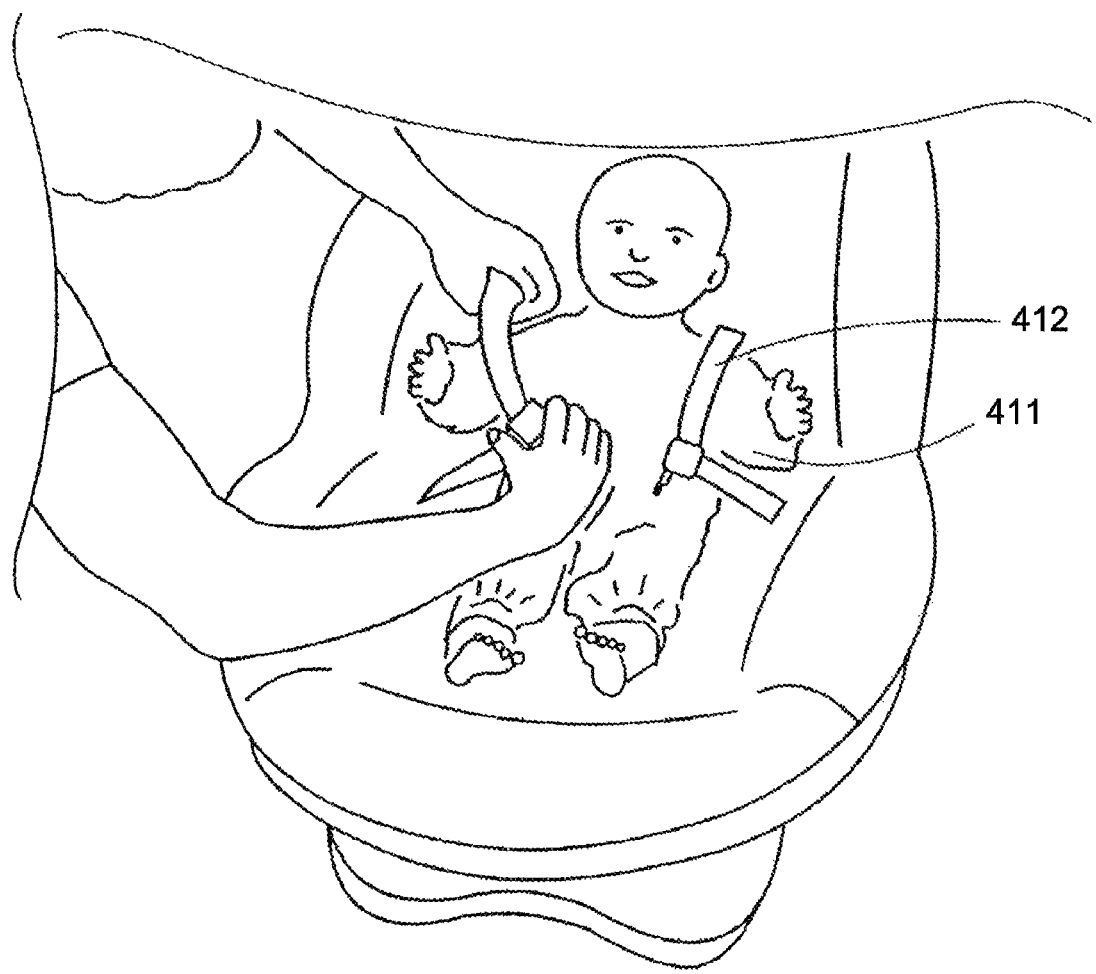
FIG. 44 illustrates the need for limb threading when using a 5-point harness according to the prior art.

FIG. 44 shows how existing harnesses, according to the prior art, require limb threading. Left arm 411 is underneath harness loop 412.

Figures 45, 46:
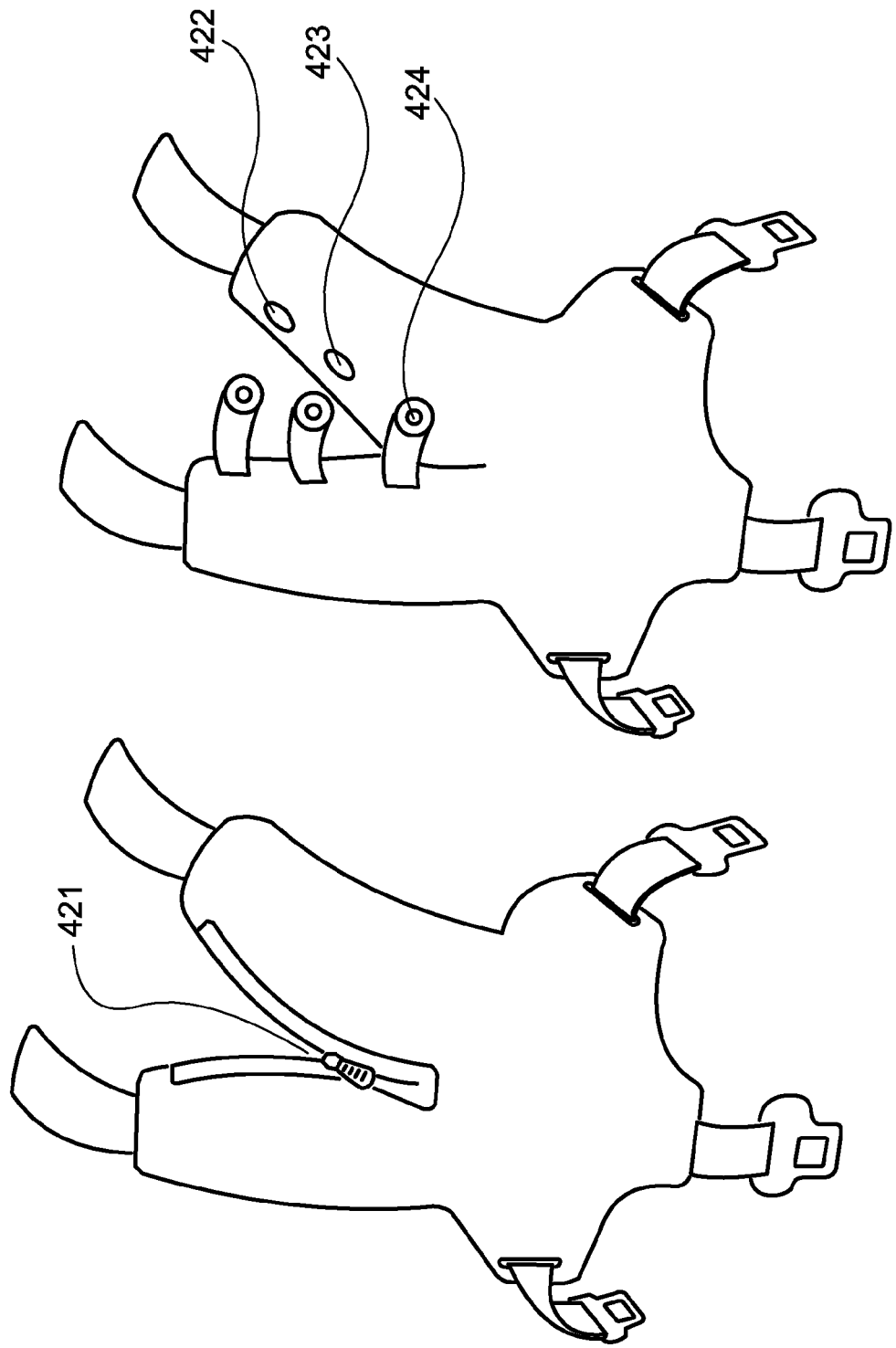
FIGS. 45 and 46 are perspective views of alternative closures for a harness according to embodiments of the invention.

FIG. 45 illustrates using a zipper to close the chest area gap of the harness fixture pad for a more ergonomic shoulder fit. Zipper 421 latches upward to decrease the open space in the chest area. Alternative means for achieving this reduction of chest gap area can employ any other mechanical closure type, including buttons, clips (commonly referred to as "fastex" buckles), hook and loop closures (commonly referred to as "Velcro"), string or laces, and wire. FIG. 46 illustrates one alternative where buttons 22, 423, and 424 snap to close the chest space.

Figure 47:
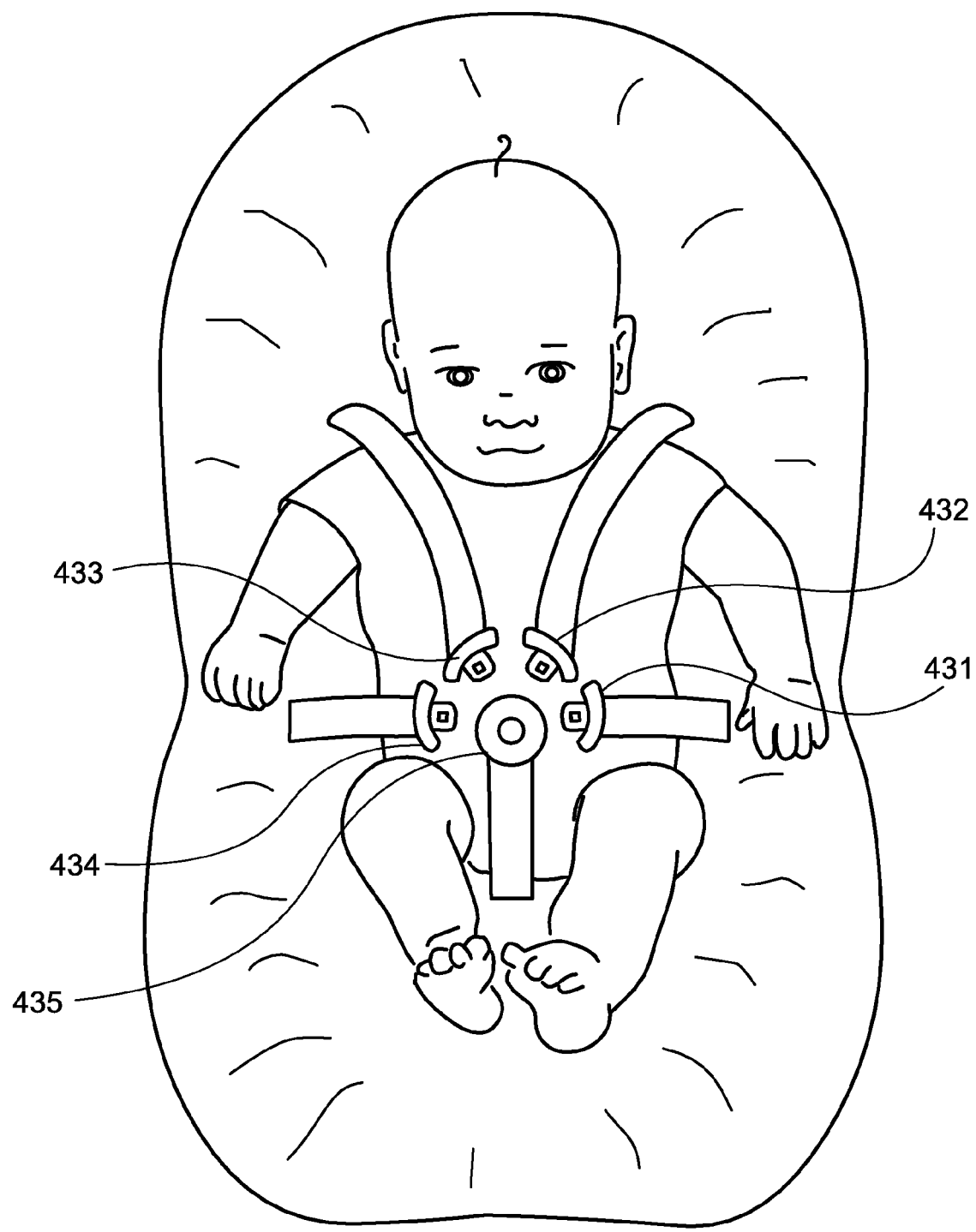
FIG. 47 is a top plan view of a 5-point harness for a child restraint according to another embodiment of the invention.

FIG. 47 shows an alternate embodiment of the invention that also does not require limb threading. In this embodiment, straps 31, 432, 433, and 434 (attaching at both waist and shoulder attachment points) all buckle into a central receiving buckle 435 attached to the crotch. This gives the parent the advantage of securing the harness through a series of simple maneuvers not involving limb threading, instead of fewer but more complicated maneuvers that do involve limb threading.

5. 7-Point Harness for Child Restraints

Harnesses for child restraints have evolved from 3-point harnesses of the past. In 3-point systems, two points of attachments were at the child's shoulders, and the third attachment point was in the crotch area. In these systems, the harness typically folded over the child, pivoting at the two shoulder attachment areas, and a single buckle would attach at the crotch area.

However, as with other restraint systems, people recognized that more attachment points equated to more security of harnessing and more distribution of load on the passenger. Since these imperatives are especially relevant to children, 5-point harnesses came into use for child restraints. In these systems, two additional points of attachment are added at either side of the child's mid-section or waist. The belt is continuous from the shoulder attachment to the waist attachment, resulting in two continuous loops of harness on either side of the child. These loops inflect or turn at a buckle; these two buckles together plug into the attachment at the crotch area. Additionally, there is typically a chest buckle to control the harnesses in that area. Current 5-point harnesses, while safer than older designs, are not convenient for parents to use. This is because a great deal of manual manipulation of the child is called for in order to thread their arms through the continuous loops of harness at either side.

A new child restraint harness of the invention allows for seven points of attachment and also for greater ease of use. The seven points of attachment refer to the number of places the harness is anchored or secured. The greater ease of use referred to results from not needing to thread any of the child's limbs through any loops of harness. This harness system will improve the security and ease of use of harnesses in children's car seats, infant carriers used as car restraints, carriers and bassinet type restraints that are not meant as in-car restraints, and child strollers.

The harness design is superior to existing harnesses that provide for at least five points of attachment because it:
  Does not require the user to thread the child's limbs through closed loops of harness when placing the child in the restraint;
  Opens up completely when the user wants to remove the child from the restraint;
  Causes less irritation to the child because there is less need for manipulating their limbs in use;
  Allows for the child's removal from the restraint without waking them up;
  Encourages better regular harness usage due to the greater ease of use and the decrease in use burden; and
  Spreads the load that the harness transmits to the child more evenly across his or her body.

The present invention provides a harness for holding children securely in child restraints. The harness is necessary for both catastrophic incidents such as vehicular collisions, and for regular movements of the restraint which might dislodge the child. Because harnesses must be used every time the restraint is used, the harnesses impact on the comfort of both the child and the parent is very important. In a 5-point harness scheme where there are attachment points at the shoulders, waist, and crotch, the child's arms must be threaded through continuous loops of harness attached at the shoulder and waist. This procedure disturbs the child (especially for sleeping infants) and causes great difficulty of use for the parent using the harness.

The invention improves upon the state of the art by having more attachment points to spread the load of any restraint movement over more of the child's body. The invention accomplishes this by adding two additional points of attachment in addition to the five normally used. These two points exist at the chest or armpit areas of the child. Also, the invention does not require the threading of the child's limbs through enclosed loops of the harness.

Figure 48:
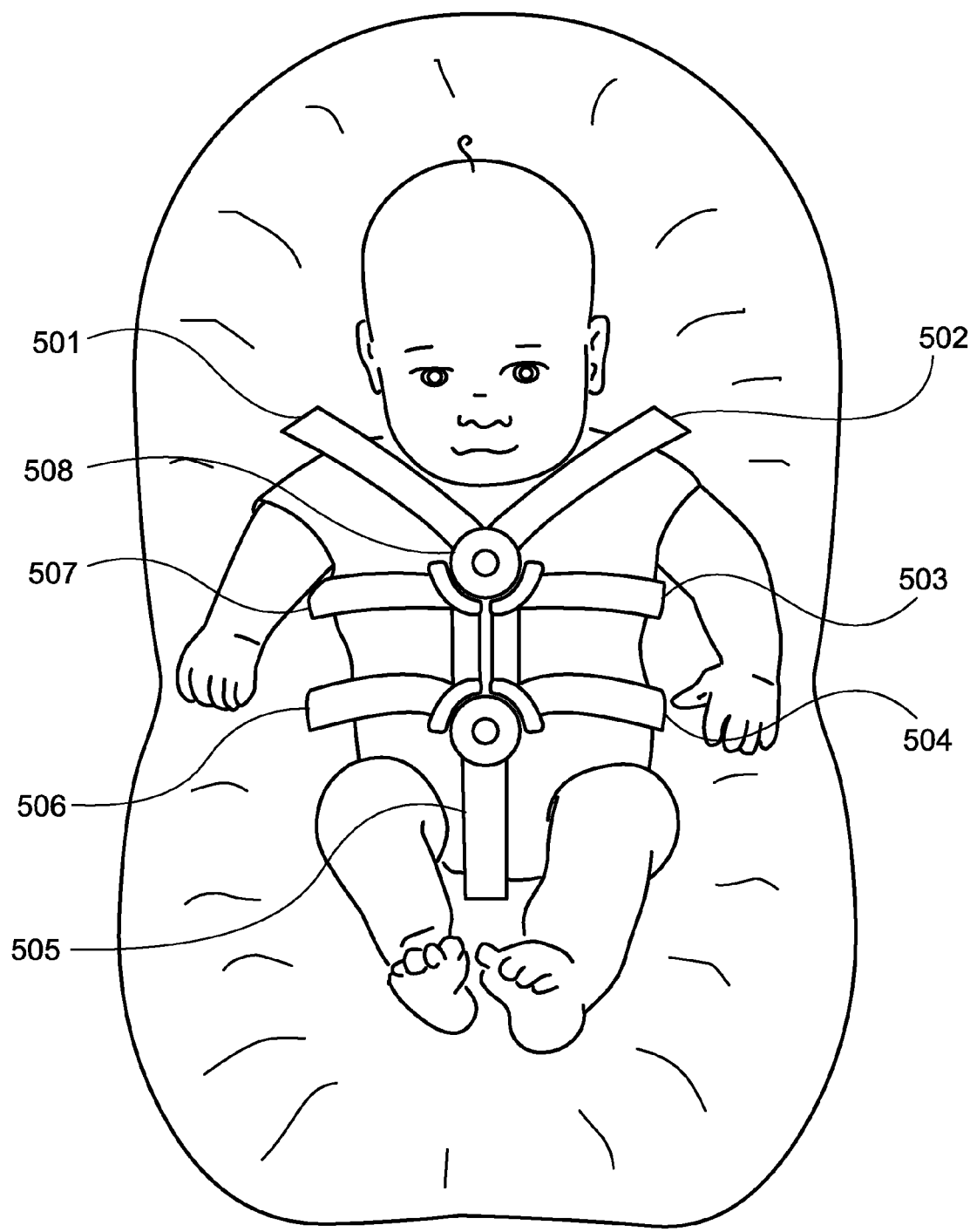
FIG. 48 is a top plan view of a 7-point harness for a child restraint according to an embodiment of the invention.

FIG. 48 shows how the harness invention will attach around the child with seven points of attachment: harness ends 501, 502, 503, 504, 505, 506, and 507 anchor into the child restraint. Schematically, existing five point child restraint harnesses do not include attachment points at harness ends 503 and 507. In FIG. 48, harness ends 501 and 502 terminate together at the connected location 508.

Figure 49:
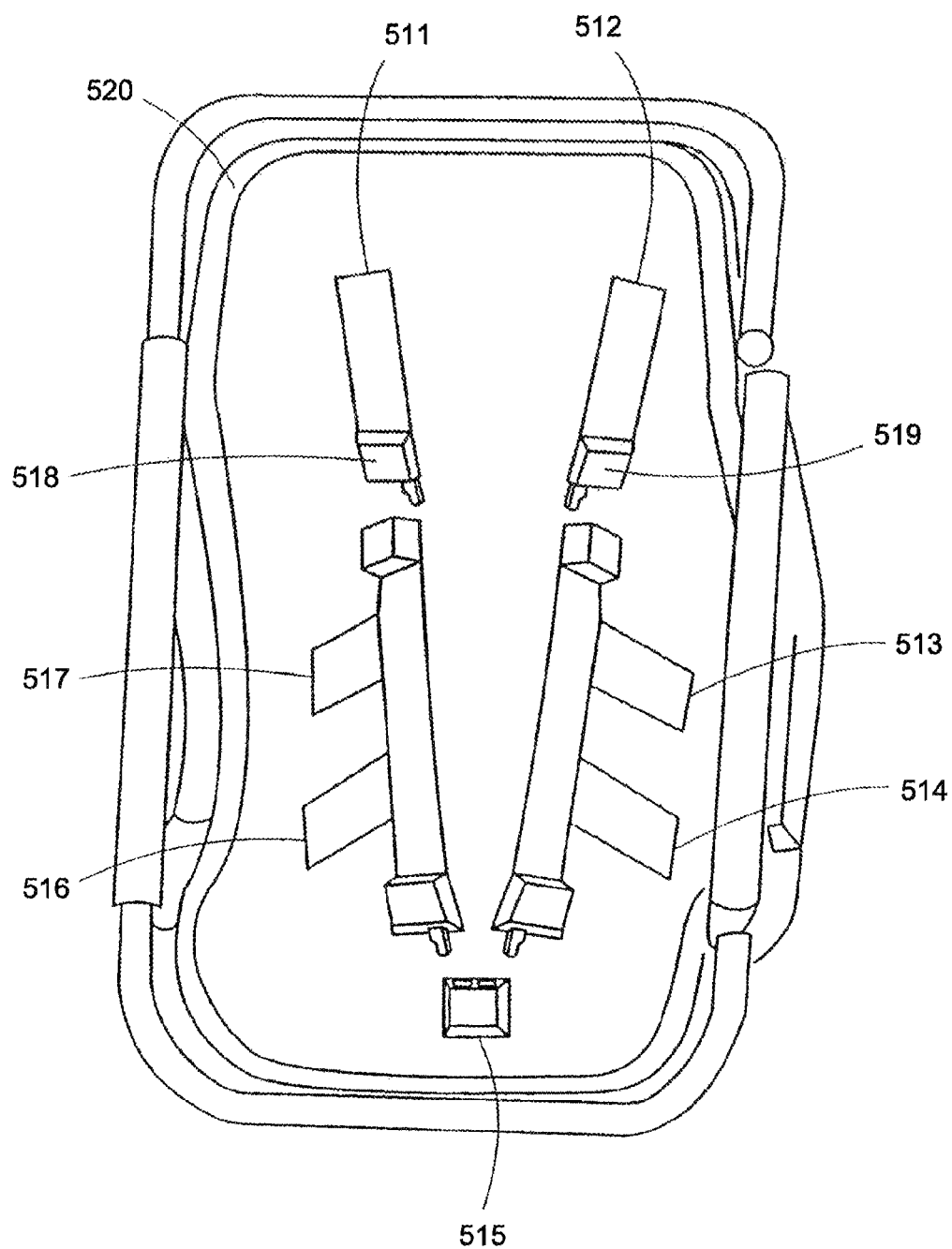
FIG. 49 is a perspective view of a 7-point harness for a child restraint according to an embodiment of the invention.

FIG. 49 again illustrates the seven points of attachment, but here harness ends 511, 512, 513, 514, 515, 516, and 517 clearly attach to the overall restraint structure 520. Also, FIG. 49 shows how the terminations 518 and 519 of harness ends 511 and 512 can disconnect for ease of placement and removal of the child. In this scheme, not only is there no limb threading required, but the child's head also does not need to be threaded through closed harness loops. This is because 518 and 519 can be placed besides the child's head and reconnected at the child's chest level.

Figure 50:
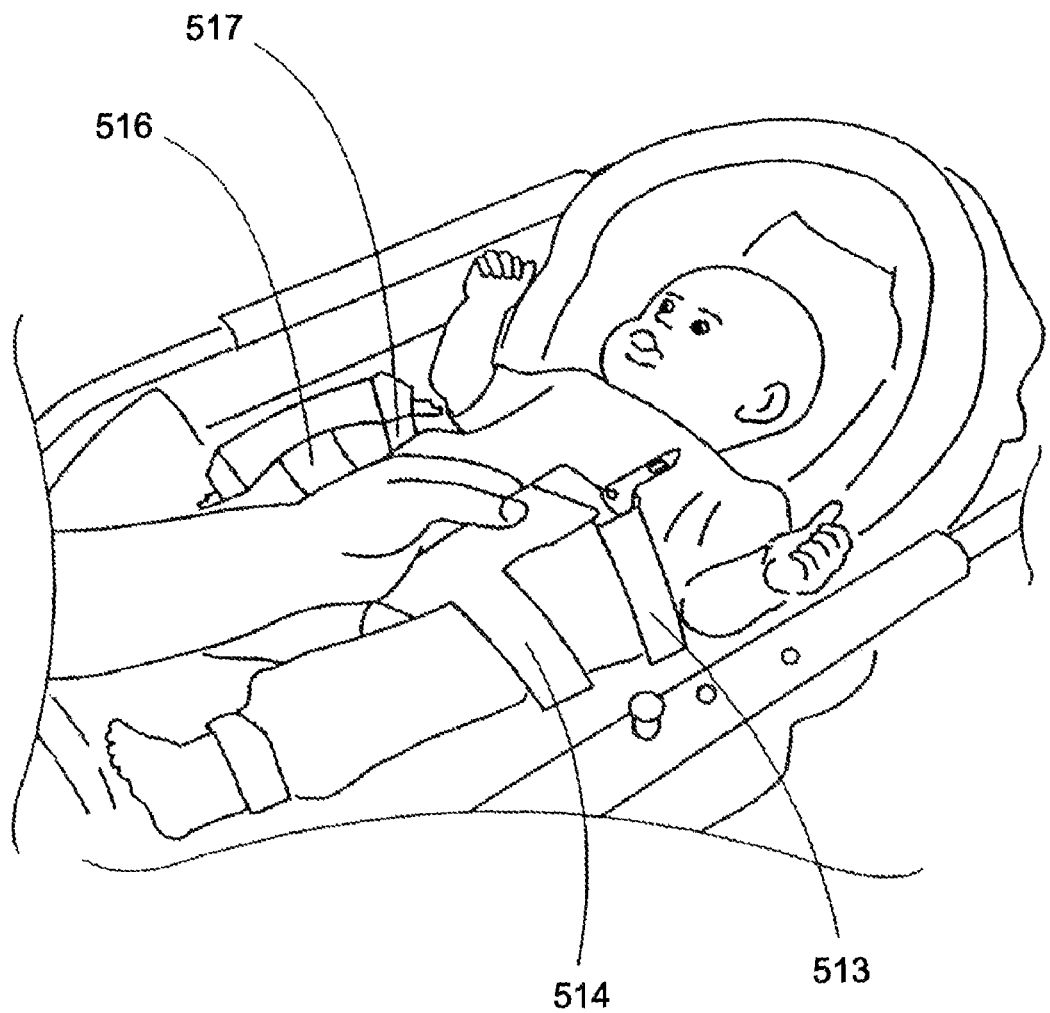
FIGS. 50 and 51 are perspective and top plan views, respectively, of a 7-point harness according to an embodiment of the invention as used to restrain a child within a child restraint.
Figure 51:
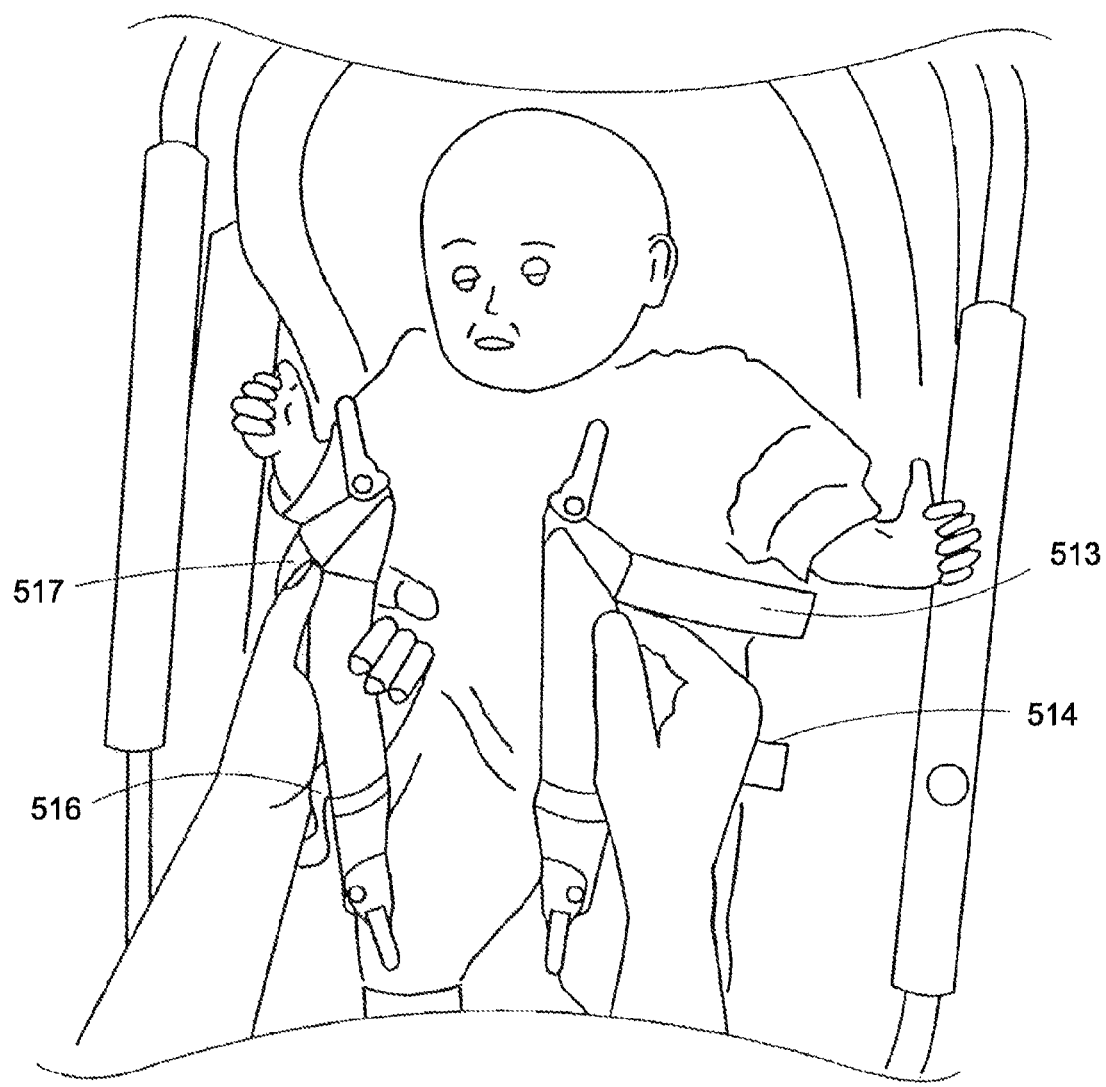

FIGS. 50 and 51 show how the child restraint harness can attach around a child without requiring the threading of limbs through harness straps. In these figures, the securing of the child across the torso is illustrated-securing of the child with harness ends 513, 514, 516, and 517 does not require passing of limbs through enclosed harness loops.

FIG. 52 illustrates the unbuckled schematic of the harness invention. Harness ends 531, 532, 533, 534, 535, 536, and 537 are labeled for reference. Harness buckles 538 and 539 are connected with buckle 544, either by placing 538 and 539 together first or by connecting 538 and 539 independently to 544. Buckles 540 and 541 connect to buckles 544 and 543, respectively. Buckle 542 connects also connects to buckle 543. As can be seen, at no point in this overall buckling action does any part of the child need to be threaded through and enclosed loop of harness. FIG. 53 illustrates one alternate way to achieve the seven points of attachment by swinging a harness loop over the child's head. Harness ends 531, 532, 533, 534, 535, 536, and 537 are labeled for reference. Harness ends 531 and 532 terminate together and connect at buckle 558, forming a loop.

Figure 54:
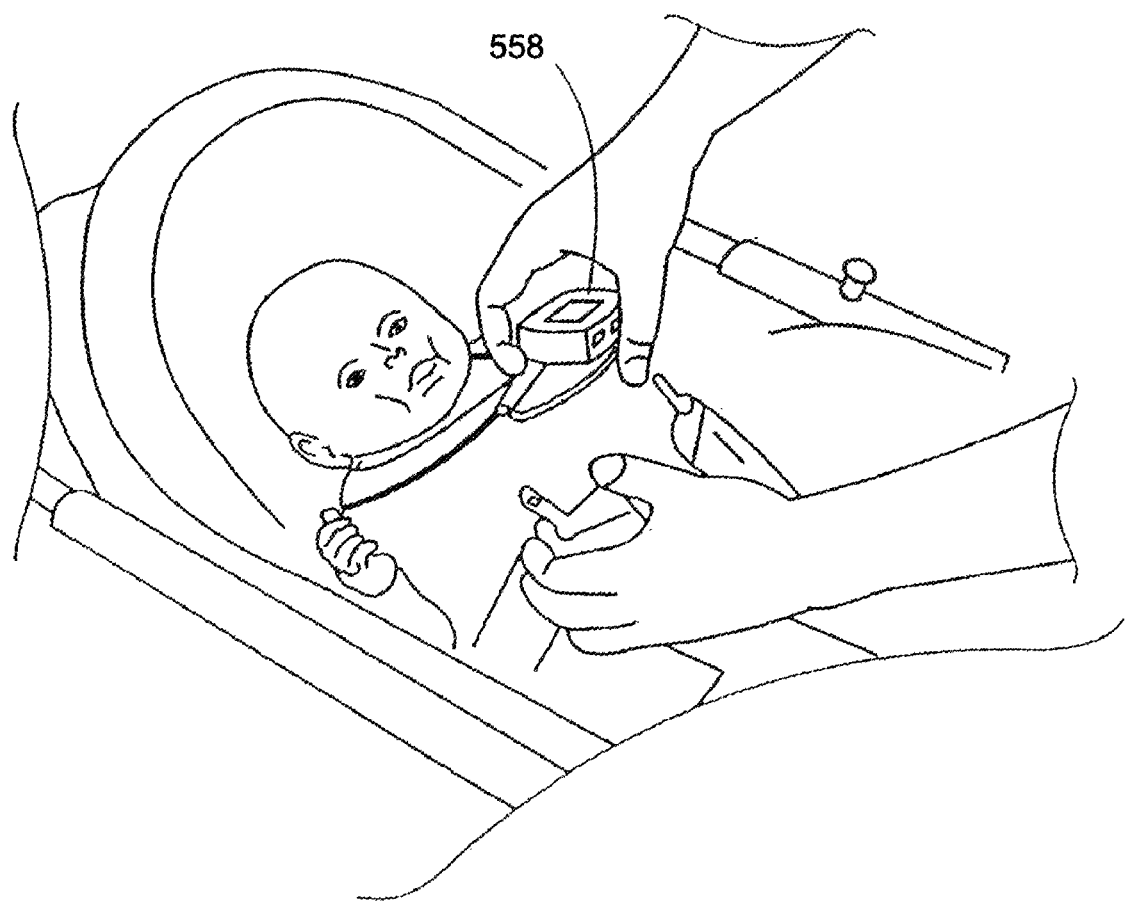
FIG. 54 is a perspective view of a 7-point harness according to an embodiment of the invention as used to restrain a child within a child restraint.

FIG. 54 shows how buckle 558 is passed over the child's head in the process of securing the child to the restraint. This saves steps in the process of securing the child to the restraint.

6. Child Restraint with Dual Integrated Handles

There are many child restraints on the market, especially of the type that users install as accessories in a car and are not built-in to the vehicle by the vehicle manufacturer. Of these, one type commonly referred to as "infant car seats" or "infant carriers" can be removed from the vehicle without uninstalling the base to which they attach. These restraints commonly have a carrying handle that allows parents to pick them up and carry them. Larger child restraints (for example for toddlers) typically do not incorporate any form of handle. Also, all of the restraint handle structures are actively deploying and cannot be used unless folded out.

A new child restraint handle system of the invention incorporates integrated handles on the sides of the restraint that allow handling, manipulation, and carrying of the restraint comfortably and without deploying an extra handle. The invention involves side handles built into the sides of a restraint. The handle design is superior because it:

Places handles on the main restraint structure itself, instead of on a separate articulated member that must be deployed in order to be used;
Puts longitudinal handles on both sides of the restraint;
Provides two handles;
Puts both handles near the center of the restraint;
Allows the user to handle the restraint without deploying a separate handle; and
Allows two users to jointly carrying the restraint in between both of them.

Figure 55:
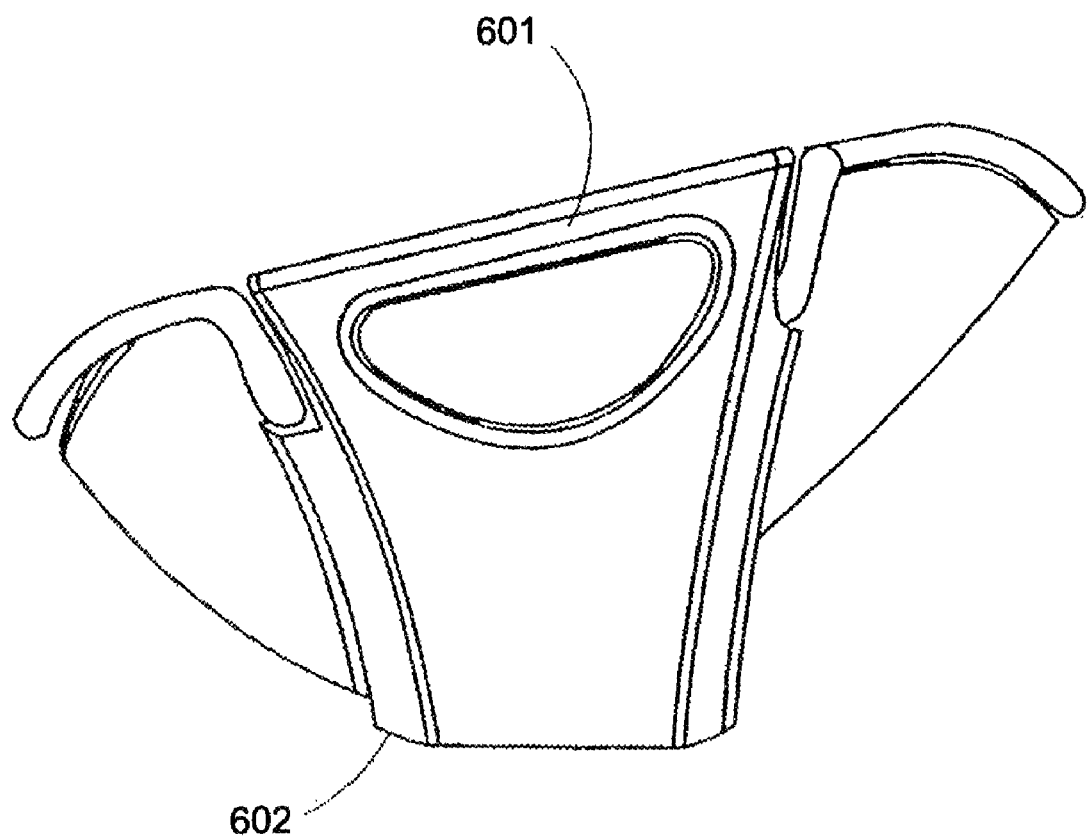
FIGS. 55 and 56 are side elevation and perspective views, respectively, of a child restraint comprising dual handles according to an embodiment of the invention.

FIG. 55 explains the handle orientation scheme referring to herein. Left handle 601 is integrated into, and connected to, the overall restraint structure 602. By bridging the center of the restraint, the handle allows the user to control the restraint near its, and the child's, center of gravity. Also, by having handles always available on both sides of the restraint, the user can grab, maneuver, and or adjust the restraint with more access and flexibility.

Figure 56:
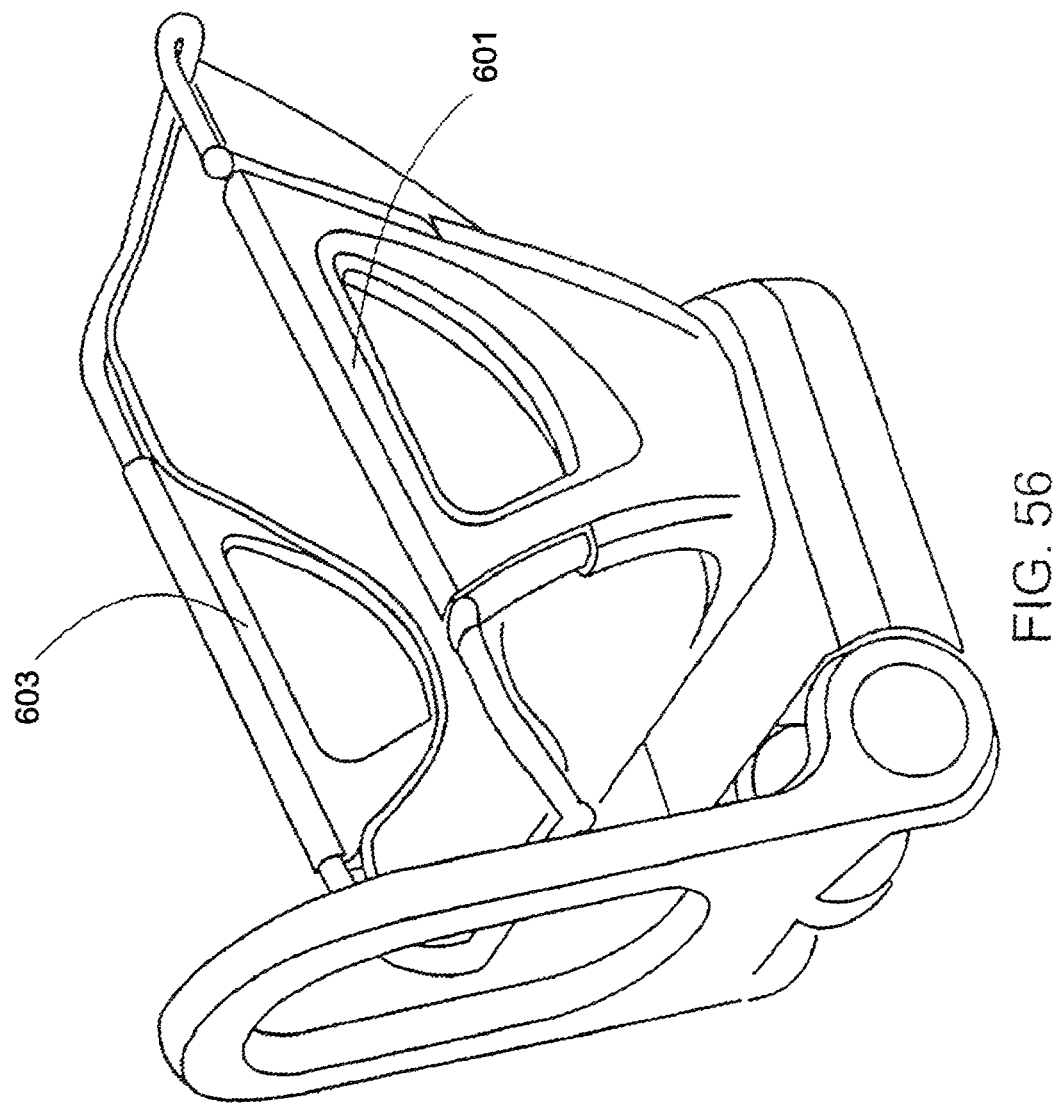

FIG. 56 shows how the handle will allow for dual carrying of the restraint where the weight is shared between two users. One user would hold right handle 601, and the other user would hold left handle 602.

An alternative embodiment of the side handles comprises separate tubes for the left and right handles which connect to the restraint body. In this embodiment, the handles themselves are not molded into the main restraint body.

7. Child Restraint Harness Height Adjuster

There are many child restraints on the market, especially of the type that users install as accessories in a car and are not built-in to the vehicle by the vehicle manufacturer. These restraints have harnesses that restrain the child since full size seat belts are not appropriate for small children. As the child grows, the height of the child's shoulder raises, such that the harness's exit points in the restraint at shoulder level must be adjusted. Existing restraints do not accomplish this height adjustment conveniently since in many the harness must be broken or separated and passed through different holes. There are lead screw and rod mechanisms for adjustment in the prior art, but these Typically add great weight and complexity to the restraint.

A new child restraint harness height adjuster of the invention allows for greater ease of use and safety. The invention adjusts the shoulder height at which the harness attaches to or intersects the restraint. This harness height adjuster will improve the security and ease of use of harnesses in children's car seats, infant carriers used as car restraints, carriers and bassinet type restraints that are not meant as in-car restraints, and child strollers. The adjustment design of the invention is superior to existing designs because it:

Does not require the user to break the continuous loop of the harness system in order to adjust its shoulder height point;
Removes the safety concern of a user possibly not reconnecting a harness system back together properly after adjusting its height;
Does not require the tedious threading of harness ends through separate shoulder height openings in the restraint;
Does not require a separate sliding piece on the inside of the restraint to accommodate the different harness heights; and
Allows for the harness adjustment mechanism to exist inside the restraint instead of exposed on the backside of the restraint.

Figure 57:
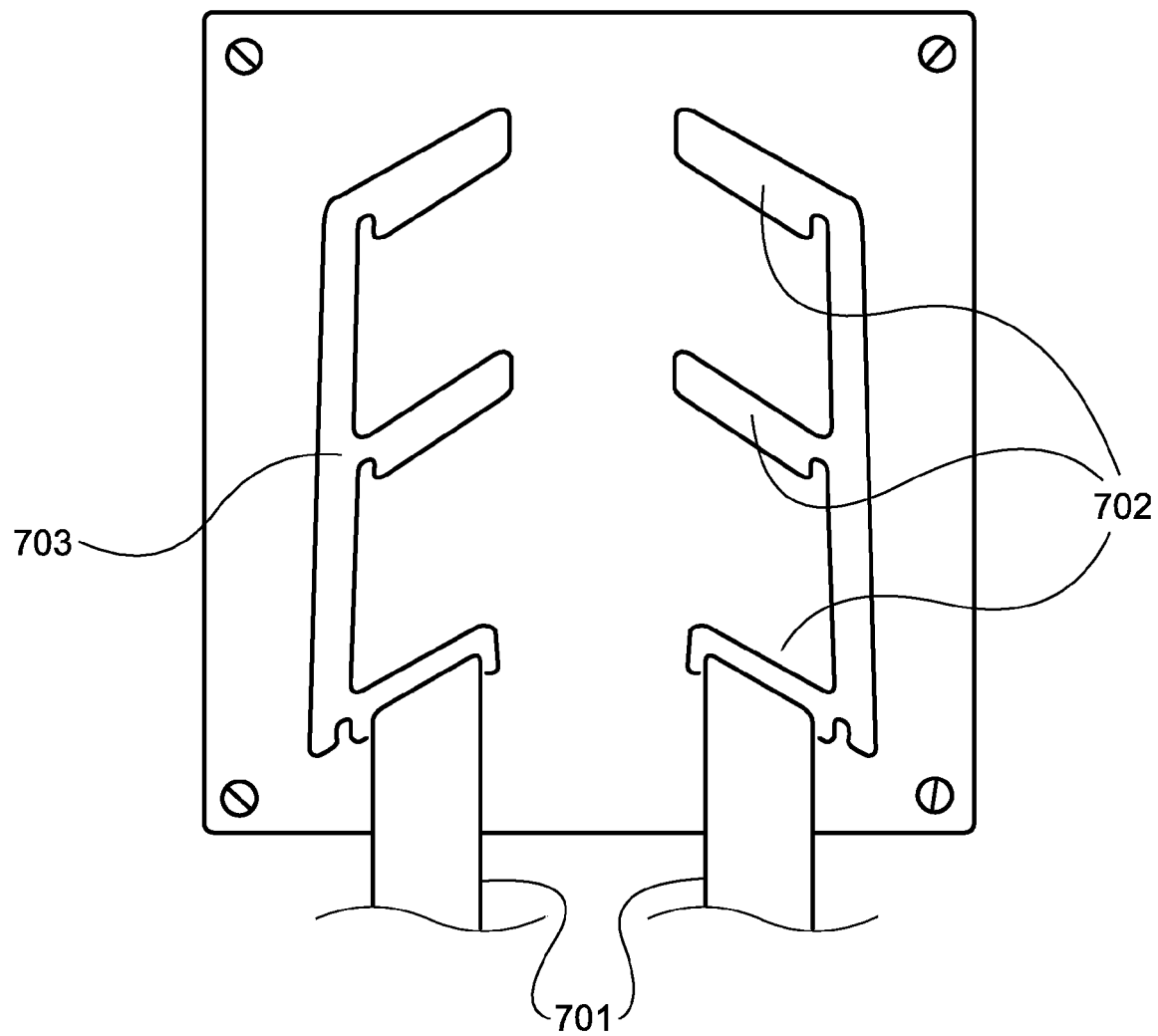
FIG. 57 is a top plan view of a harness height adjuster for a child restraint, according to an embodiment of the invention.

The invention allows for the adjustment of child restraint harnesses simply without breaking the integrity of the harness loop. The retaining features shown in FIG. 57 are accessed through a flap or panel or door from the outside of the restraint. This access can simply be through a fabric panel that is secured by Velcro. The harness 701 sits in various slot positions 702 by the user moving 701 up or down through adjustment slots 703. Advantageously, the system does not employ moving parts. The retaining member, within which the slots 702 are formed, is made out of a sufficiently strong material such as aluminum sheet metal.

Figure 58:
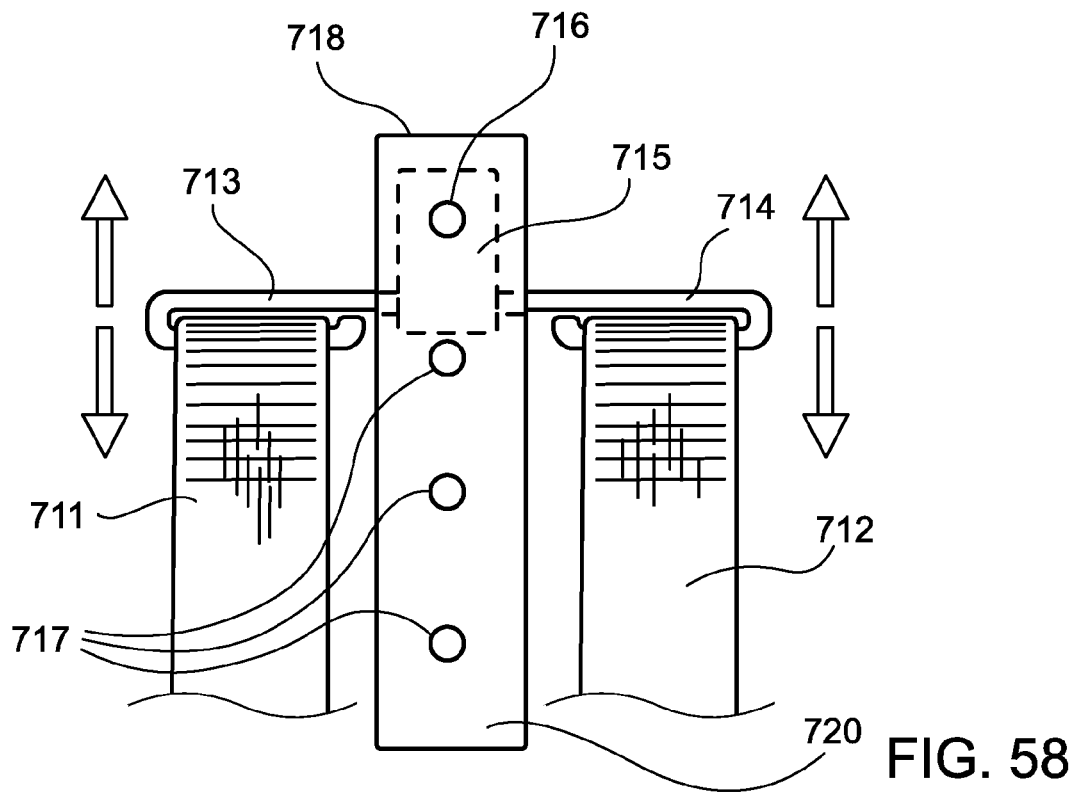
FIG. 58 is a top plan view of a harness height adjuster for a child restraint, according to another embodiment of the invention.
Figure 59:
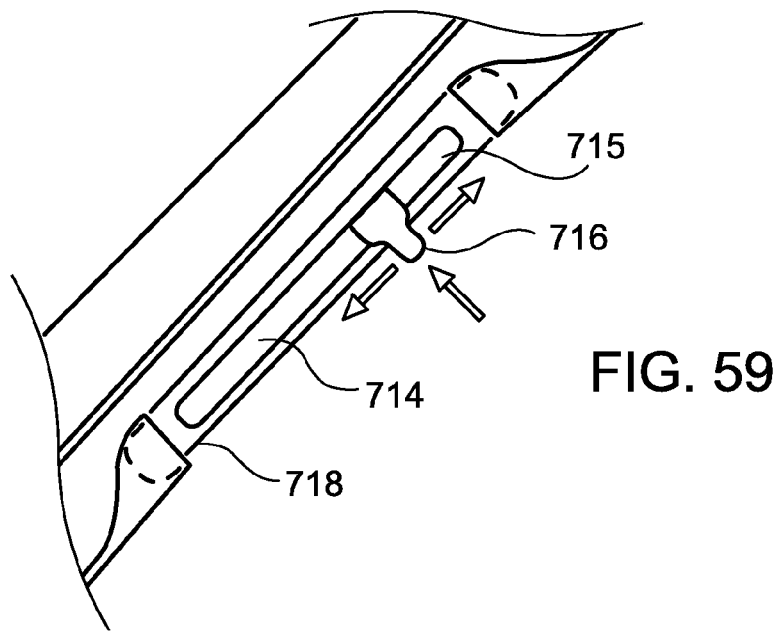
FIG. 59 is a cross-sectional view through the embodiment of FIG. 58.

FIG. 58 shows how the harness height adjuster allows for positioning the height without breaking the harness loop. The harness sections 711 and 712 pass through openings 713 and 714, which are attached to sliding element 715. Sliding element 715 has a ball retainer 716 which the user presses to allow sliding element 715 to slide and lock into one of the other positions indicated by 717 on rail 718. At no point in this procedure does the user have to compromise the integrity of the harness system FIG. 59 shows the invention in a side view. Reference numeral 719 indicates a cutaway section view of the foam and shell that would cover the height adjust mechanism on the inside of the restraint. The member forming opening 714 is seen in end view here; also, sliding element 715 and rail 718 are visible. The ball retainer 716 is pressed to adjust the height position.

Figure 60:
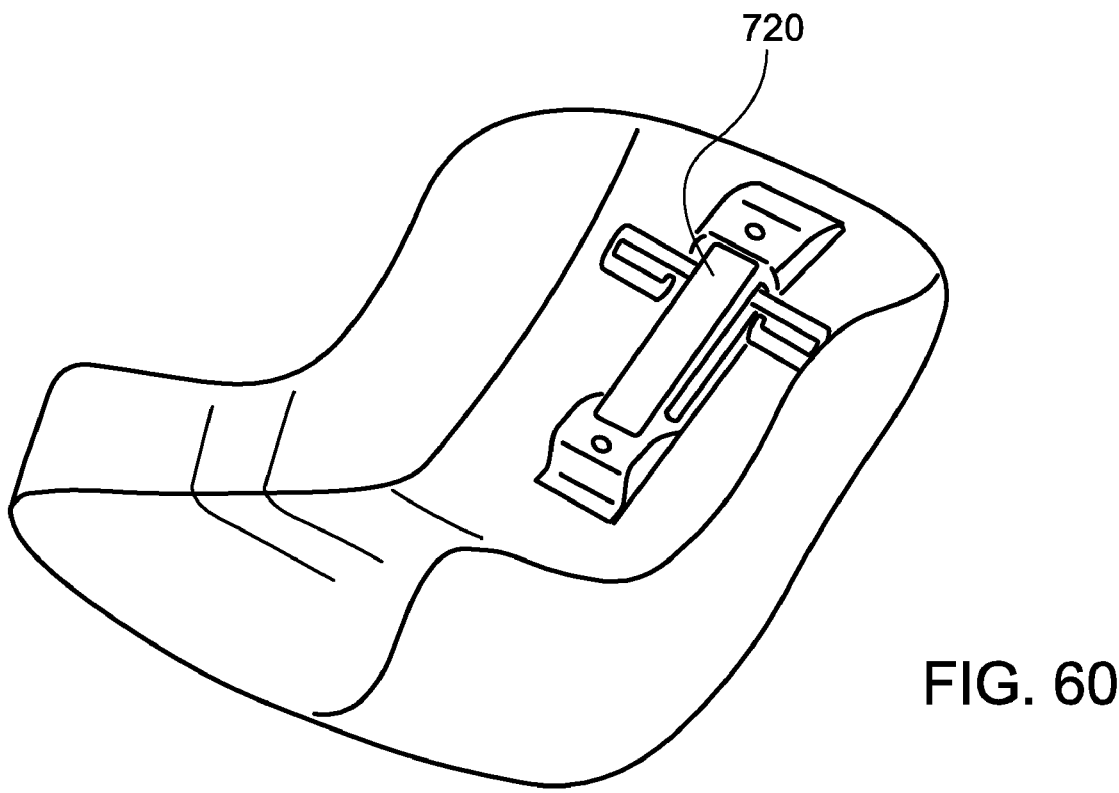
FIG. 60 is a top plan view of the embodiment of FIG. 58.
Figure 61:
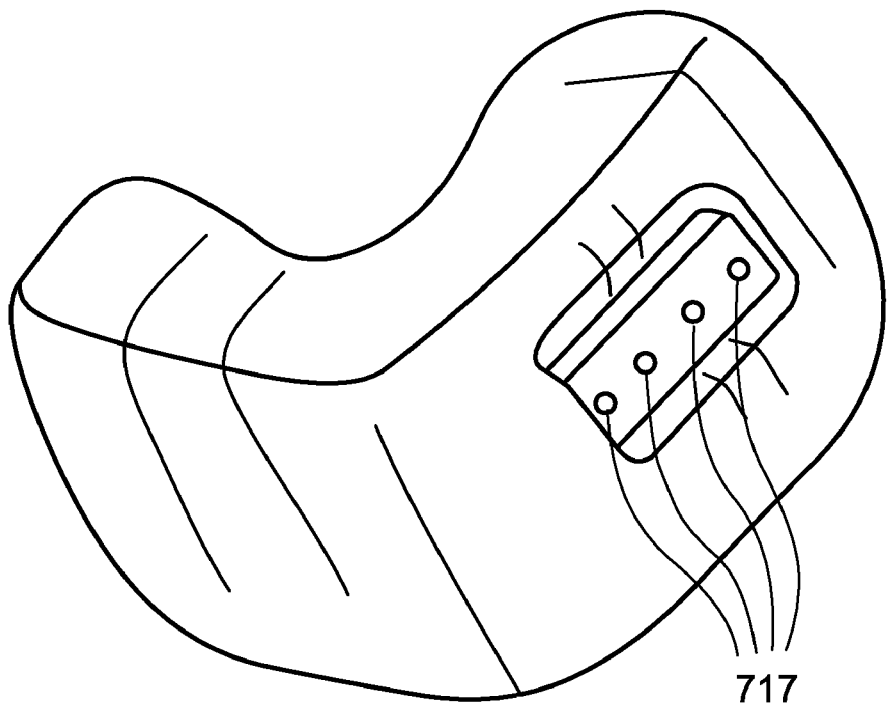
FIG. 61 is a bottom plan view of the embodiment of FIG. 58.

FIG. 60 shows a top three-quarter isometric view of the inside of the restraint which shows how the height adjust assembly 720 attaches to the inside of the restraint. FIG. 61 shows a bottom three-quarter isometric view of the outside of the restraint showing that the adjustment points 717 are easily accessible to the user. By providing access to the inside of the restraint, the invention does not require and breaking the harness and does not require a separate sliding piece as on existing height adjusters.

Figure 62:
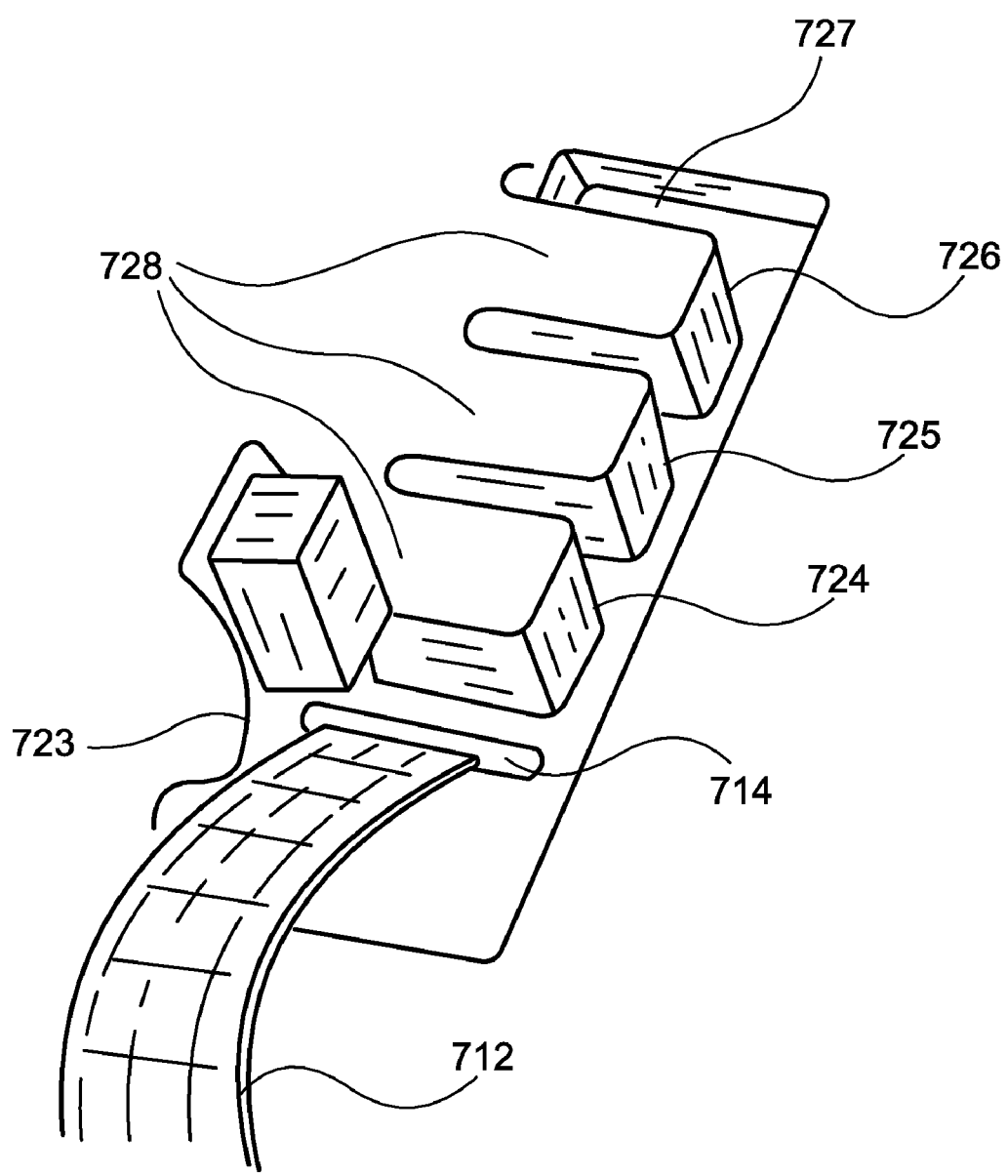
FIG. 62 is a perspective view of a portion of a restraint cover in a shoulder area thereof, according to an embodiment of the invention.

FIG. 62 shows the restraint cover detail at the shoulder area which will allow us to avoid this separate piece. Here, one of the retaining openings 714 is visible through which harness 712 is looped. 712 passes through slot 723, though 714 could be raised with the mechanism such that 712 passes through slots 724, 725, 726, or 727. This is achieved by lifting or lowering and attaching flaps 728. These flaps are secured down by hook and loop closures; or, alternatively buttons, snaps, clips or other mechanical fasteners.

Figure 63:
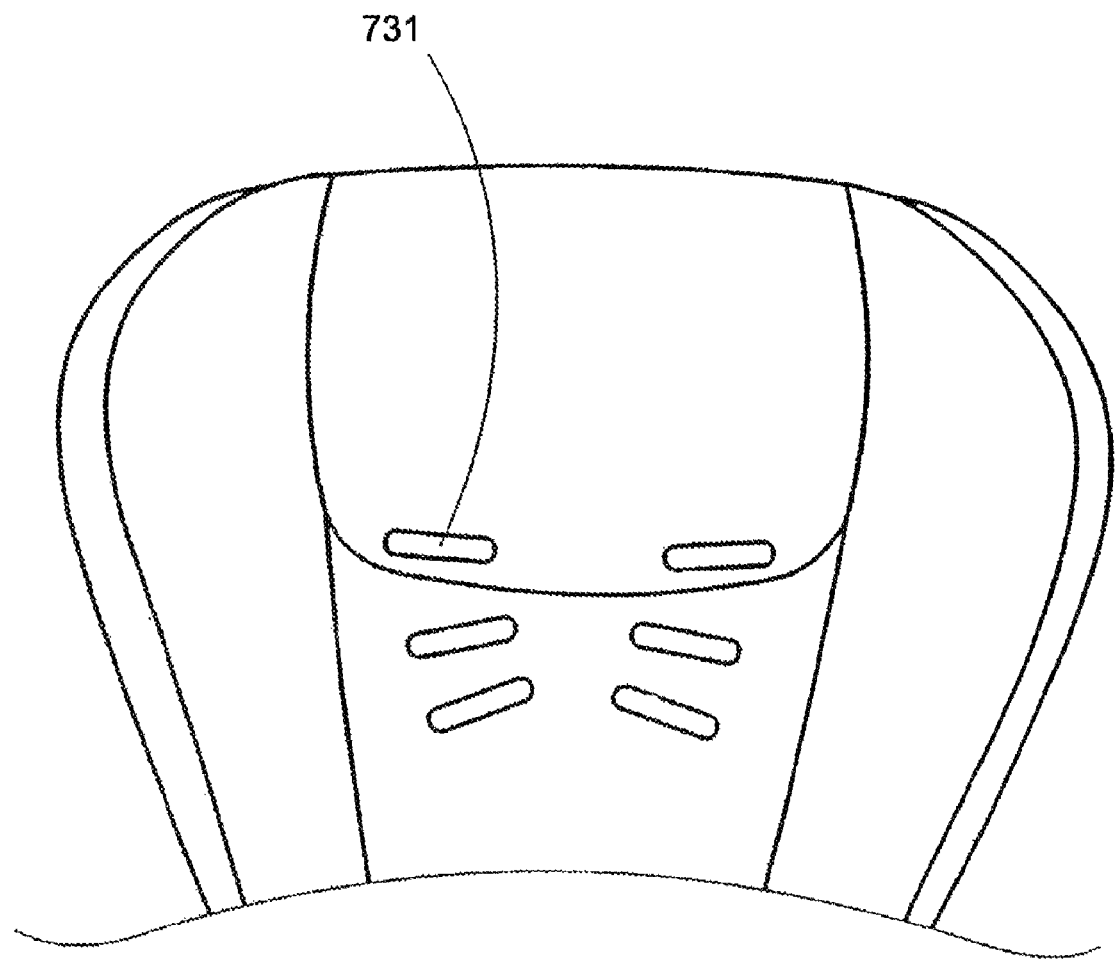
FIG. 63 is a perspective view of a prior art restraint cover.
Figure 64:
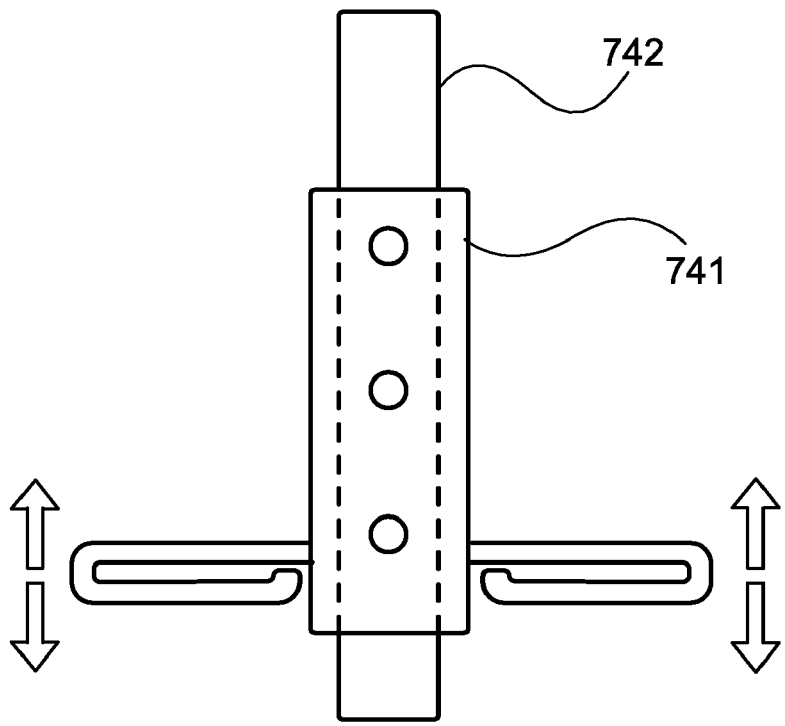
FIGS. 64-66 are top plan views of harness height adjusters according to additional embodiments of the invention.

FIG. 63 shows how most prior art harnesses require threading the harness through holes 731 in the restraint when the user needs to adjust the harness height. Alternative implementations of the invention include:

A sliding tube 741 setup with a ball retainer in the stationary element 742, as illustrated in FIG. 64. In this arrangement, the height positions exist on the sliding element, not on the stationary element.

Figure 65:
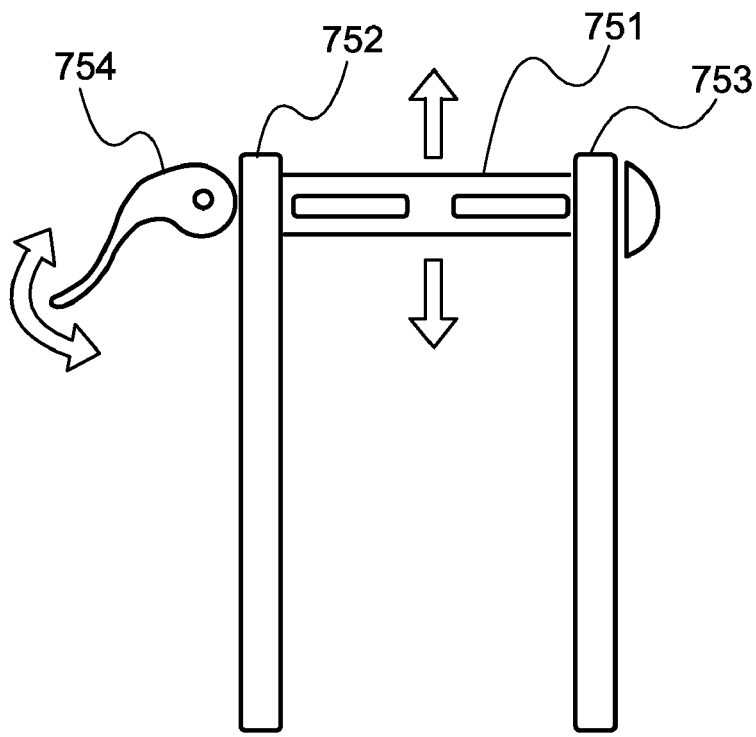

A cam-lock locking adjustment piece, as illustrated in FIG. 65. The piece containing the openings for the harnesses to pass through, 751, slides up and down in two side rails 752 and 753. These rails have slots cut in the sides such that tracking rods can slide in them. On one side, a cam device 754 allows different heights to be set.

Figure 66:
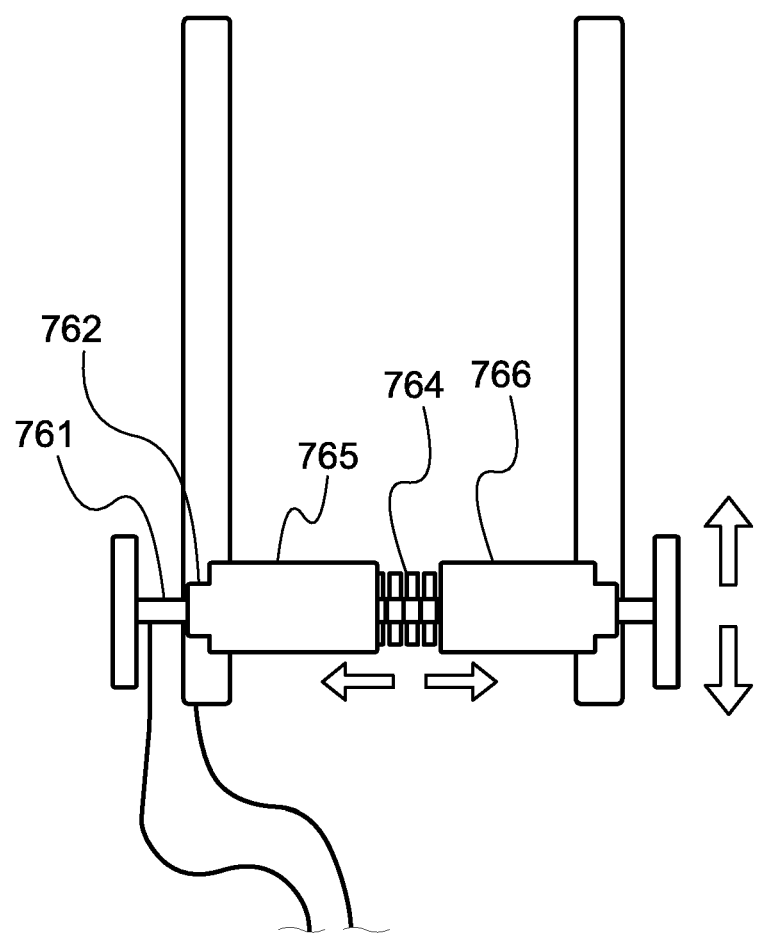
Figure 67:
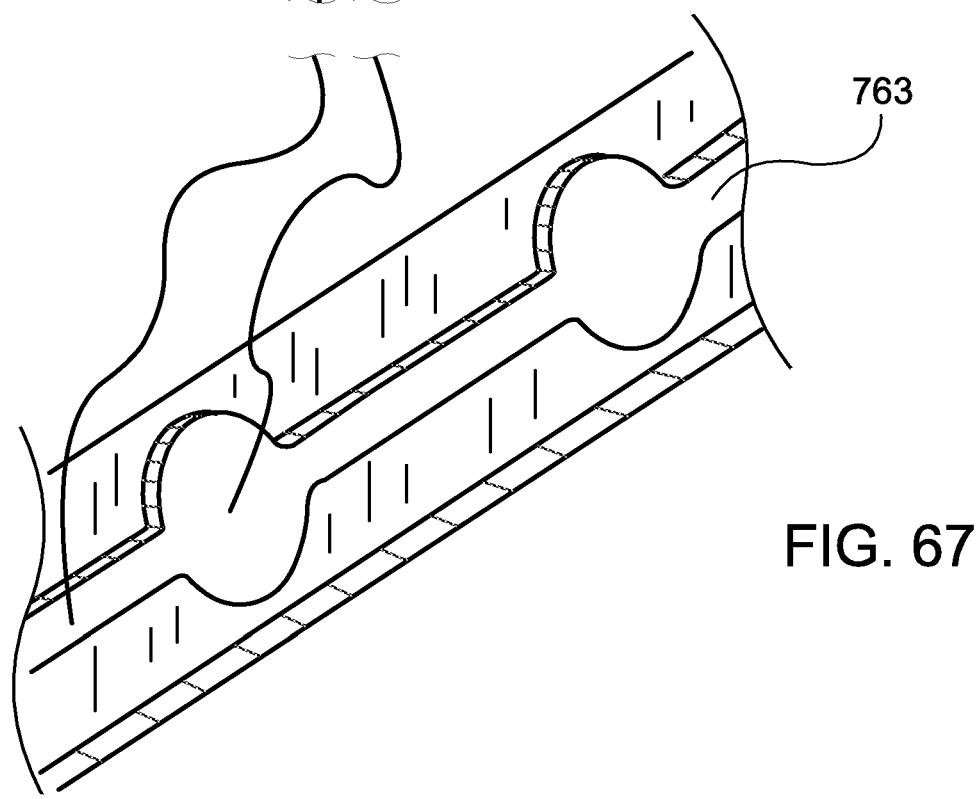
FIG. 67 is perspective view of a portion of the embodiment of FIG. 66.

A system also incorporating a sliding element, but in this case it is locked out by shoulders 761 and 762 which engage slot geometry 763 to hold a position, as illustrated in FIGS. 66 and 67. A compression spring 764 pushes the two elements of the sliding piece, 765 and 766, out such that 763 is engaged.

In the foregoing specification, the invention is described with reference to specific embodiments thereof, but those skilled in the art will recognize that the invention is not limited thereto. For example, many embodiments have been described herein with reference to automotive uses, but uses can also extend to strollers, infant swings, bassinettes, carriages, amusement park rides, and so forth. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed as new and desired to be protected by Letters Patent of the United States is:

1. A child restraint system comprising:
  a child car seat;
  two members; and
  a handle piece, wherein the two members are attached to the seat in a crossover fashion and coupled together by the handle piece where the two members crossover, and wherein the handle piece comprises an elongated, tubular-shaped member encircling the two members and allowing the two members to move relative to each other where the two members crossover;
  wherein the two members and the handle piece are configured for carrying the seat.

2. The child restraint system of claim 1, wherein the two members are pivotally attached to the child seat.

3. The child restraint system of claim 1, wherein the two members are operable to move through the handle piece in opposite directions when moving the handle piece to a collapsed position relative to the seat.

4. A child restraint system comprising:
  a child car seat including a semi-rigid handle having two members that are attached to the seat in a crossover fashion and coupled together by a handle piece where the two members crossover, wherein the handle piece comprises an elongated, tubular-shaped member which encircles the two members and allows the two members to move relative to each other where the two members crossover;
  wherein the two members and the handle piece are configured for carrying the seat.

5. The child restraint system of claim 4, wherein the two members are collapsible with respect to the seat while remaining coupled together by the handle piece in the crossover fashion, wherein the two members move relative to each other where they crossover when collapsing.

6. The child restraint system of claim 4, wherein the two members are foldable along a contour of the seat while remaining coupled together by the handle piece in the crossover fashion.

7. The child restraint system of claim 4, wherein the two members are disposed through a common portion of the tubular member in the crossover fashion.

8. The child restraint system of claim 4, wherein the handle piece comprises a semi-rigid material.

9. The child restraint system of claim 4, further comprising a locking element for selectively restricting movement of the two members relative to each other.

10. The child restraint system of claim 9, wherein the locking element engages at least one of the two members.

11. The child restraint system of claim 4, further comprising a locking element included at least partially with the handle piece for selectively restricting movement of the two members.

12. The child restraint system of claim 4, wherein the handle piece is fixed to one of the two members.

13. The child restraint system of claim 4, wherein end portions of each of the two members are anchored adjacent opposite corner portions of the seat.

14. The child restraint system of claim 4, wherein each of the members is attached to opposing diagonal corners of the seat.

15. The child restraint system of claim 4, wherein the two members are attached in alternating attachment points with the seat.

16. The child restraint system of claim 4, wherein the two members are attached to crossover each other only once.

17. A child restraint system comprising:
   a seat including a semi-rigid handle having two members that are attached to the seat in a crossover fashion and coupled together by a handle piece where the two members crossover, wherein the handle piece comprises an elongated, tubular-shaped member which encircles the two members and allows the two members to move relative to each other where the two members crossover; and
   a locking element for selectively restricting movement of the two members relative to each other.

18. The child restraint system of claim 17, wherein the locking element engages at least one of the two members.

19. The child restraint system of claim 17, wherein the locking element is included at least partially with the handle piece for selectively restricting movement of the two members.

20. The child restraint system of claim 17, wherein the handle piece is fixed to one of the two members.

* * * * *